(12) United States Patent
Kambayashi

(10) Patent No.: US 7,210,042 B2
(45) Date of Patent: Apr. 24, 2007

(54) DEVICE INFORMATION GENERATING DEVICE, DEVICE INFORMATION GENERATING METHOD, CONTROL DATA GENERATING DEVICE, CONTROL DATA GENERATING METHOD, CONTENT UTILIZING DEVICE, CONTENT UTILIZING METHOD, AND STORAGE MEDIUM

(75) Inventor: Toru Kambayashi, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 828 days.

(21) Appl. No.: 10/067,950

(22) Filed: Feb. 8, 2002

(65) Prior Publication Data

US 2002/0111925 A1 Aug. 15, 2002

(30) Foreign Application Priority Data

Feb. 9, 2001 (JP) ............................. 2001-033915

(51) Int. Cl.
*G06F 21/00* (2006.01)
(52) U.S. Cl. ...................................................... 713/193
(58) Field of Classification Search ............... 713/193; 380/278
See application file for complete search history.

(56) References Cited

U.S. PATENT DOCUMENTS 6,185,680 B1 * 2/2001 Shimbo et al. ............. 713/160

6,735,313 B1 * 5/2004 Bleichenbacher et al. .. 380/241

FOREIGN PATENT DOCUMENTS

JP 2002-77131 3/2002

OTHER PUBLICATIONS

IBM Technical Disclosure Bulletin NN8507603, Jul. 1, 1985. Matrix Digital Signature for Use with the Data Encryption Algorithm.*
D. Wallner, et al., Network Working Group, RFC 2627 of the Internet Engineering Task Force, pp. 1-20, "Key Management for Multicast: Issues and Architectures", Jun. 1999.
T. Nakano, et al., The 2001 Symposium on Cryptography and Information Security, pp. 213-218, "Key Management System for Digital Content Protection", Jan. 23-26, 2001.
Koutarou Suzuki, "B-tree Dynamic Key Tree using B-tree", SCIS2000 The 2000 Symposium on Cryptography and Information Security, Jan. 26-28, 2000, 8 pages.

* cited by examiner

*Primary Examiner*—Kambiz Zand
*Assistant Examiner*—Andrew L. Nalven
(74) *Attorney, Agent, or Firm*—Oblon, Spivak, McClelland, Maier & Neustadt, P.C.

(57) ABSTRACT

A device information generating device comprises a device key matrix storage unit configured to store a device key matrix in which device keys are arranged in a two dimensional manner, and a device key generating unit configured to select one of the device keys in each one dimensional array of the device key matrix according to each numeral of a device ID, wherein the selected device keys and the device ID are the device information.

8 Claims, 40 Drawing Sheets

```
int       P[n];
NNum      KDP[n];

int       j;
NNum      Result;

for(j=0;j<n;j++)
{
          Result=Dec(KD[p[j],j],M[p[j],j]);
          if(Result!=null)
                    break;
}
```

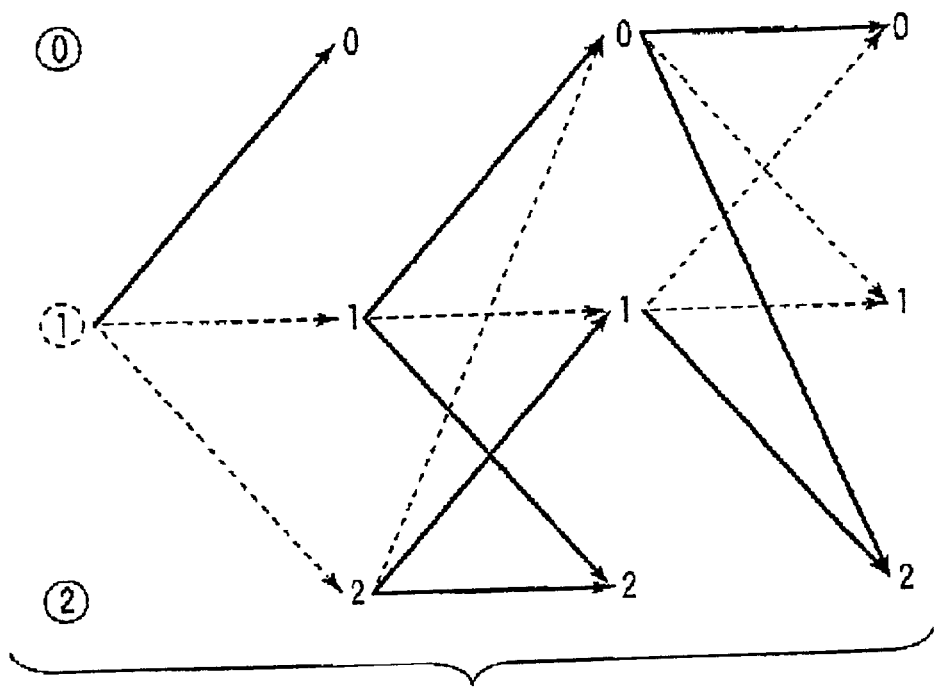
F I G. 7
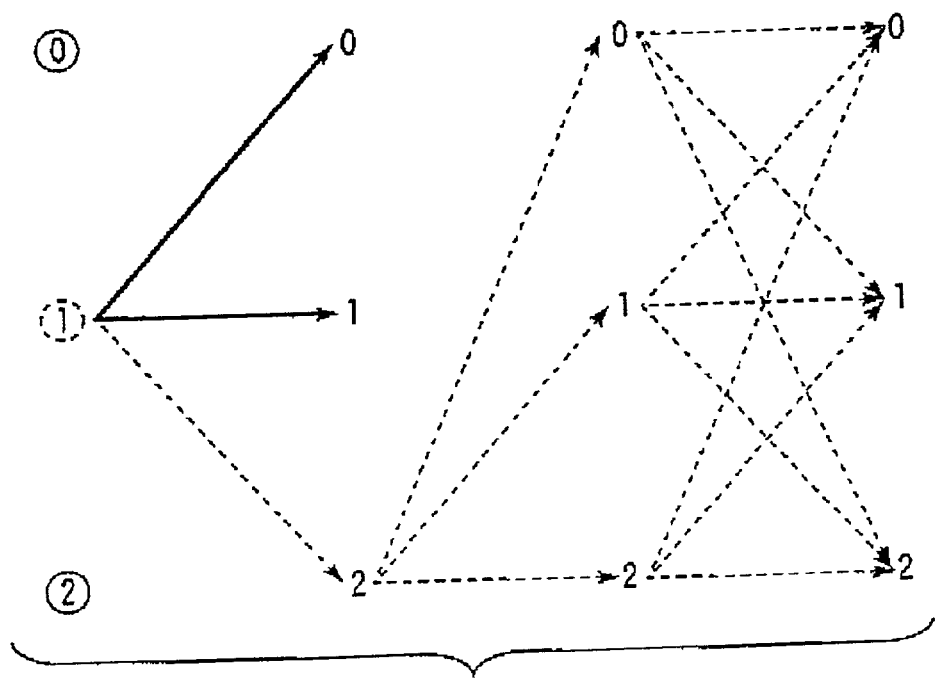
F I G. 8

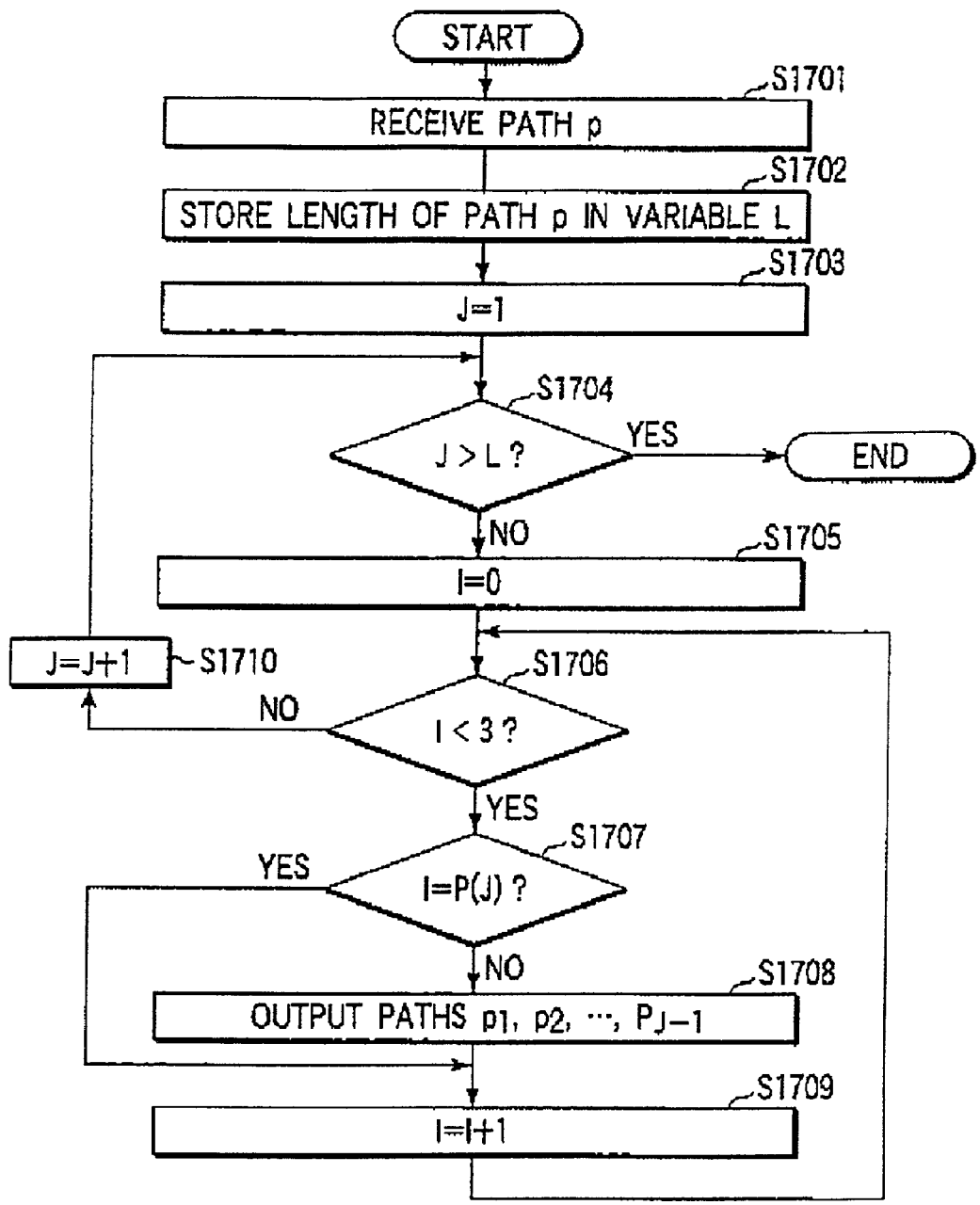
F I G. 26

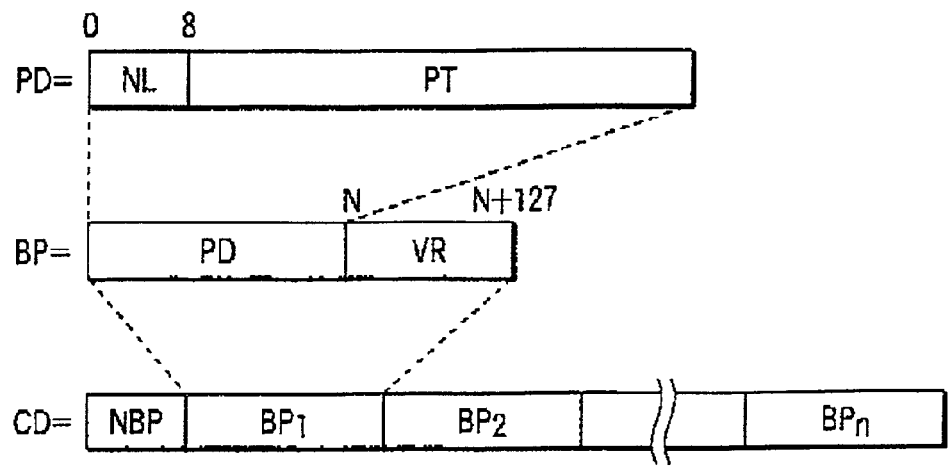
F I G. 27
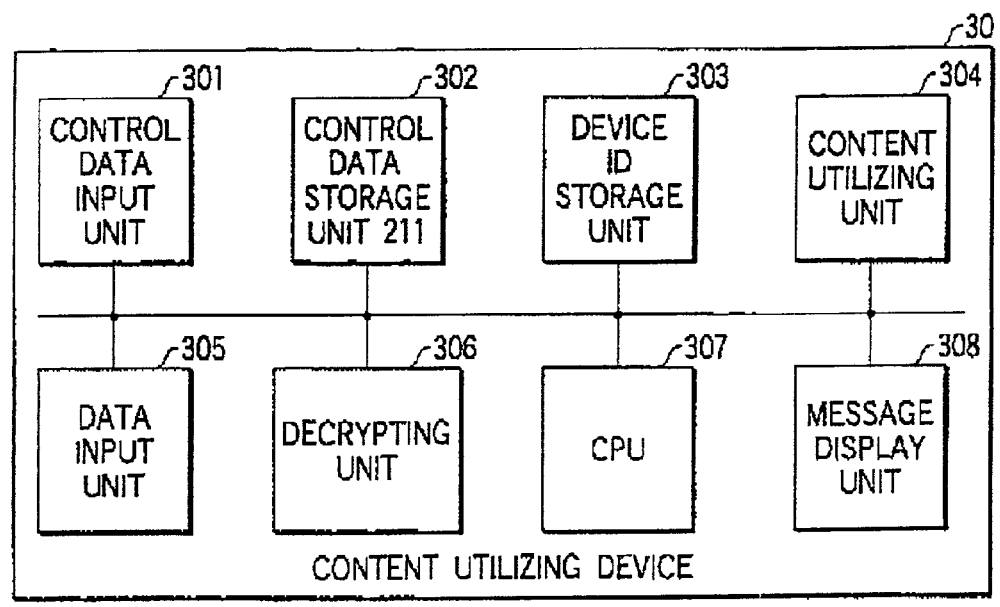
F I G. 28

DEVICE INFORMATION GENERATING DEVICE, DEVICE INFORMATION GENERATING METHOD, CONTROL DATA GENERATING DEVICE, CONTROL DATA GENERATING METHOD, CONTENT UTILIZING DEVICE, CONTENT UTILIZING METHOD, AND STORAGE MEDIUM

CROSS-REFERENCE TO RELATED APPLICATIONS

This application is based upon and claims the benefit of priority from the prior Japanese Patent Application No. 2001-033915, filed Feb. 9, 2001, the entire contents of which are incorporated herein by reference.

BACKGROUND OF THE INVENTION

1. Field of the Invention

The present invention relates to utilization of digital contents. In particular, the present invention relates to a control data generating device or method for generating control data that controls utilization of electronic contents; a device information generating device or method for generating device information assigned to a utilizing device, and a content utilizing device or method in which utilization of contents is controlled according to the control data and the device information.

2. Description of the Related Art

In recent years, distribution of digital contents becomes more popular. Contents are distributed with being encrypted in order to protect a copyright of the contents. Only an authorized user who has a decryption key can reproduce and utilize contents. In general, the decryption key is strictly managed in an internal memory or the like in a utilizing device so as not to be identified by the user. However, the decryption key is sometimes known due to any accident or attack. In this case, it is desirable that the copyright owner inhibits the utilizing device from utilizing the contents (hereinafter, referred to as "revoke"). A concept of such revoke will be described below.

The utilizing device has its own specific information (device information) assigned in advance thereto, and the specific information is contained in the device. Device information is different depending on individual devices. Alternatively, a group of devices may have the same device information assigned thereto. For example, all the CD player devices manufactured by company "A" may have the same device information.

Now, it is assumed that illegal use of contents occurs for a reason such as insufficient security in a certain utilizing device, In this case, it is important to restrict/inhibit contents in the utilizing device with which such illegal use occurs, thereby prevent expansion of damage.

In distributing contents, control data is added to content data. The utilizing device reads the control data in advance, and determines whether or not the contents can be utilized based on the content data and the device information possessed by the utilizing device. In this manner, in a group of devices including at least the utilizing device with which illegal use occurs, utilization of contents is restricted/inhibited. For control data, for example, where contents are distributed through a broadcast or network, the contents are supplied to a user's terminal to be associated with content data. Where contents are distributed through package media such as CD-ROM or DVD-ROM, the contents are distributed after being recorded in package medium.

Utilization of contents in the utilizing device can be restricted/inhibited (revoked) by a series of processes in which:

1) control data as supplied to the utilizing device;
2) the utilizing device reads the control data; and
3) the utilizing device determines whether or not contents can be utilized based on the device information and control data. When the utilization of contents in the utilizing device is restricted/inhibited, the utilizing device is defined to have been revoked. The control data is distributed by an entity (in general, body corporate) that manages revoke. This is called a revoke entity.

In revoke, a utilizing device targeted for restriction/inhibition of utilizing contents is referred to as a device targeted for revoke. Revoke is carried out based on device information. If there exists a plurality of devices having the same device information, the targeted device cannot be discriminated from other devices having the same device information.

Moreover, as is evident in a media key block technique described later, even in a utilizing device having device information different from that of the targeted device, there may occur a phenomenon in which the utilization of contents is restricted/inhibited. This phenomenon is referred to as a revoke mistake. This is a side effect of revoke, and significantly degrades convenience of a consumer using the utilizing device. Avoiding an occurrence of such kind of side effect to the maximum is very important for a revoke technique.

As one of the revoke techniques which solve the above described security problems, a revoke list technique is designed. This revoke list comprises control data, and is generally supplied to the utilizing device in association with contents data. The revoke list comprises device information on devices that inhibit utilization of the contents. The utilizing device reads the revoke list prior to utilization of contents, and determines whether or not its own device information is contained in the revoke list. Where the device information is not contained in the revoke list, the utilizing device utilizes data. On the other hand, where the device information is contained in the revoke list, the utilizing device does not utilize contents. In order to prevent interpolation of the revoke list, the revoke list is often encrypted.

In the revoke list technique, the revoke entity can specify device information on the targeted device individually. In addition, no revoke mistake occurs. However, the revoke list technique has a problem that cannot be ignored in view of security. The device targeted for revoke cancels utilization of contents because the utilizing device has found out its own device information in the revoke list, and therefore, the utilization of contents is so called "refrained". Information required for utilizing contents is obtained independent of determination of revoke. In essential, the device targeted for revoke is defined as an "unreliable" utilizing device in which modification or the like is applied. As long as the device targeted for revoke is modified so as not to "refrain" utilization of contents, revoke using the revoke list technique has no effect.

A media key block technique is one of the revoke techniques that solves the above described security problems which the revoke list technique has. In the media key block technique, first, a device key matrix KD is provided. The number of rows and the number of columns in the device key matrix KD are defined as "m" and "n", respectively. In addition, a component of "i" rows and "j" columns in the device key matrix KD is expressed as $k_{ij}$ (where $0 \leq i < n$ and $0 \leq j < n$). Respective components of the device key matrix KD are obtained as random numbers generated by a random generator, for example. A master key is defined as K. The master key K is one of the items of information required for utilization of contents. For example, data is encrypted by a data key, and the data key encrypted by the master key K is supplied to the utilizing device together with data. The utilizing device having obtained the master key K can decrypt a data key using the master key K, and then, decrypt data by using the data key.

A device key is defined as a pair of $(p, KD_p)$, p is a mapping from $(0, 1, \ldots, n-1)$ to $(0, 1, \ldots, m-1)$ and a set of elements of the device key matrix $KD_p = k_{p(0),0}, k_{p(1),1}, \ldots, k_{p(n-1),n-1}$. Control data is obtained as matrix M of "m" rows and "n" columns. M denotes a media key block. A component of "i" rows and "j" columns of the media key block M is expressed as $M_{ij}$. The initial value of the media key block M (that is, a value when no revoke exists) is assigned by $M_{ij}=Enc(k_{ij}, K)$. "Enc" denotes an encrypting function using a proper encrypting algorithm. The result obtained when data "x" has been encrypted by a key "w" is expressed as Enc(w, x).

A utilizing device having device information $(p, KD_p)$ reads the media key block M, and carries out processing shown in FIG. 1. This processing is referred to as media key block processing. In the media key block processing, "Dec" is a decrypting function that corresponds to the encrypting function "Enc". Dec(w, x) denotes a result obtained by decrypting the data "x" by the key "w". As is evident from definition, Dec(w, Enc(w, x))=x is obtained.

In addition, "null" is a reserved special numeric value. "null" must not be equal to K, p and $KD_p$ are assumed to have been stored in matrix P and KDP, respectively. In FIG. 1, $P[J]=p_j$, $KDP[J]=k_{p(j),j}$.

"NNum" is a class of a multiple length integer. It is possible to easily read that a revoking process assigns "Result=K" to the initial value of the media key block M irrespective of the device information $(p, KD_p)$.

Now, it is assumed that a utilizing device D having device information $(a, KD_a)$ is revoked. At this time, the revoke entity supplies a next media key block M' to the utilizing device.

$M'_{a(j),j}=Enc(K_{a(j),j}, null)$ $M'_{ij}=Enc(k_{ij}, K)$ if $i \neq a(j)$

Evidently, a result obtained by the utilizing device D processing the media key block M' is "null", and the master key K cannot be obtained. On the other hand, if a utilizing device D' other than D processes the media key block M', the master key K is obtained. Only the utilizing device D cannot obtain the master key K. As a result, the utilizing device D cannot proceed to processing such as data decrypting, and is defined to have been revoked.

In the media key block technique, a utilizing device executes media key block processing. However, unlike a case of the revoke list technique, determination of whether or nor to carry out a revoking process does not depend on the utilizing device. Where one utilizing device is revoked by a media key block, even how well device information assigned to the utilizing device is utilized, the master key K cannot be obtained. Therefore, the media key block technique solves the above described security problem that the revoke list has.

In the media key block technique, however, an essential defect exists. That is, where a plurality of utilizing devices are revoked, there is a possibility that a revoke mistake occurs. A description thereof will be given by using a small media key block for clarity. Assume that the size of a device key matrix is 4 rows and 4 columns, and components of the media key block M are assigned as follows.

$M_{20}=Enc(k_{20}, null)$
$M_{21}=Enc(k_{21}, null)$
$M_{12}=Enc(k_{12}, null)$
$M_{33}=Enc(k_{33}, null)$
$M_{ij}=Enc(k_{ij}, K)$ (other than the above components)

In the above media key block, a utilizing device D2 having device information $(p, KD_p)$ (only D2) is revoked, provided that p=2213.

Furthermore, assume that there occurs a need to revoke a utilizing device D3 specified by device information $(p', KD_{p'})$, provided that p'=1312. The media key block M is updated to obtain a media key block M'. Components of the media key block M' are assigned as follows.

$M'_{20}=M_{20}$
$M'_{10}=Enc(k_{10}, null)$,
$M'_{21}=M_{21}$
$M'_{31}=Enc(k_{31}, null)$,
$M'_{12}=M_{12}$
$M'_{33}=M_{33}$
$M'_{23}=Enc(k_{23}, null)$,
$M'_{ij}=Enc(k_{ij}, null)$ (other than the above components)

The utilizing devices D2 and D3 are reliably removed by the media key block M'. However, a utilizing device having device information $(p'', KD_{p''})$, for example, may be revoked at the same time, provided that p''=2313. Apart from D2 and D3, a total of six utilizing devices may be accidentally revoked.

In the media key block technique, in general, where "s" utilizing devices ("s" items of device information) are revoked, a maximum of "sn-s" utilizing devices are revoked by a revoke mistake. Thus, a user of an "innocent" utilizing device as well will suffer from inconvenience in which the utilization of contents is restricted together with a user of a device targeted for revoke. In saome cases, it is undeniable that the above fact can lead to a serious economical loss or the like. Where a media key block is employed as a revoke technique, suppliers or a manufacturers of the utilizing devices will suffer from potential product faults such as complaint from users or request for damage.

In the media key block technique, the probability that one utilizing device is removed by a revoke mistake increases exponentially relevant to the number of devices targeted for revoke under a general assumption. This denotes that an only small amount of device information can actually be revoked in the entire device information. The suppliers or manufacturers of utilizing devices can perform troubleshooting procedures that individually correspond to complaint while a small number of mistakes occur.

Devices required for revoke using a media key block technique and a configuration and operation of these devices will be described below in more detail. This is because a different between a media key block technique and the present invention is clearly described. A configuration of a device information generating device 50 (which assigns device information to a utilizing device) in the media key block technique is shown in FIG. 2. A device key matrix KD is stored as a two-dimensional arrangement in a device key storage unit 509.

$k_{00}, k_{01}, k_{02}$
$k_{10}, k_{11}, k_{12}$

The device key arrangement is assumed to have been generated by a proper method such as a method of using a random number generator. A random number generator 504 having received an instruction for generating random numbers generates three random numbers whose values are obtained as 0 or 1. A key reading unit 508 receives random numbers, regards the random numbers as row numbers, and reads an element specified by the row numbers in turn from each column of the device key matrix.

A device information storage unit 506 stores the following two items of information.

Arrangement of column positions: R0, R1, R2
Arrangement of keys: $k_{R0,0}$, $k_{R1,1}$, $k_{R2,2}$ These items of information configure device information. An outputted information storage unit 507 has arrangement of column positions recorded therein in an additionally writing manner. Therefore, the outputted information storage unit 507 has all arrangements of the outputted column positions recorded therein.

Now, a configuration of a media key block generating device 60 is shown in FIG. 3. The device key matrix storage device 509 in the device information device 50 and a device key matrix storage device 612 in the media key block generating device 60 store the same device key matrix as follows.

$k_{00}$, $k_{01}$, $k_{02}$
$k_{10}$, $k_{11}$, $k_{12}$

A key reading unit 611 receives two arguments. These two arguments are obtained as numbers of rows and columns in device key matrix. The key reading unit 611 returns an element of a device key matrix specified by these numbers. A media key block is stored as a two-dimensional arrangement in a media key block storage unit 610.

$M_{00}$, $M_{01}$, $M_{02}$
$M_{10}$, $M_{11}$, $M_{12}$

During media key block update, the media key block generating device 60 needs to specify device information on a utilizing device to be revoked. This device information is specified by row numbers of each column in media key block. For example, assume that device information on a utilizing device to be removed is (100, $KD_{100}$). In this case, the following data is specified by being inputted to a revoke information input unit 602 of the media key block generating device 60.

($1_0$, $1_b$, $1_2$)=(1, 0, 0)

A CPU 605 regards these data as row numbers in columns 0, 1, and 2. Then, the CPU 605 specifies the respective numbers as arrangement elements of the media key block, i.e., converts the respective ones into a pair of row number and column number, and inputs them sequentially to an update unit 609. The update unit 609 invalidates elements of the media key block which is inputted and specified by a pair of the row number and column number.

A configuration of a utilizing device 70 that conforms to a revoke scheme based on a media key block is shown in FIG. 4. A media key block input unit 701 of the utilizing device 70 reads the following media key block.

$M_{00}$, $M_{01}$, $M_{02}$
$M_{10}$, $M_{11}$, $M_{12}$

The read media key block is stored in a media key block storage unit 702. A device information storage unit 705 stores device information (1, $KD_1$), for example. Components of $KD_1$ are expressed as $KD_1 = k_0$, $k_1$, $k_2$.

A CPU 703 reads data sequentially from the device information storage unit 705, and applies the read data to a media key block. That is, first, with a value of variable "j" being 1, $1_j$ is read from the device information storage unit 705, and a pair of numerals ($1_j$, j) is supplied to an arrangement element reading unit 707. The arrangement element reading unit 707 reads out an element $M_{1j,j}$ from the media key block storage unit 702, and then, returns it to the CPU 703. The CPU 703 supplies $M_{1j,j}$ to a decrypting unit 708.

Next, $k_j$ is read from device information, and is supplied to the decrypting unit 708. the decrypting unit 708 decrypts $M_{1j,j}$ by a key $k_j$, and the result is returned to the CPU 703. The CPU 703 temporarily stores the decrypting result in variable "Result". If a value of the variable "Result" is equal to null, the CPU 703 increases "j" by 1. If j<3, the CPU 703 repeats the above operation. Otherwise, the PUP 703 stops a media key block processing action.

Where the value of the variable "Result" is different from null relevant to any of j=0, 1, 2, the CPU supplies the value of "Result" as a master key K to a content utilization unit 709. Then, the CPU 703 reads data from a data input unit 706, and supplies the data to the content utilization unit 709. The content utilization unit 709 decrypts the data by using the master key K, for example, and utilizes the decrypting result. It is assumed that a proper algorithm for utilizing data is stored in advance in the utilization unit 709.

BRIEF SUMMARY OF THE INVENTION

The present invention is directed to a technique of controlling utilization of contents in a utilizing device by control data. The present invention has been made to solve the following two problems that generally occur in the prior art.

1. Security Problem

A scheme which depends on only determination of a utilizing device as to whether contents can be utilized is suspected in effectiveness of revoke itself.

2. Problem with Revoke Mistake

A revoke mistake is a kind of "exoneration", and significantly loses convenience of a general good-will user. For suppliers or manufacturers of utilizing devices, such a revoke mistake can cause problems with products, and cannot be ignored.

According to an embodiment of the present invention, a device information generating device comprises:

a device key matrix storage unit configured to store a device key matrix in which device keys are arranged in a two dimensional manner; and a device key generating unit configured to select one of the device keys in each one dimensional array of the device key matrix according to each numeral of a device ID, wherein the selected device keys and the device ID are the device information.

According to another embodiment of the present invention, a device information generating device comprises:

a device key matrix storage unit configured to store a device key matrix in which device keys are arranged in a two dimensional manner;

a device key generating unit configured to select one of the device keys in each one dimensional array of the device key matrix according to each numeral of a device ID; and a path function calculating unit configured to calculate a path function value based on the selected device keys, the path function indicating a path of the device ID in a tree formed of all possible combinations of the numerals forming the device ID, wherein path function value and the device ID are the device information.

According to another embodiment of the present invention, a revoke control data generating device comprises:

a device key matrix storage unit configured to store a device key matrix in which device keys are arranged in a two dimensional manner;

a device key generating device configured to select one of the device keys in each one dimensional array of the device key matrix according to each numeral of a device ID;

an encrypting unit configured to encrypt the selected device keys by a master key; and a revoke control data generating unit configured to generate revoke control data including an output of the encrypting unit and a path function indicating a path of the device ID to be revoked in a tree formed of all possible combinations of the numerals forming a device ID.

According to another embodiment of the present invention, a content utilizing device comprises:

a device information storing unit configured to store a device information including an arrangement of device keys and a device ID;

a key decrypting unit configured to receive revoke control data including encrypted data keys which are encrypted by a master key and decrypt the encrypted data keys to obtain the master key; and a content decrypting unit configured to receive content data which is encrypted by the data keys and decrypt the encrypted content data using the master key, wherein if the device information is included in the received revoke control data, the content utilizing device is revoked such that the key decrypting unit does not obtain the master key.

According to another embodiment of the present invention, a device information generating method comprises:

selecting one of device keys in a device key matrix in which device keys are arranged in a two dimensional manner in each one dimensional array of the device key matrix according to each numeral of a device ID, wherein the selected device keys and the device ID are the device information.

According to another embodiment of the present invention, a device information generating method comprises:

selecting one of device keys in a device key matrix in which device keys are arranged in a two dimensional manner in each one dimensional array of the device key matrix according to each numeral of a device ID; and calculating a path function value based on the selected device keys, the path function indicating a path of the device ID in a tree formed of all possible combinations of the numerals forming the device ID, wherein path function value and the device ID are the device information.

According to another embodiment of the present invention, a revoke control data generating method comprises:

selecting one of device keys in a device key matrix in which device keys are arranged in a two dimensional manner in each one dimensional array of the device key matrix according to each numeral of a device ID;

encrypting the selected device keys by a master key; and generating revoke control data including the encrypted-selected device keys and a path function indicating a path of the device ID to be revoked in a tree formed of all possible combinations of the numerals forming a device ID.

According to another embodiment of the present invention, a content utilizing method comprises:

receiving revoke control data including encrypted data keys which are encrypted by a master key and decrypting the encrypted data keys to obtain the master key; and receiving content data which is encrypted by data keys stored in a content utilizing device and decrypting the encrypted content data using the master key, wherein if device information formed of a device information including an arrangement of the device keys and a device ID is included in the received revoke control data, the content utilizing device is revoked such that the encrypted data keys are not decrypted.

According to another embodiment of the present invention, an article of manufacture comprising a computer usable medium having computer readable program code means embodied therein, the computer readable program code means comprises:

computer readable program code means for causing a computer to select one of device keys in a device key matrix in which device keys are arranged in a two dimensional manner in each one dimensional array of the device key matrix according to each numeral of a device ID;

computer readable program code means for causing a computer to encrypt the selected device keys by a master key; and computer readable program code means for causing a computer to generate revoke control data including the encrypted-selected device keys and a path function indicating a path of the device ID to be revoked in a tree formed of all possible combinations of the numerals forming a device ID.

BRIEF DESCRIPTION OF THE SEVERAL VIEWS OF THE DRAWING

FIG. 7 is a view showing a revoke tree structure showing an apex set (dashed line) and a boundary set (solid line) associated with device Ids 1201 and 1110 of a utilizing device in order to explain a concept of the present invention;

FIG. 8 is a view showing a revoke tree structure showing an apex set (dashed line) and a boundary set (solid line) associated with device ID 12\*\* (\* denotes a wild card) of a utilizing device in order to explain a concept of the present invention;

FIG. 26 is a flowchart showing an operation of a boundary set calculating unit 208 of the control data generating device of FIG. 14;

FIG. 27 is a view showing a control data format;

FIG. 28 is a block diagram showing a content utilizing device according to the first embodiment of the present invention;

Figure 31:
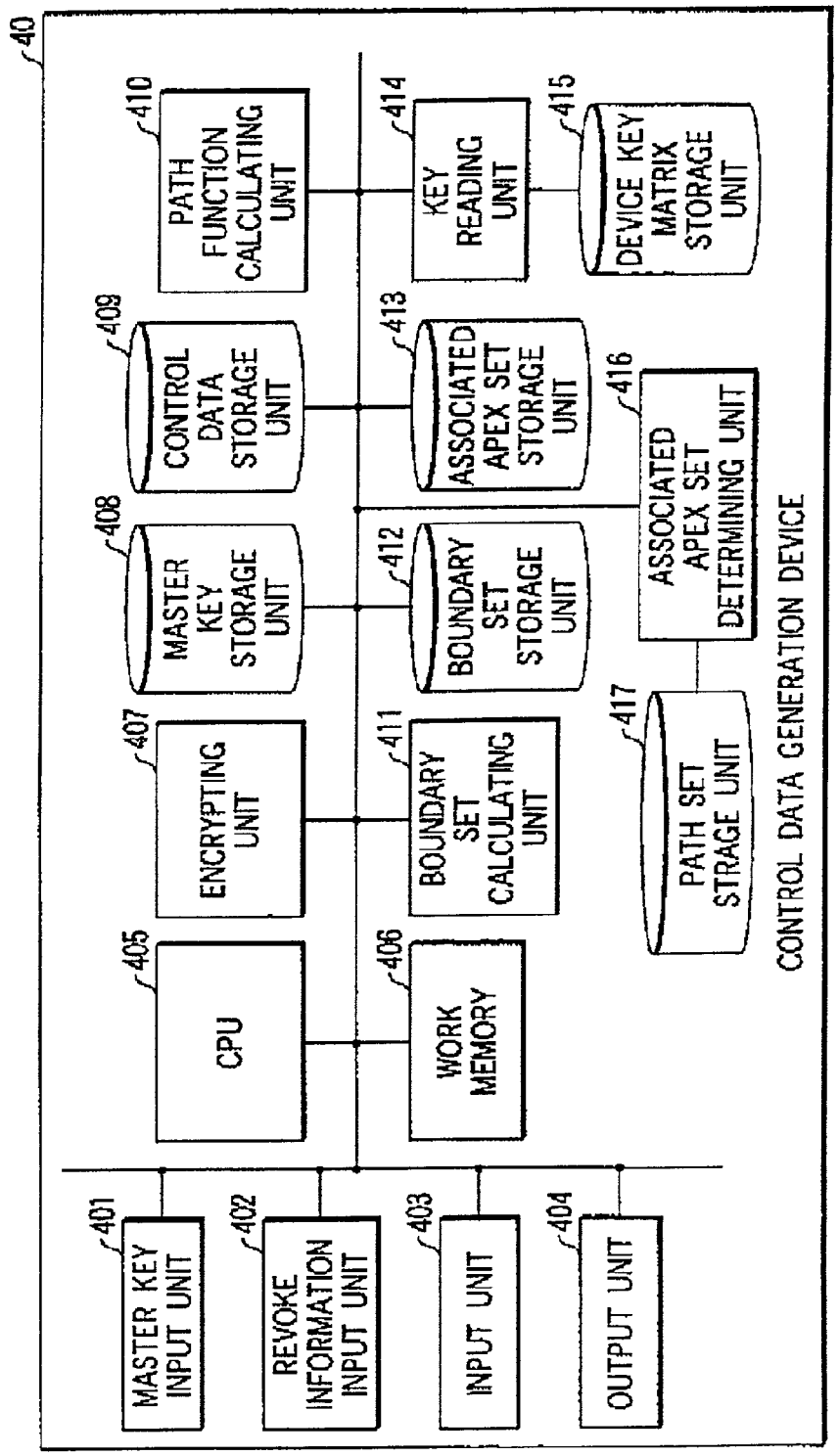
FIG. 31 is a block diagram showing a control data generating device according to a second embodiment of the present invention.
Figure 39:
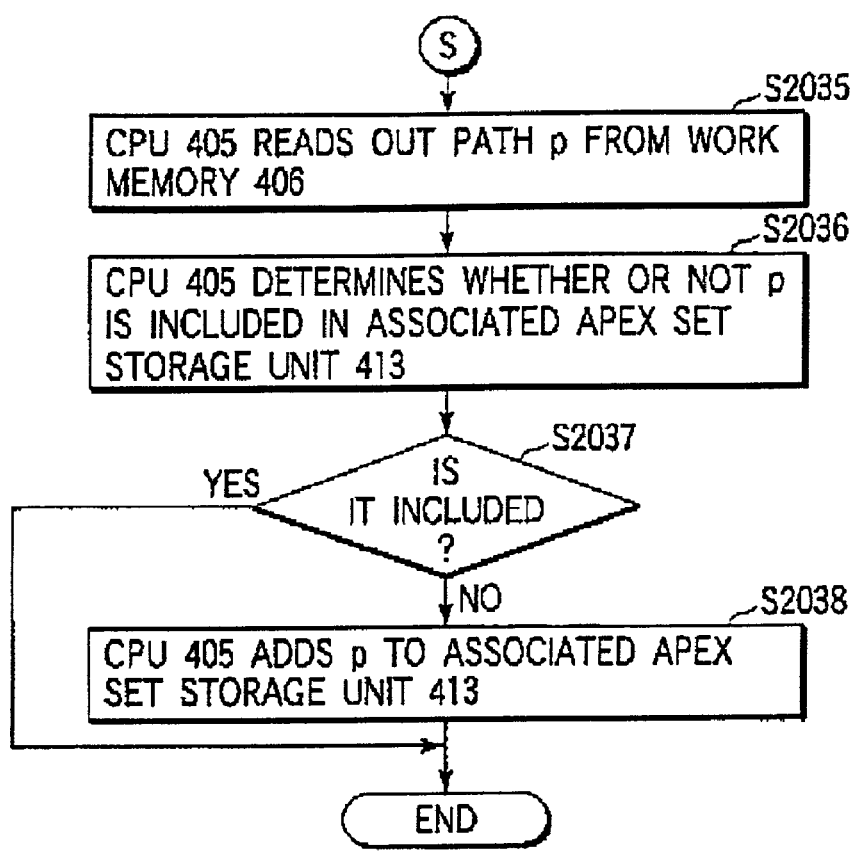
Figure 40:
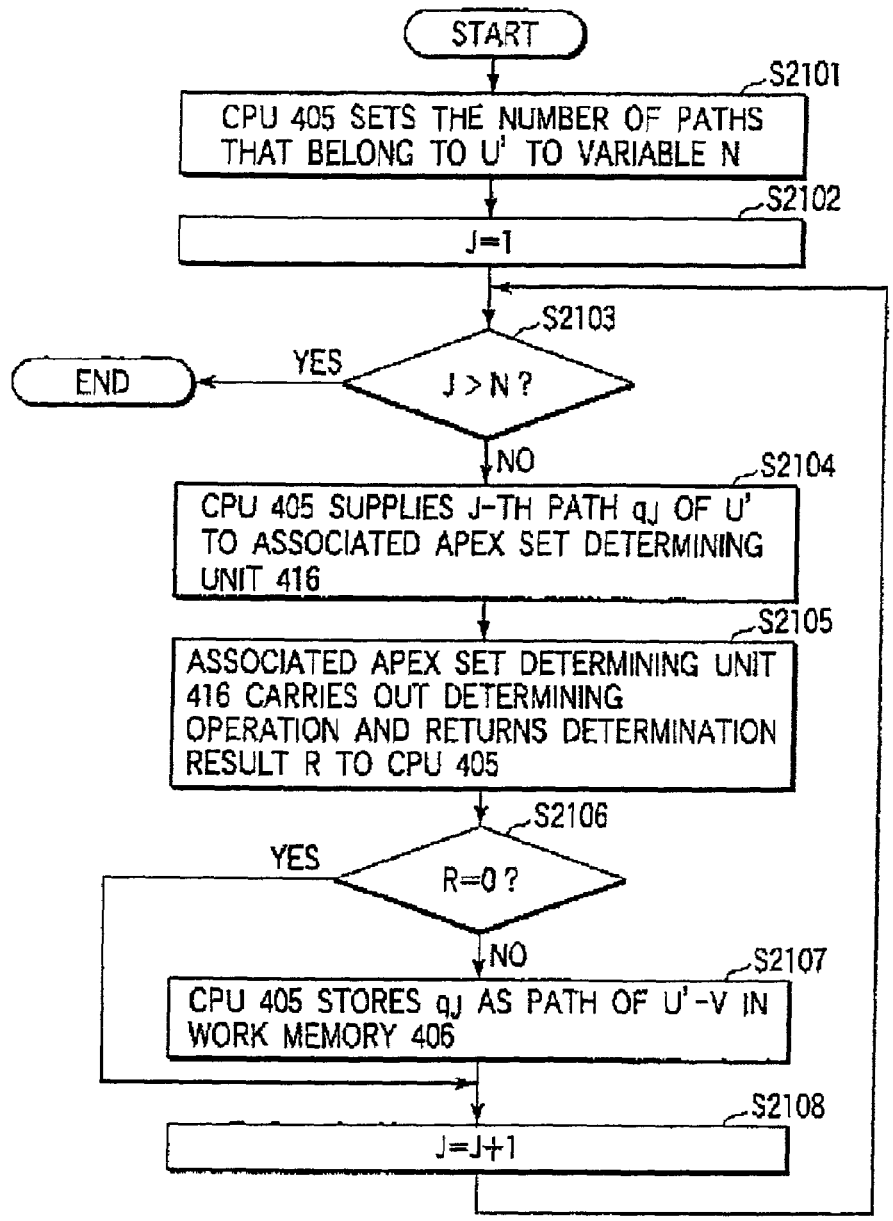
Figure 41:
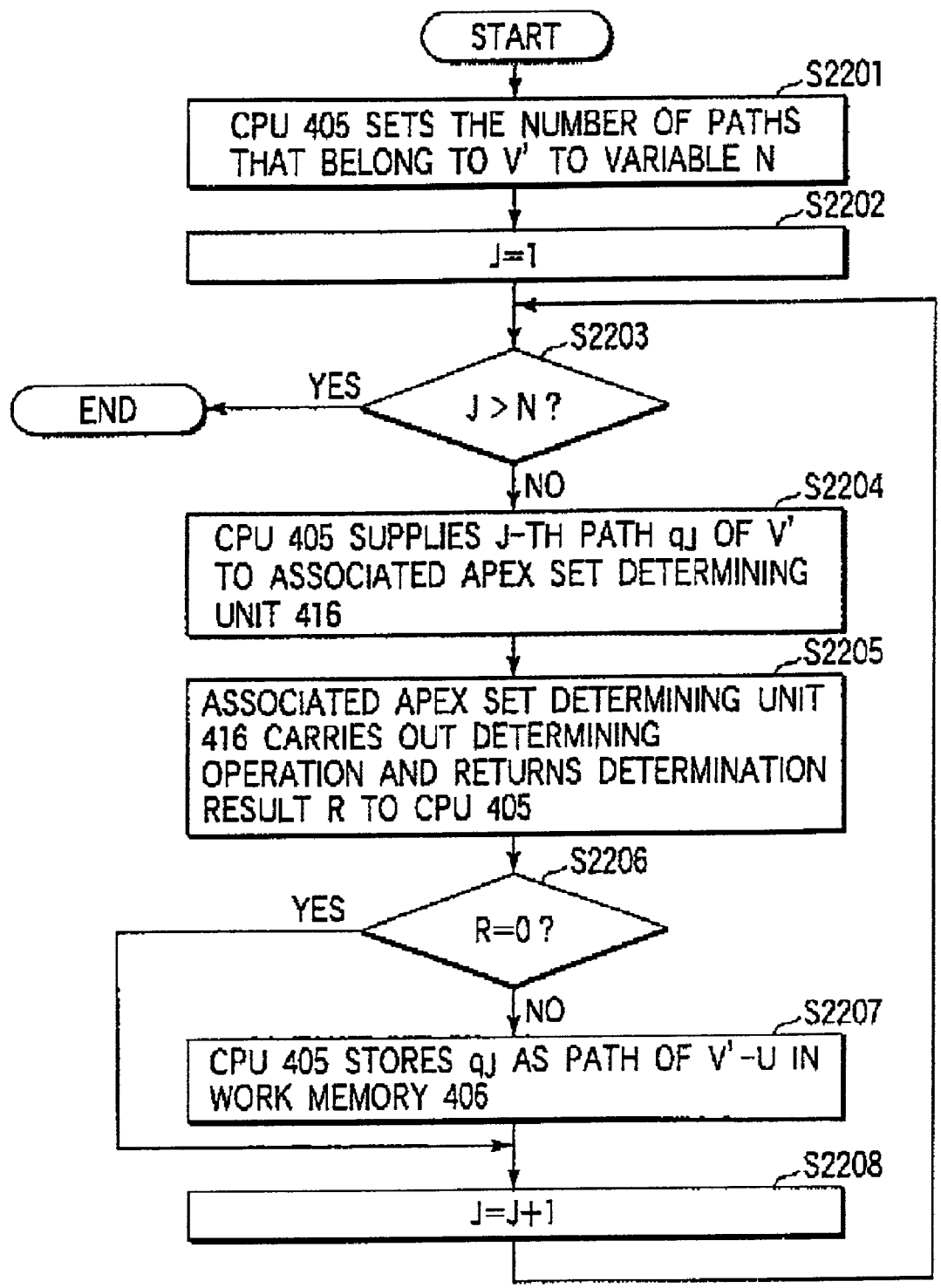
Figure 42:
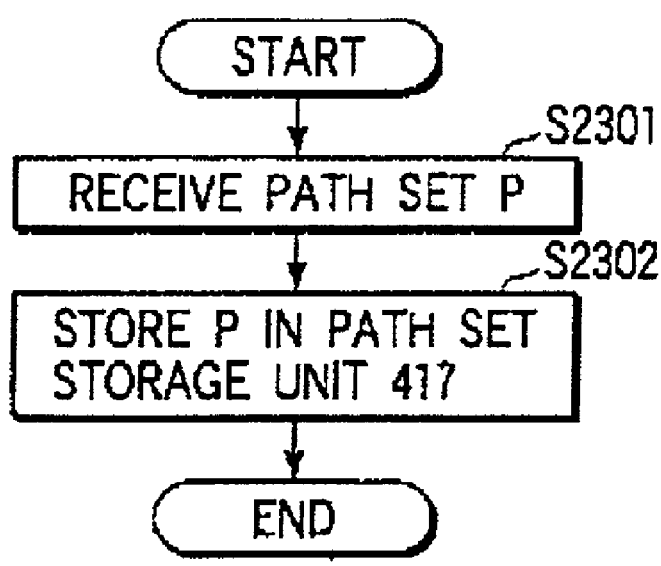
Figure 43:
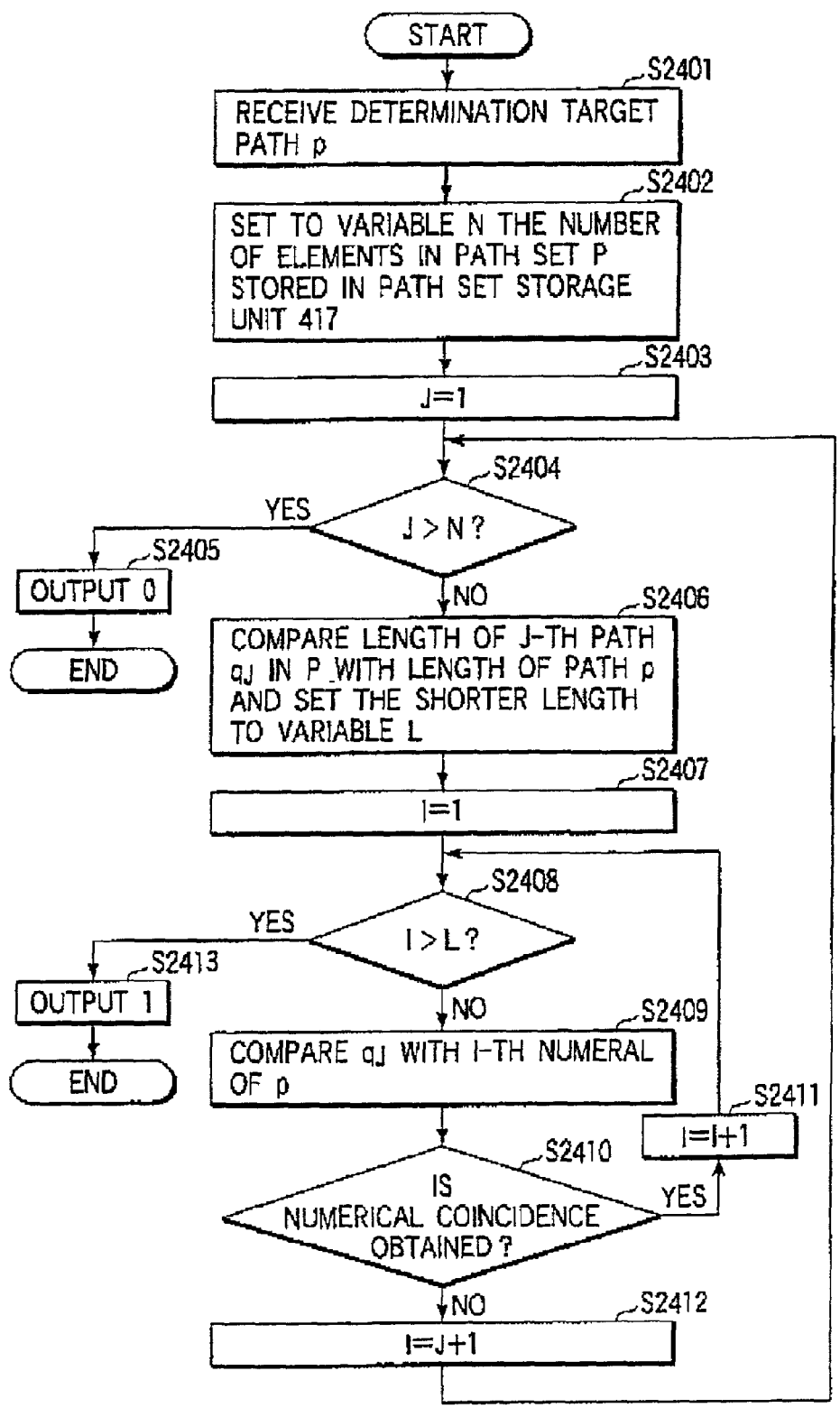

FIG; 38 is a flowchart showing a fourth portion of the operation of the control data generating device when the second revoke target device or later is specified;

FIG. 39 is a flowchart showing a last portion of the operation of the control data generating device when the second or later revoke target device is specified;

FIG. 40 is a flowchart showing an operation when an associated apex set determining unit 416 of the control data generating device of FIG. 31 obtains a difference set U'–V;

FIG. 41 is a flowchart showing an operation when the associated apex set determining unit 416 of the control data generating device of FIG. 31 obtains a difference set V'–U;

FIG. 42 is a flowchart showing an operation when the associated apex set determining unit 416 of the control data generating device of FIG. 31 determines a path set; and FIG. 43 is a flowchart showing an operation when the associated apex set determining unit 416 of the control data generating device of FIG. 31 determines a path set.

DETAILED DESCRIPTION OF THE INVENTION

An embodiment of a device information generating device, a device information generating method, a control data generating device, a control data generating method, a content utilizing device, and a content utilizing method according to the present invention will now be described with reference to the accompanying drawings.

Figure 5:
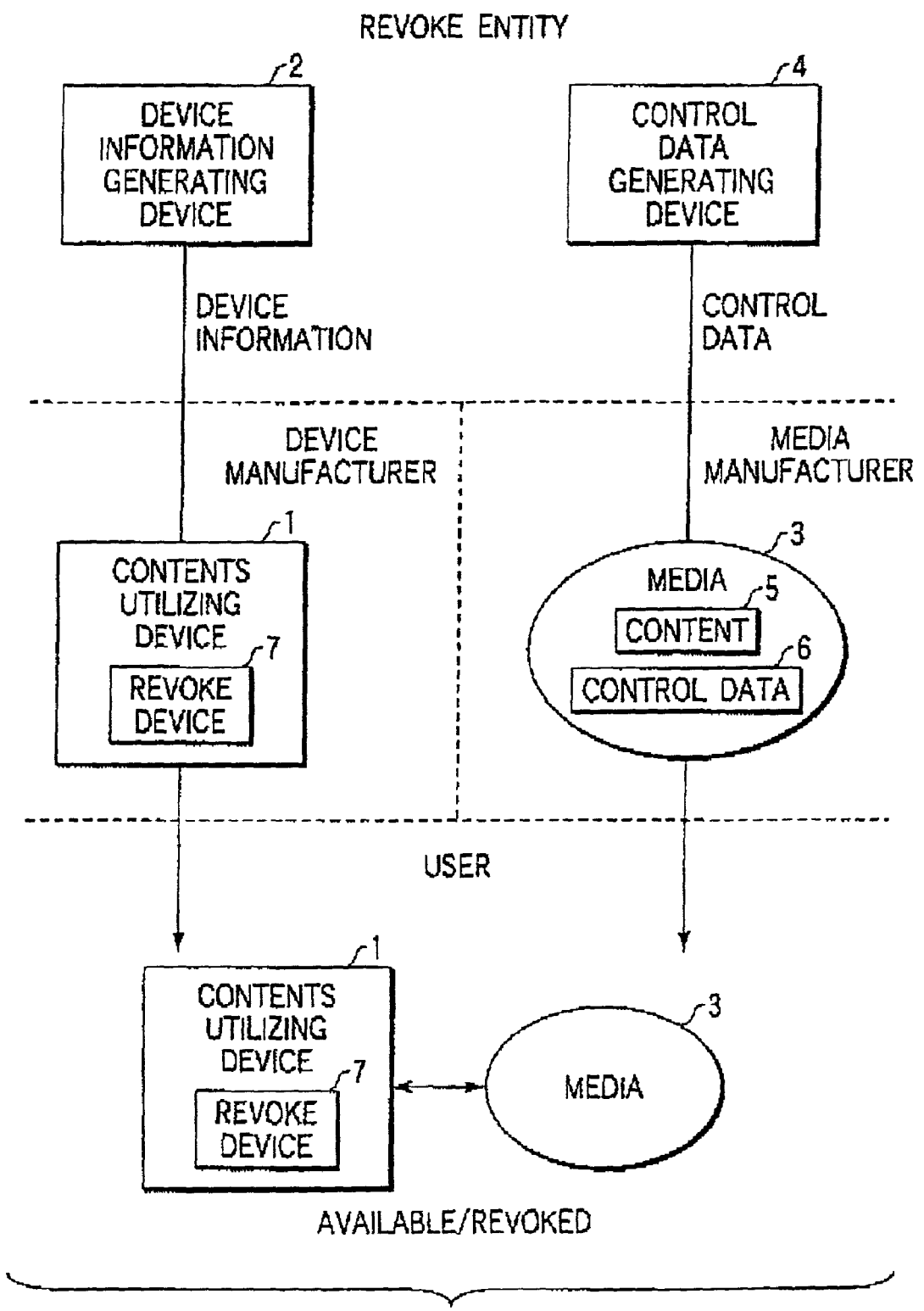
FIG. 5 is a block diagram showing an entirety of a content utilization system according to the present invention.

Prior to a detailed description of the present embodiment, first, an outline of an entire system according to the present embodiment will be intuitively described by referring to FIG. 5. A content utilization control system according to the present embodiment comprises a content utilizing device (media player) 1; a device information generating device 2 which generates device information assigned to the content utilizing device 1; and a control data generating device 4 which generates control data 6 as utilization control data contained in a medium 3 that contains contents 5 supplied in an offline manner or on line manner. The content utilizing device 1 may be provided as hardware or software. The device information generating device 2 and the control data generating device 4 are used by a revoke entity. The revoke entity supplies the device information to a device manufacturer so as to be assigned to the content utilizing device 1. The revoke entity supplies the control data to a media manufacturer so as to be included in the media 3 as well as contents 5. The content utilizing device 1 includes a revoke unit 7 storing the device information, and selectively revokes utilization (reproduction) of the contents 5 according to the control data and the device information.

Hereinafter, a concept of revoke according to the present embodiment will be described. Each utilizing device is assumed to have assigned thereto an ID consisting of four numerals. Each numeral may have a value 0, 1, or 2. Therefore, in this case, a total number of IDs is $3^4=81$. As a revoke entity, a matrix KD with 3 rows and 4 columns is prepared. A component of KD is obtained as random numbers of non-negative integers generated by a random number generator or the like. A component of "i" rows and "j" columns in KD is expressed as $KD_{ij}$. KD is referred to as a device key matrix, and a component of the KD is referred to as a device key.

The revoke entity assigns a set of device keys to each device as follows.

Device keys $KD_{\rho1,1}$, $KD_{\rho2,2}$, $KD_{\rho3,3}$, and $KD_{\rho4,4}$ are assigned to a device having device ID $_{\rho1, \rho2, \rho3, \rho4}$.

For example, the following device keys are assigned to a device having its device ID 0201 assigned thereto.

$KD_{01}$, $KD_{22}$, $KD_{03}$, $KD_{14}$

Each device holds the thus assigned device keys together with ID.

In the meantime, in an initial state in which no device targeted for revoke exists, the revoke entity supplies the following control data as:

$$(0, Enc(KD_{01}, K)), (1, Enc(KD_{11}, K)), (2, Enc(KD_{21}, K)) \quad (1)$$

where Enc( ) is a function that indicates encrypting using a proper algorithm. Enc(w, X) represents a result obtained by encrypting plain text data X by a key "w". Here, an encrypting key, a plain text, and a cipher text are regarded as non-negative integers. The utilizing device is assumed as comprising a decrypting function Dec( ) that corresponds to Enc( ). In this case, (w, Enc(w, X))=X is met relevant to an arbitrary key "w" and data X.

K is a master key. K is information required for the utilizing device to utilize data. The control data in Eq. (1) is referred to as initial control data. The initial control data consists of three non-negative integers.

Now, it is considered that a device having device ID 1201 is revoked. At this time, the revoke entity produced the following control data in accordance with Eq. (1), and supplies it to a utilizing device.

$$(0, a(0)), (2, a(2)), ((1, 0), a(1, 0), ((1, 1), a(1, 1)),\\ ((1, 2, 1), a(1, 2, 1)), ((1, 2, 2), a(1, 2, 2)), ((1,\\ 2, 0, 0), a(1, 2, 0, 0), ((1, 2, 0, 2), a(1, 2, 0, 2) \quad \text{Eq. (2)}$$

where $a(x1)=Enc(PF(x1), K)$
$a(x1, x2)=Enc(PF(x1, x2), K)$
$a(x1, x2, x3)=Enc(PF(x1, x2, x3), K)$
$a(x1, x2, x3, x4)=Enc(PF(x1, x2, x3, x4), K)$.

Then, the following formula is obtained.

$$PF(x1)=KD_{x1, 1} PF(x1, x2)=KD_{x1, 1} \odot KD_{x2, 2} PF(x1,\\ x2, x3)=KD_{x1, 1} \odot KD_{x2, 2} \odot KD_{x3, 3} PF(x1, x2,\\ x3, x4)=KD_{x1, 1} \odot KD_{x2, 2} \odot KD_{x3, 3} \odot KD_{x4, 4} \quad \text{Eq. (3)}$$

where $x \odot y$ represents an exclusive OR when "x" and "y" are expressed in binary notation relevant to non-negative integers "x" and "y". The above function PF is referred to as a path function, The above control data is produced as follows.

One to four numerals are arranged as 1, 12, 120, and 1201 after sampled from the beginning of arrangement of numerals 1201. This arrangement is referred to as an apex set associated with device ID.

Next, with respect to respective elements of the above arrangement, numbers with their last numbers are changed to other numbers (any of 0, 1, and 2), and the changed numbers are listed. For example, where the last number is 2, the numbers whose last numbers are changed to 0 and 1 are listed, By this operation, arrangement of the subsequent numbers is obtained as follows.

$$0, 2, 10, 11, 121, 122, 1200, 1202 \quad \text{Eq. (4)}$$

The above Eq. (2) is one where values of function "a" having elements of arrangement of these numbers defined as variables are arranged. A method of producing the above data can be easily recognized by considering a tree structure.

Figure 6:
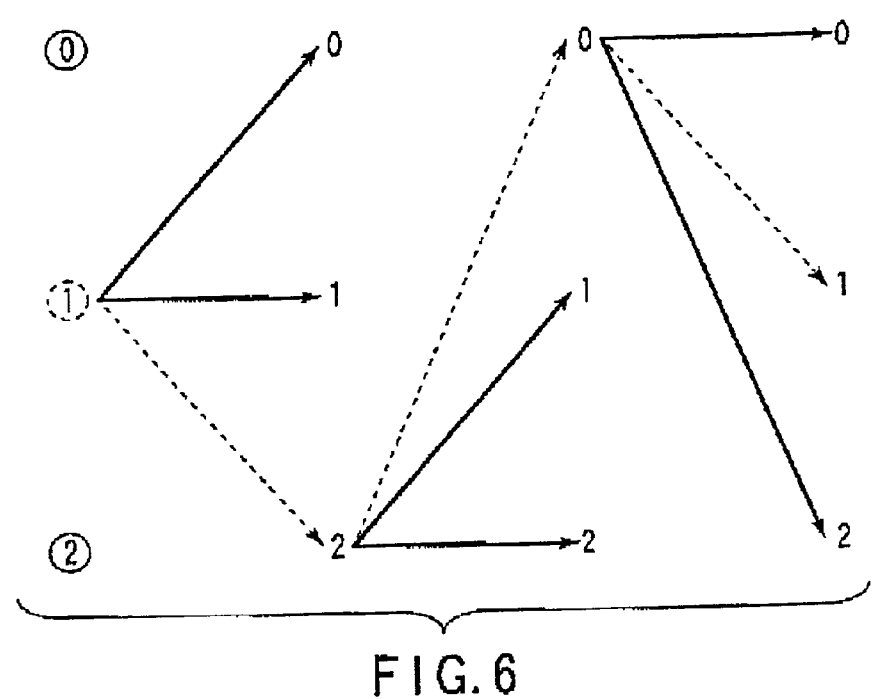
FIG. 6 is a view showing a revoke tree structure showing an apex set (dashed line) and a boundary set (solid line) associated with device ID 1201 of a utilizing device in order to explain a concept of the present invention.

In FIG. 6, the device number ID 1201 targeted for revoke corresponds to a path indicated by the broken line. In addition, a path of Eq. (4) is indicated by the solid line. Almost of these paths travel as indicated by the broken line, and only the last part thereof travels as indicated by the solid line. The broken line and solid line and the start/end points of FIG. 6 each form so called three trees. These threes are referred to as revoke trees of the device ID 1201.

What is important is that a path passing all of the four columns must pass the solid line anywhere other than the path indicated by the broken line and corresponding to the device ID 1201. A set of paths of Eq. (4) is referred to as a boundary set of the device ID 1201. An apex set of the revoke trees of the device ID 1201 is a sum set of an apex set associated with the device ID and a boundary set of the device ID 1201. For the control data of Eq. (2), a non-negative integer value is associated with each of the paths that belong to the boundary set of the device ID 1201. This association is referred to as a revoke function. In this example, "a" is a revoke function.

Processing of a utilizing device having read the control data of Eq. (2) will he described here. It is assumed that a device ID of the utilizing device is 1211. First, the utilizing device determines whether or not a path 1 obtained by sampling one number from the beginning of the device ID is included in the control data. That is, it is determined whether the path 1 belongs to a boundary set of the device ID 1201. The control data includes a path 0 and a path 2 (and revoke function values assigned to these paths, respectively), but does not include the path 1. In this case, the utilizing device determines whether or not the path is included in the control data with respect to the path 1 and the path 2 obtained by sampling two numbers from the beginning of the device ID. In this way, the utilizing device travels the revoke trees of FIG. 6 sequentially along its own device ID.

When the utilizing device travels from a path (1, 2) to a path (1, 2, 1), it first passes through a branch of a revoke tree indicated by the solid line. That is, the path (1, 2, 1) belongs to a boundary set of the device ID 1201. Therefore, the path and revoke function values that correspond thereto are included in the control data. The utilizing device reads the revoke function value a(1, 2, 1), and calculates the following value.

$$Dec(PF(1, 2, 1), a(1, 2, 1)) \quad \text{Eq. (5)}$$

The utilizing device holds device keys $k_{11}$, $k_{22}$, $k_{13}$, and $k_{14}$ that have been assigned in advance. Thus, PF(1, 2, 1) can be calculated in accordance with Eq. (3). Therefore, the utilizing device can calculate the value of Eq. (5) reliably. The value of Eq. (5) is equal to Dec(PF(1, 2, 1), Enc(PF(1, 2, 1), K)=K.

Accordingly, the utilizing device can utilize data by obtaining a master key K. That is, the device is not revoked.

On the other hand, it is assumed that the utilizing device has device ID 1201. In accordance with the same procedure as the above, the utilizing device travels the revoke trees of FIG. 6 sequentially. In the present case, however, the utilizing device does not travel the solid line of the revoke trees. All of a path 1, path (1, 2), path (1, 2, 0), and path (1, 2, 0, 1) travel only the broken line. Therefore, any path cannot find out the corresponding revoke function value in the control data. This device terminates the processing without obtaining the master key K. That is, this device is revoked.

Now, it is considered that a device having a device ID 1110 is revoked in addition to that having the device ID 1201. A sum set of an apex set associated with the device ID 1201 and an apex set associated with the device ID 1110 is referred to as an apex set associated with the device ID 1201 and the device ID 1110.

Further, a sun set of an apex set of revoke trees of the device ID 1201 and an apex set of revoke trees of the device ID 1110 is referred to as an apex set of revoke trees of the device ID 1201 and the device ID 1110. A set obtained by sampling the apex set associated with the device ID 1201 and the device ID 1110 from that associated with revoke trees of the device ID 1201 and the device ID 1110, is defined as a boundary set of the device ID 1201 and the device ID 1110.

Specifically, the apex set associate with the device ID 1110 is obtained as 1, (1, 1), (1, 1, 1), and (1, 1, 1, 0). Thus, the apex set associated with the device ID 1201 and the device ID 1110 is as follows.

1,
(1, 1), (1, 2),
(1, 1, 1), (1, 2, 0),
(1, 1, 1, 0), (1, 2, 0, 1)

In addition, the boundary set of the device ID 1110 is obtained as follows.

0, 2,
(1, 0), (1, 2),
(1, 1, 0), (1, 1, 2),
(1, 1, 1, 1), (1, 1, 1, 2)

Thus, the apex set of revoke trees of the device ID 1201 and the device ID 1110 is as follows.

0, 1, 2,
(1, 0), (1, 1), (1, 2),
(1, 1, 0), (1, 1, 1), (1, 1, 2), (1, 2, 0),
(1, 2, 1), (1, 2, 2),
(1, 1, 1, 0), (1, 1, 1, 1), (1, 1, 1, 2),
(1, 2, 0, 0), (1, 2, 0, 1), (1, 2, 0, 2)

Thus, the boundary set of the device ID 1201 and the device ID 1110 is as follows.

0, 2,
(1, 0),
(1, 1, 0), (1, 1, 2), (1, 2, 1), (1, 2, 2),
(1, 1, 1, 1), (1, 1, 1, 2), (1, 2, 0, 0)
(1, 2, 0, 2)

FIG. 7 illustrates an apex set and a boundary set associated with two device IDs 1201 and 1110. The apex set coincides with the entirety of paths that pass through sides indicated by the broken line. In addition, the boundary set coincides with the entirety of paths, the last part of which passes through the solid line after traveling the sides indicated by the broken line.

The utilizing device travels the revoke trees of FIG. 7 sequentially along its own device ID in accordance with the same procedure as that when one device ID is targeted for revoke.

It is assumed that device ID of a utilizing device is 1211. When processing of the utilizing device passes through the solid line when it moves from path (1, 2) to path (1, 2, 1). That is, in the completely same way as previously, the utilizing device can obtain the master key K by carrying out decode processing for the corresponding revoke function value which is included in control data. That is, the utilizing device is not revoked.

On the other hand, it is assumed that device ID of a utilizing device is 1110. Processing of control data by this utilizing device passes through only an apex set associated with the device ID 1110. The above processing does not pass through a path included in the boundary set of the device ID 1201 and the device ID 1110. Thus, the utilizing device cannot obtain a revoke function value, and therefore, cannot obtain the master key. That is, the utilizing device is revoked.

This applies to a case in which three or more devices are targeted for revoke. According to a method of utilizing a revoke tree of device ID, devices targeted for revoke can be revoked without causing a side affect of any mistake. Moreover, the size of the control data (the number of elements) does not exceed (the number of devices targeted for revoke)×(a length of device ID)×2.

It is also assumed that device IDs are revoked in group. For example, assume that device ID 12\*\* has been assigned to a certain utilizing device manufacturer. The asterisks "\*" denote a wild card (any of numerals 0, 1, and 2). In this case, the apex set associated with the device ID 12\*\* is obtained as follows.

1, (1, 2), (1, 2, \*), (1, 2, \*, \*)

The boundary set of (1, 2, \*, \*) is obtained as follows.

0, 2, (1, 0), (1, 1)

FIG. 8 illustrates an apex set and a boundary set associated with 12\*\*.

Accordingly, control data is assigned as follows.

(0, a(0)), (2, a (2)),
((1, 0), a(1, 0)), ((1, 1), a(1, 1))

Only a device having device ID 12\*\* is revoked based on this control data. Even when two or more groups are targeted for revoke, the control data is defined in the same way as when individual devices are revoked, whereby revoke free of any mistake is achieved.

The foregoing description assumes an example that consists of a boundary set defined by paths (group) targeted for revoke and a revoke function value on the set. A definition area for a revoke function is extended to an apex set associated with paths (group) targeted for revoke, whereby the definition area can be defined as a pair of an apex set of revoke trees and a revoke function value on the apex set.

In this case, although efficiency is lowered than that according to the above described example, the substantially same advantageous effect can be attained. The advantageous effect will be described by way of the above described example.

As in the previously described example, consider that a device having device ID 1201 is revoked. At this time, the revoke entity produces the following control data, and supplies it to a utilizing device:

$$(0, a(0)), (2, a(2)), ((1, 0), a(1, 0)), ((1, 1), a(1, 1)),\\((1, 2, 1), a(1, 2, 1)), ((1, 2, 2), a(1, 2, 2)), ((1, 2, 0, 0), a(1, 2, 0, 0)), ((1, 2, 0, 2), a(1, 2, 0, 2)), (1, b(1)), ((1, 2), b(1, 2)), ((1, 2, 0), b(1, 2, 0)), ((1, 2, 0, 1), b(1, 2, 0, 1))$$ Eq. (6)

where b(x1)=Enc(PF(x1), null)
b(x1, x2)=Enc(PF(x1, x2), null)
b(x1, x2, x3)=Enc(PF(x1, x2, x3), null)
b(x1, x2, x3, x4)=Enc(PF(x1, x2, x3, x4), null)

"null" is a numeral defined in advance, the numeral indicating that no master key is obtained. In this case, a revoke function value is assigned to a path indicated by the broken line of FIG. 6. A function defining such value is defined as "b".

Processing of the utilizing device is almost similar to that according to the previously described example, but is different therefrom only in method of checking control data. It is assumed that device ID of the utilizing device is 1211. First, the utilizing device reads from control data a revoke function value "b(1)" relevant to a path 1 obtained by taking one numeral from the beginning of device ID 1211, and calculates the following value.

Dec(RF(1), b(1))

This value is equal to the following:

Dec(PF(1), Enc(PF(1), null))=null

Therefore, in this case, the utilizing device repeats the same processing relevant to a path (1, 2) obtained by sampling two numerals from the beginning of device ID. When the utilizing device travels to path (1, 2, 1), first, it passes through the solid line revoke tree. The processing in this case is similar to the above except that the device key KD is obtained.

On the other hand, assume that the utilizing device has device ID 1201. In accordance with the same procedure as the above, the utilizing device travels the revoke tree of FIG. 6 sequentially along its own device ID. In this case, however, the device does not pass through the solid line of the revoke tree. All of the path 1, path (1, 2), path (1 2, 0), and path (1, 2, 0, 1) pass through only the solid line. Therefore, with respect to any path as well, "null" is merely obtained by decrypting the revoke function value. This device terminates processing without obtaining the master key K. That is, this device is revoked.

First Embodiment

Hereinafter, a first embodiment of the present embodiment will be described in detail.

Figure 9:
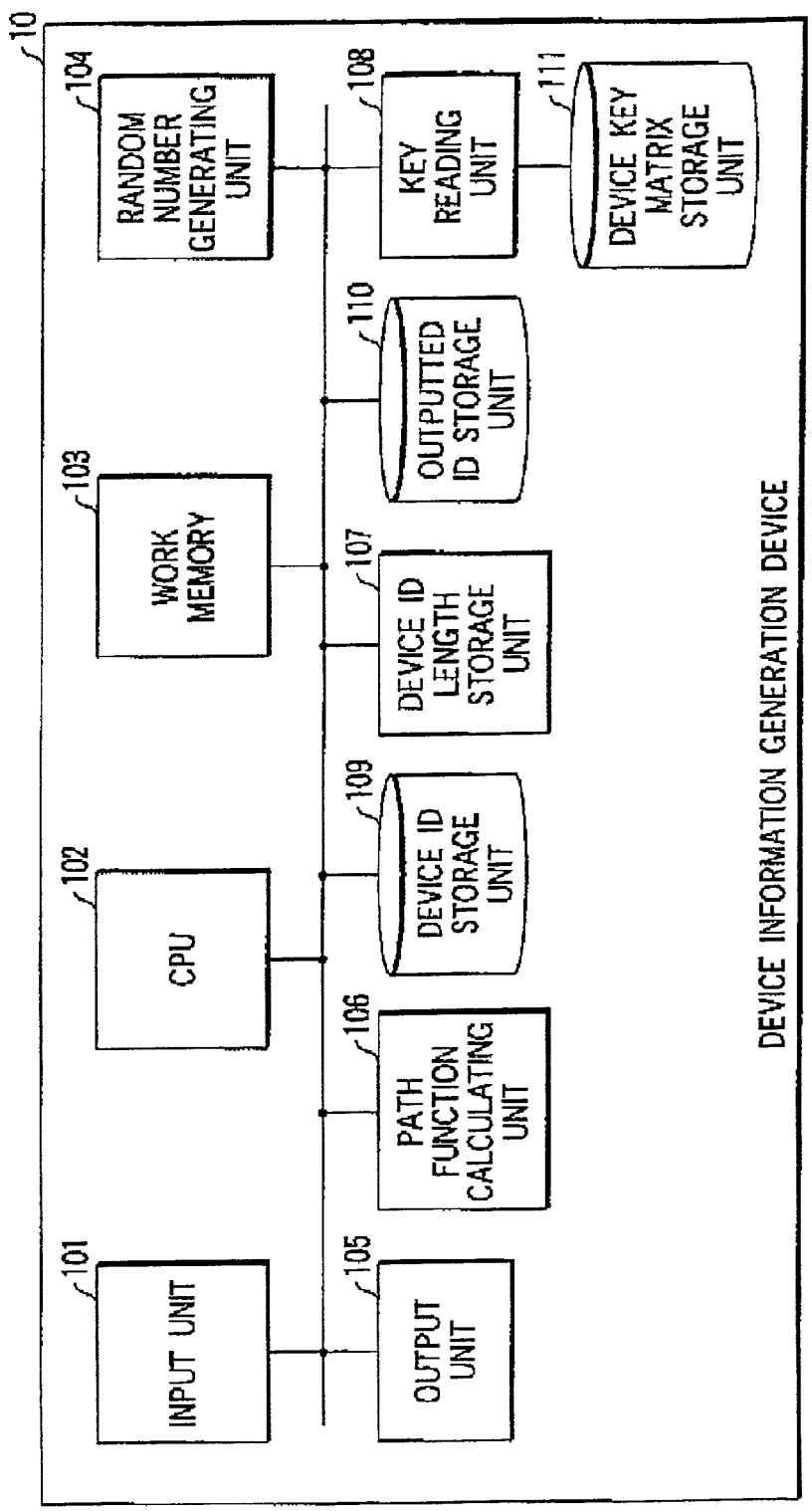
FIG. 9 is a block diagram showing a device information generating device according to a first embodiment of the present invention.

FIG. 9 shows a device information generating device 10 which generates a device information assigned to a utilizing device by a manufacturer of the utilizing device.

A revoke entity generates a device ID and an arrangement of device keys by using the device information generating device 10. If the device keys are assigned to each device 10, it is possible for such each device to calculate path functions. The device information generating device 10 according to the present embodiment is such that each device directly generates path functions instead of the device key arrangement. By doing this, each device 10 can eliminate inconvenience of calculating the path function value during a revoke processing.

Figure 10:
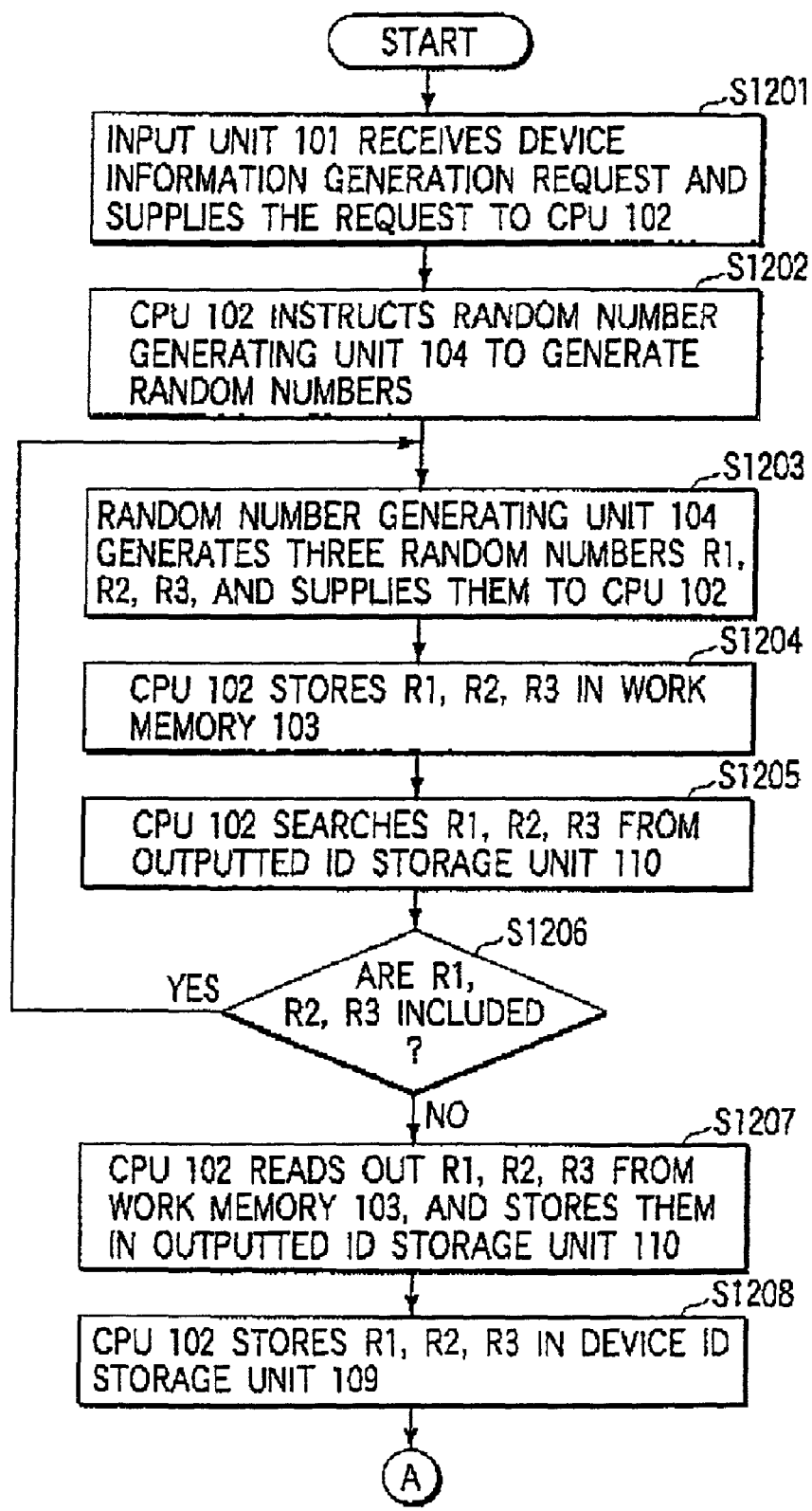
FIG. 10 is a flowchart showing a first portion of an operation of the device information generating device.
Figure 11:
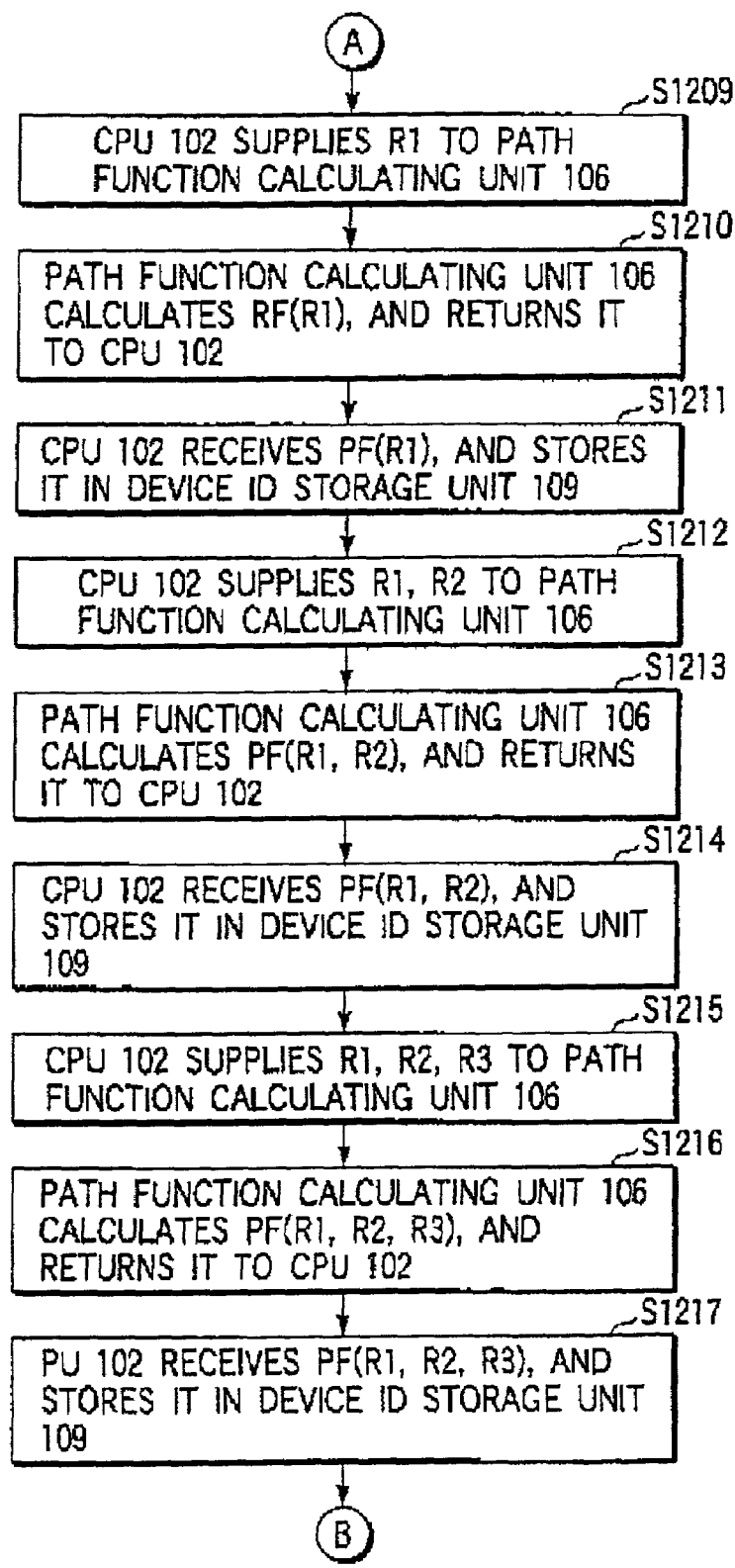
FIG. 11 is a flowchart showing a second portion of the operation of the device information generating device.
Figure 12:
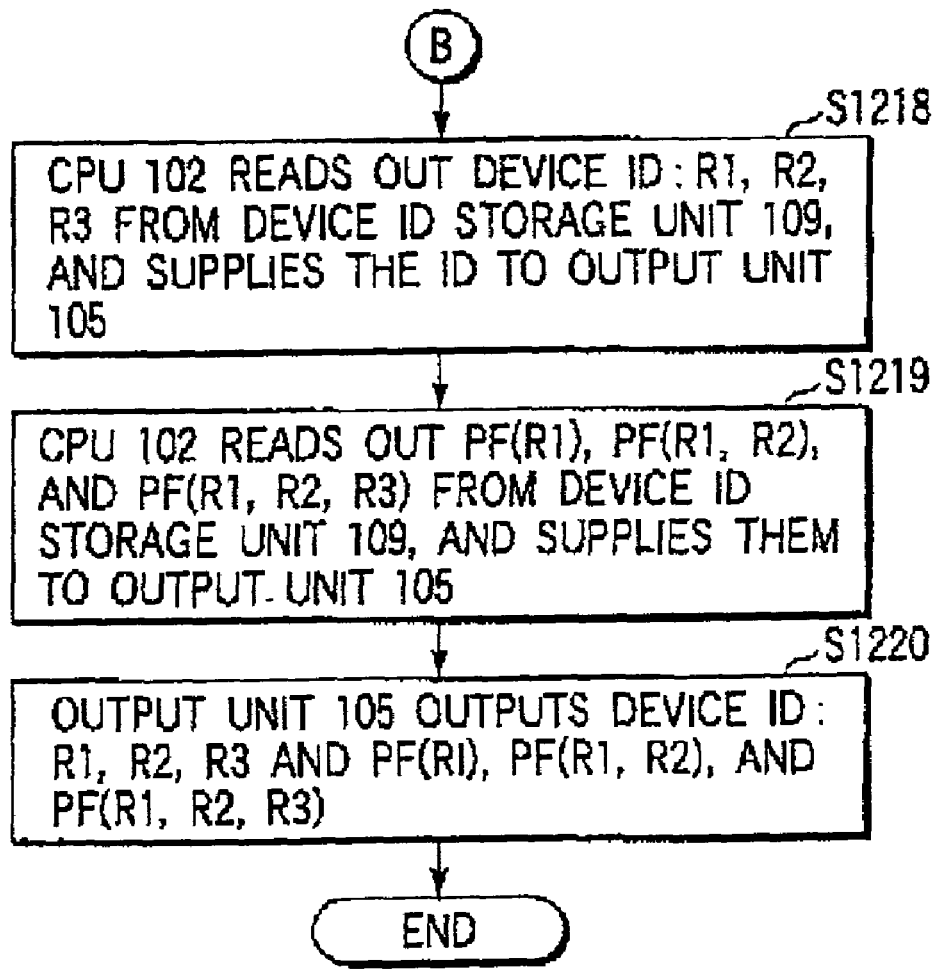
FIG. 12 is a flowchart showing a last portion of the operation of the device information generating device.

An exemplary operation of the device information generating device 10 will be described with reference to FIG. 10, FIG. 11, and FIG. 12. It is assumed that device ID is length 3 consisting of three numerals, each of which can be obtained as a value of 0, 1, or 2.

An input unit 101 receives a device information generation request, and supplies the request to a CPU 102 (S1201). When the CPU 102 instructs a random number generating unit 104 to generate a random number (S1202), the random number generating unit 104 generates a set of numbers (R1, R2, R3), and supplies it to the CPU 102 (S1203). The CPU 102 stores the set of numbers (R1, R2, R3) in a work memory 103 (S1204).

The CPU 102 searches the set of numbers (R1, R2, R3) from an outputted ID storage unit 110 (S1205). This search determines whether or not (R1, R2, R3) is found out (S1206). When it is found, processing returns to the step S1203 at which a random number is generated again. Otherwise, the set of numbers (R1, R2, R3) is stored in the outputted ID storage unit 110 (S1207). Further, the set of numbers (R1, R2, R3) is stored in a device ID storage unit 109 as well (S1208).

The CPU 102 supplies R1 to a path function calculating unit 106 (S1209), and the path function calculating unit 106 calculates a value of PF(R1) (S1210). The CPU 102 stores the calculated value of PF(R1) to the device In storage unit 109 (S1211).

The CPU 102 supplies R1, R2 to the path function calculating unit 106 (S1212), and the path function calculating unit 106 calculates a value of PF(R1, R2) (S1213). The CPU 102 stores the calculated value of PF(R1, R2) in the device ID storage unit 109 (S1214).

Similarly, the CPU 102 supplies the set of numbers (R1, R2, R3) to the path function calculating unit 106 (S1215), and the path function calculating unit 106 calculates a value of PF(R1, R2, R3) (S1216). The CPU 102 stores the calculated value of PF(R1, R2, R3) in the device ID storage unit 109 (S1217).

The CPU 102 reads out a device ID (R1, R2, R3) from the device ID storage unit 109, and supplies it to an output unit 105 (S1218). In addition, the CPU 102 reads out the path function values PF(RF1), PF(R1, R2), and PF(R1, R2, R3) from the device ID storage unit 109, and supplies them to the output unit 105 (S1219). Thus, the output unit 105 outputs the device ID (R1, R2, R3) and path function values PF(RF1), PF(R1, R2), and PF(R1, R2, R3) (S1220)

A path R1, path (R1, R2), path (R1, R2, R3) may be referred to as a partial path of the device ID (R1, R2, R3). The partial path corresponds to an apex set associated with device ID. In the present embodiment, the path function value relevant to each partial path is obtained as follows.

$PF(R1)=Enc(k_{R1,1}, 1)$
$PF(R1, R2)=Enc(k_{R2,2}, k_{R1,1})$
$PF(R1, R2, R3)=Enc(k_{R3,3}, k_{R2,2}, k_{R1,1})$ where $k_{01}, k_{02}, k_{03}$
$k_{11}, k_{12}, k_{13}$
$k_{21}, k_{22}, k_{23}$ are components of the device key matrix KD, and generated in advance by a random number generator, and are stored in a device key matrix storage unit 111.

Figure 13:
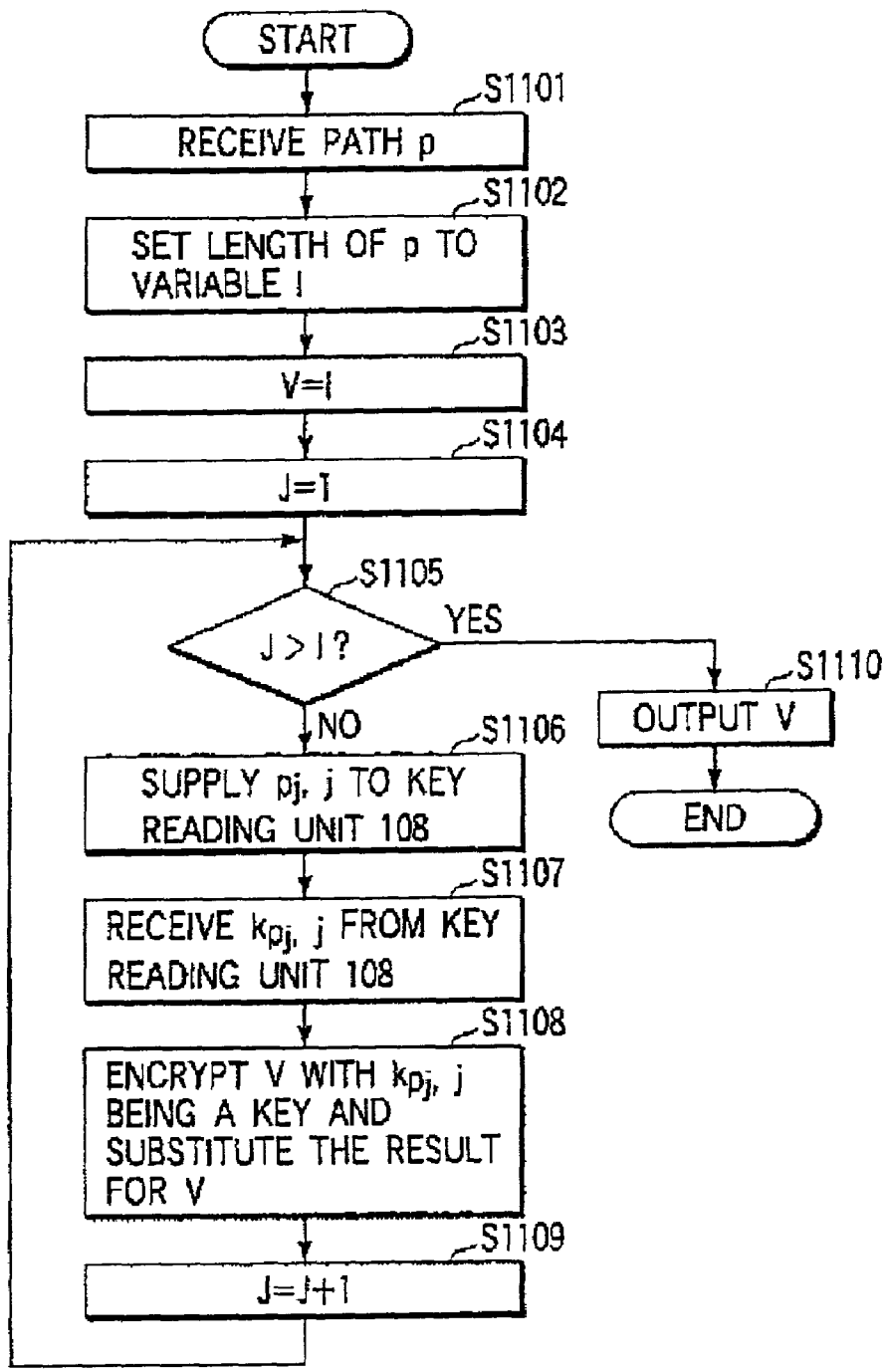
FIG. 13 is a flowchart showing an operation of a path function calculating unit 106 of the device information generating device of FIG. 9.

In an exemplary operation of the device information generating device 10 described above, path "p" in which a path function value should be calculated is inputted to the path function calculating unit 106 to be a path $p_1$, path $(p_1, p_2)$, or path $(p_1, p_2, p_3)$. Each $p_j$ (j=1, 2, 3) is numeral 0, 1, or 2. The path function calculating unit 106 calculates and outputs a value of $PF(p_1)$, $PF(p_1, p_2)$, or $PF(p_1, p_2, p_3)$ according to the inputted length of the path. An exemplary operation of this path function calculating unit 106 will be described by referring to FIG. 13.

A path "p" is received (P1101). The length of the "p" is initially set to variables 1, V=1, J=1, respectively (S1102 to S1104). It is determined whether or not J is greater than 1 (S1105). In this case, it is negatively determined because J=1, and numbers $p_j$, j are supplied to a key reading unit 108 (S1106). Numbers $k_{p_j, j}$ are received from the key reading unit 108 (S1107). With the received numbers being a key, V is encrypted, and the result is substituted for V (S1108). J is increased by 1 (S1109), and processing returns to the step S1105 at which a determination is made.

If it is determined that J is greater than 1 at the step S1105, a value of V is outputted (S1110), and operation of the path function calculating unit 106 terminates.

The device information generating device 10 receives a request for generating device information, and outputs a device ID (R1, R2, R3) and path function values PF1, PF2, and PF3. The ID and values are integers without sign. The path function value is defined depending on the device ID as is evident from the method of producing the value.

PF1=PF(R1)
PF2=PF(R1, R2)
PF3=PF(R1, R2, R3)

Figures 1, 2:
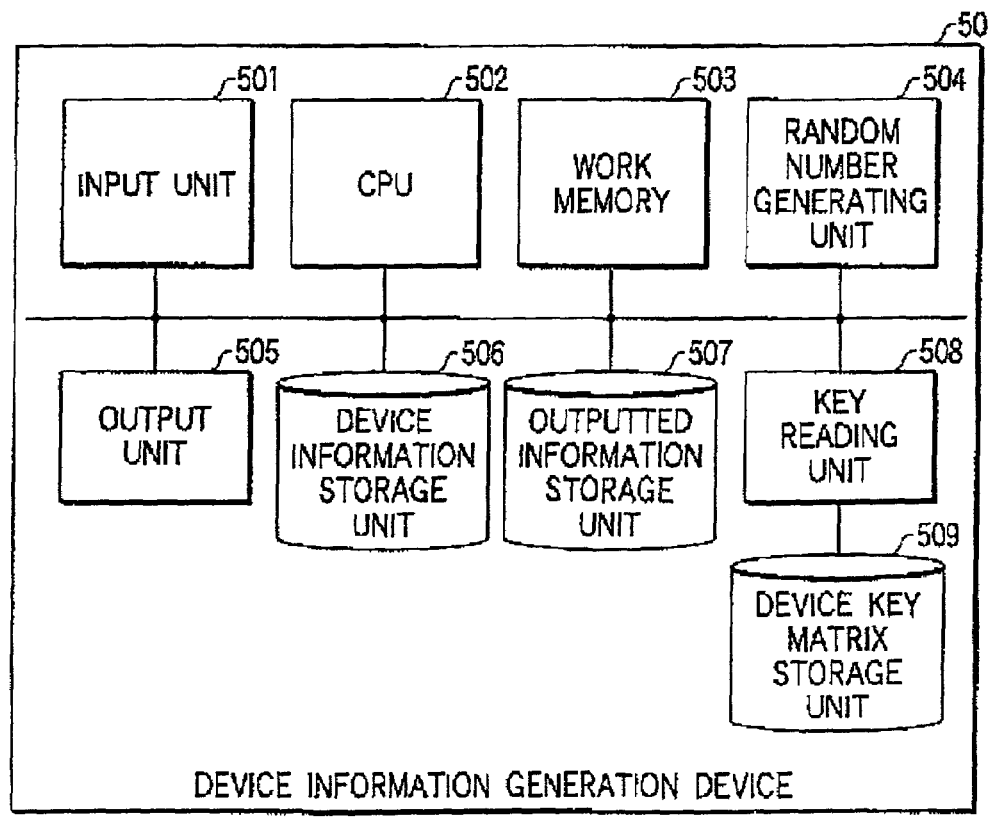
FIG. 1 is a view showing a media key block processing carried out by a conventional content utilizing device.
FIG. 2 is a block diagram showing a conventional device information generating device.
Figure 3:
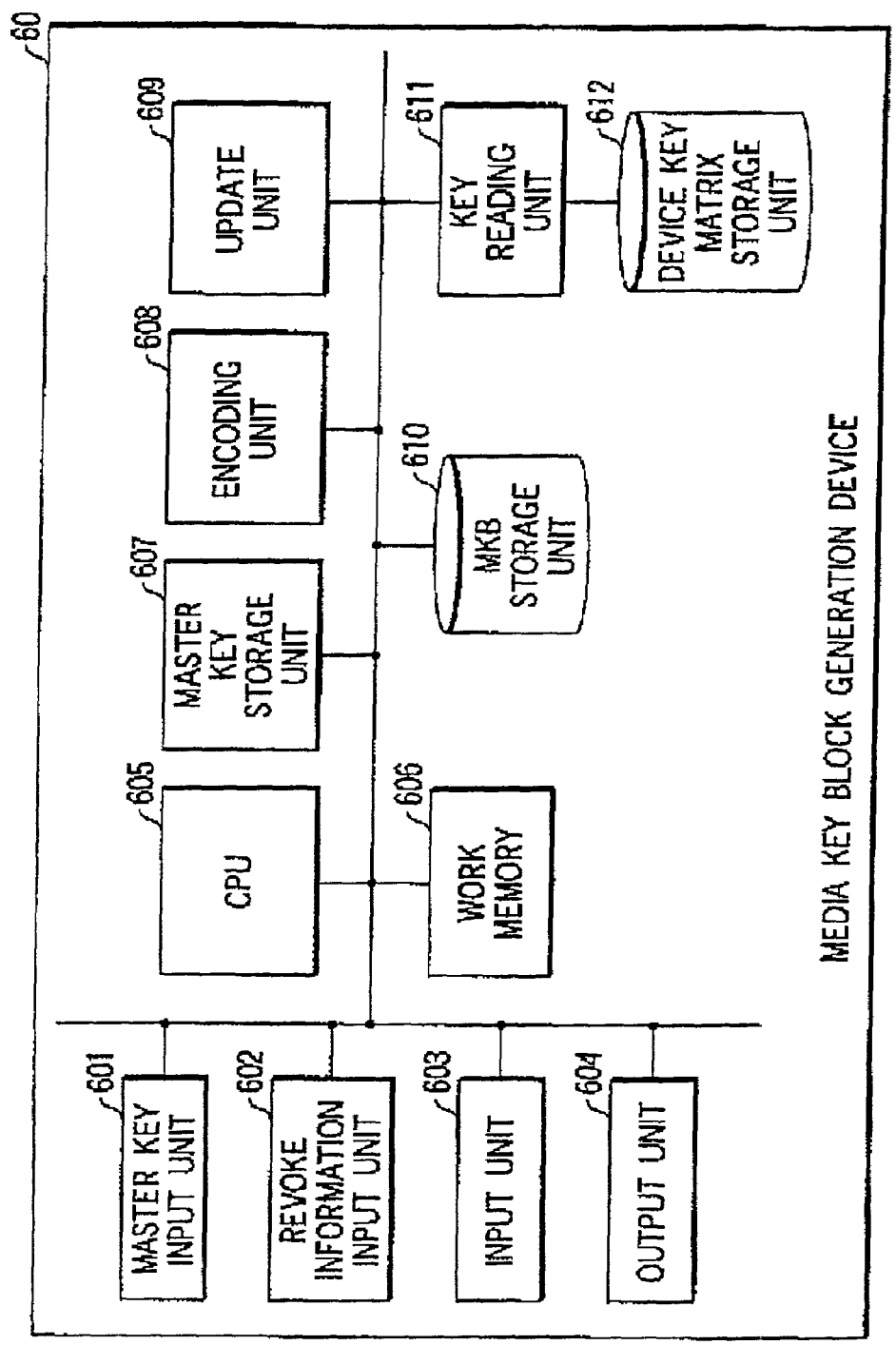
FIG. 3 is a block diagram showing a conventional media key block generating device.
Figure 4:
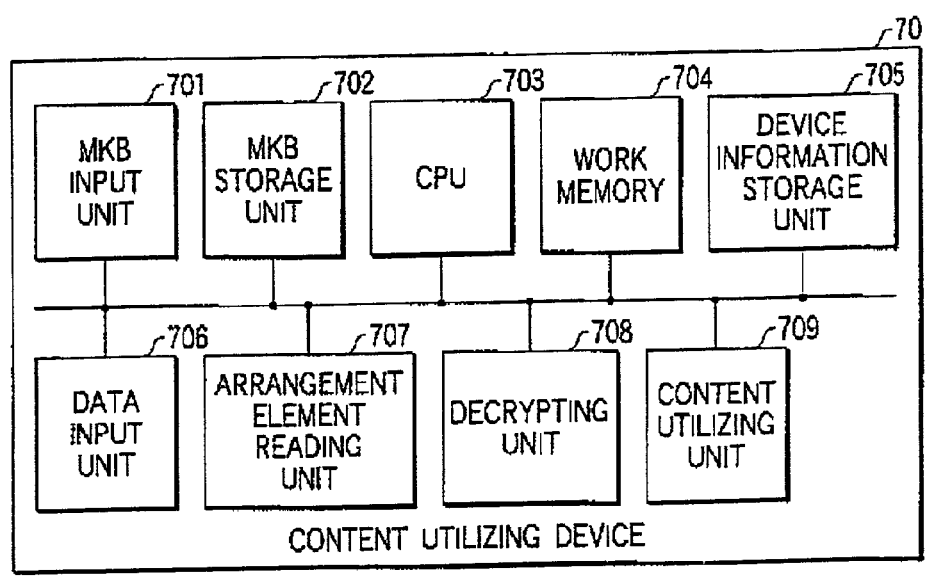
FIG. 4 is a block diagram showing a conventional content utilizing device.

The device information generating device 10 according to the present embodiment is compared with a device information generating device 50 in a media key block shown in FIG. 2. In the media lock block, no concept of path function exists. That is, in the media key block, whether or not the device ID is revoked is determined depending on only a component of the media key block through which the device ID passes. On the other hand, according to the present embodiment, the device ID regarded as a path is targeted for revoke. Thus, a value of the path function is utilized in order to identify numbers through which the device ID passes in the tree. According to the device information generating device 10 of the present embodiment, the followings are provided.

(1) The path function calculating unit 106 calculates a path function value relevant to a partial path produced by a part or all of the numerals included in device ID which is arrangement of numerals. The path function value is a numerical value determined depending on a plurality of components in a device key matrix that corresponds to the path.

(2) Together with device ID, a path function value that corresponds to a partial path of the device ID is outputted.

Figure 14:
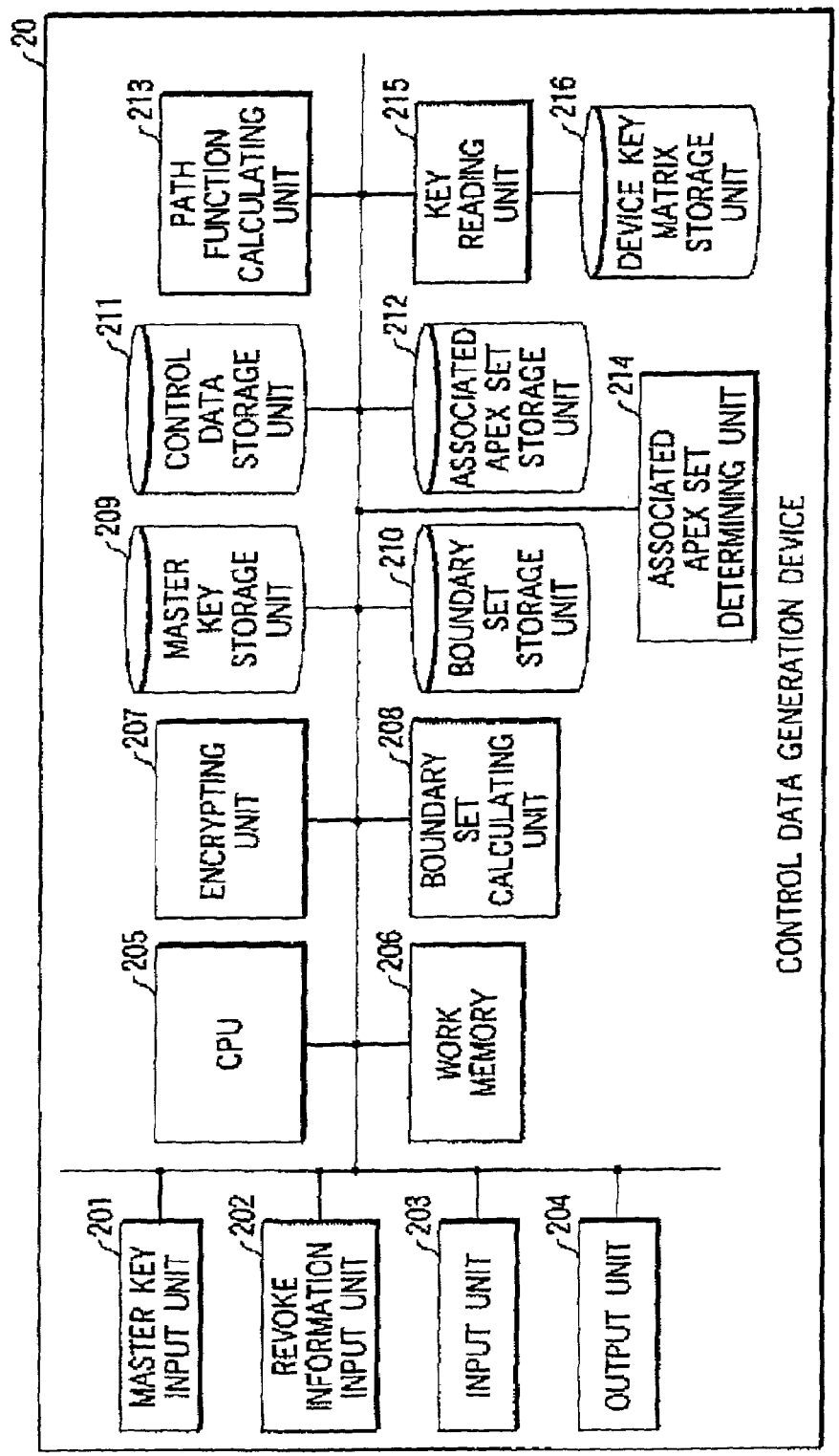
FIG. 14 is a block diagram showing a control data generating device according to the first embodiment of the present invention.

Now, a device 20 which generates control data added to a medium that contains contents will be described. FIG. 14 is a diagram showing a configuration of the control data generating device 20. The medium may be a storage medium such as CD-ROM or may be a communication medium such as Internet.

A device key matrix KD is stored in a device key matrix storage unit 216. This matrix is the same as a device key matrix KD used in the device information generating device 10.

Figure 15:
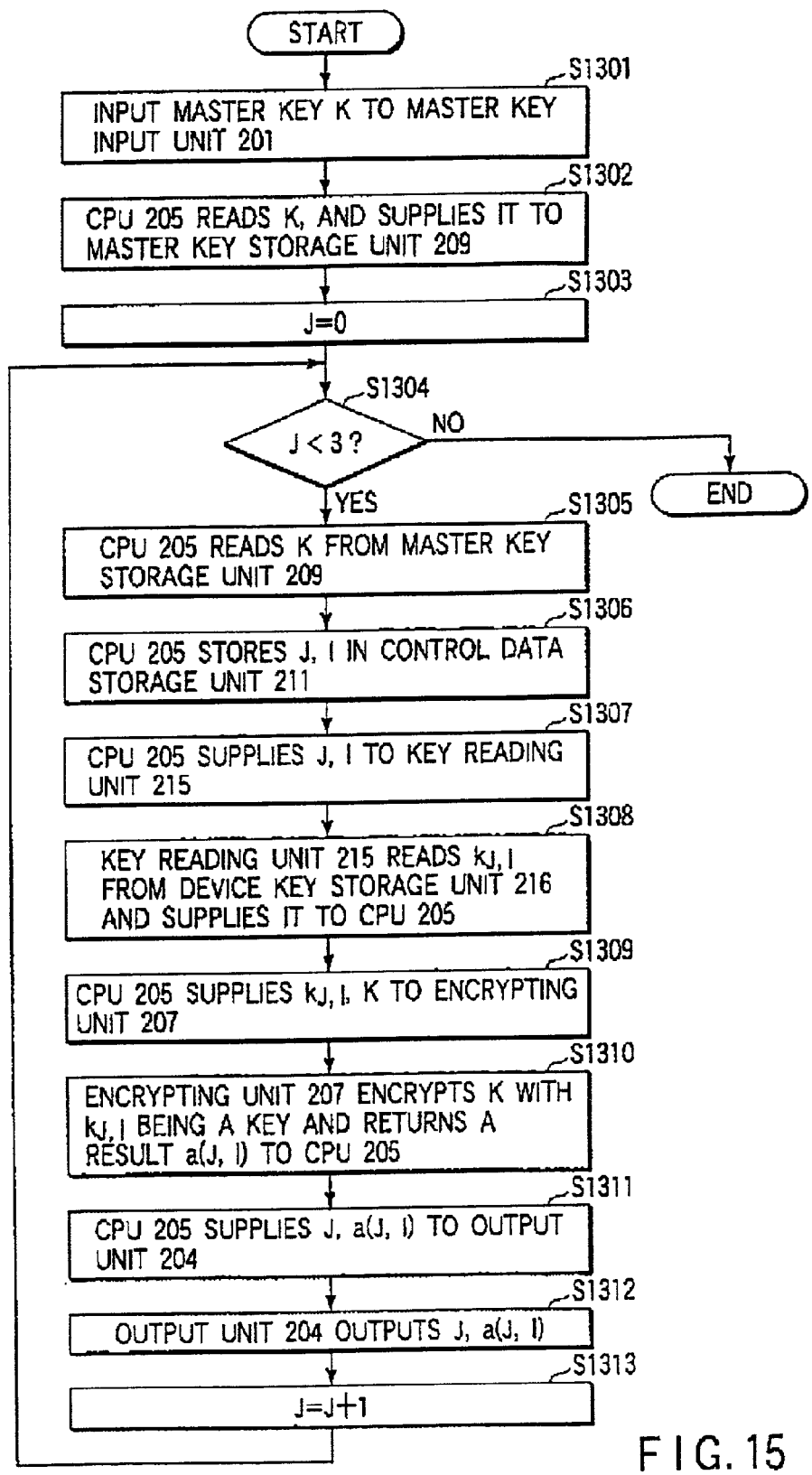
FIG. 15 is a flowchart showing an operation of the control data generating device in an initial state in which no revoke target device exists.

FIG. 15 shows an exemplary operation of the control data generating device 20 in an initial state in which no revoke target device exists.

A master key K is inputted by a master key input unit 201 (S1301). A CPU 205 supplies the inputted master key K to a master key storage unit 209 (S1302). J is initially set to 0 (S1303).

It is determined whether or not J is smaller than 3 (S1304), and the following processing is repeated until J has been 3 or more.

The CPU 205 reads the master key K from the master key storage unit 209 (S1305). The CPU 205 also stores J, 1 in a control data storage unit 211 (S1306). J, 1 are supplied to a key reading unit 205 (S1307).

The key reading unit 215 reads $k_{J,1}$ from the device key matrix unit 216, and supplies it to the CPU 205 (S1308). The CPU 205 supplies $k_{J,1}$ and K to an encrypting unit 207 (S1309).

The encrypting unit 207 encodes K by $k_{J,1}$, and supplies the obtained result a(J, 1) to the CPU 205 (S1310).

The CPU 205 supplies a path and (J, a(J, 1)) to an output unit 204 (S1311), and the output unit 204 outputs them (S1312).

J is increased by 1 (S1313), and processing returns to the step S1304. At the step S1304, the above repetition is stopped and terminated when J is 3 or more.

An output of the control data generating device 20 in an initial state is (0, a(0)), (1, a(1)), (2, a(2)), where 0, 1, and 2 each are a path (with length "1") is that consists of only one number. In addition, a(J) indicates Enc($k_{J,1}$, K).

A revoke target path is inputted to a revoke information input unit 202 in the form of numerical arrangement. (2, 0, 1), (1, 1) or the like is inputted to the revoke information input unit 202 as a revoke target path "p".

Figure 16:
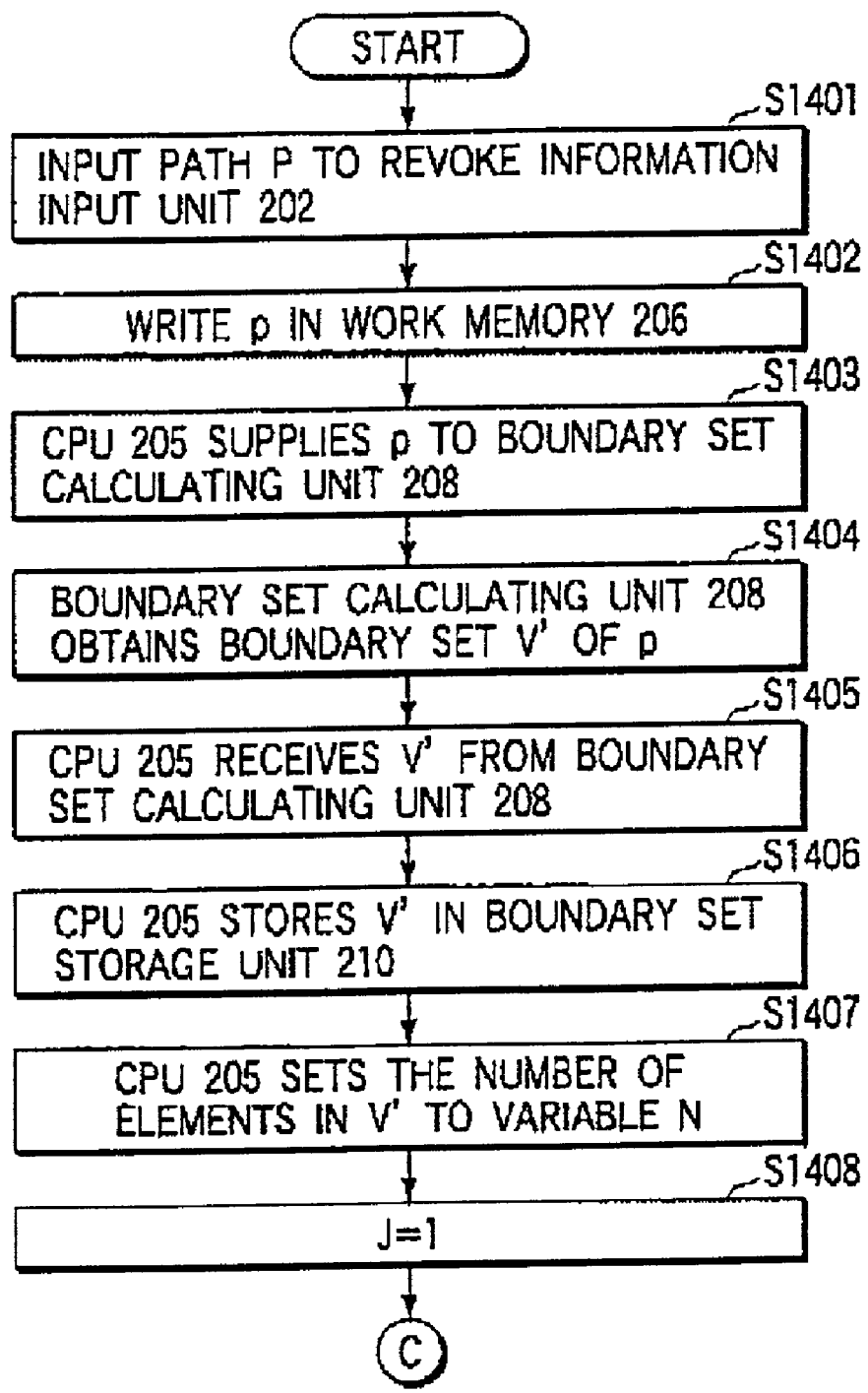
FIG. 16 is a flowchart showing a first portion of an operation of the control data generating device when a first revoke target device is specified.
Figure 17:
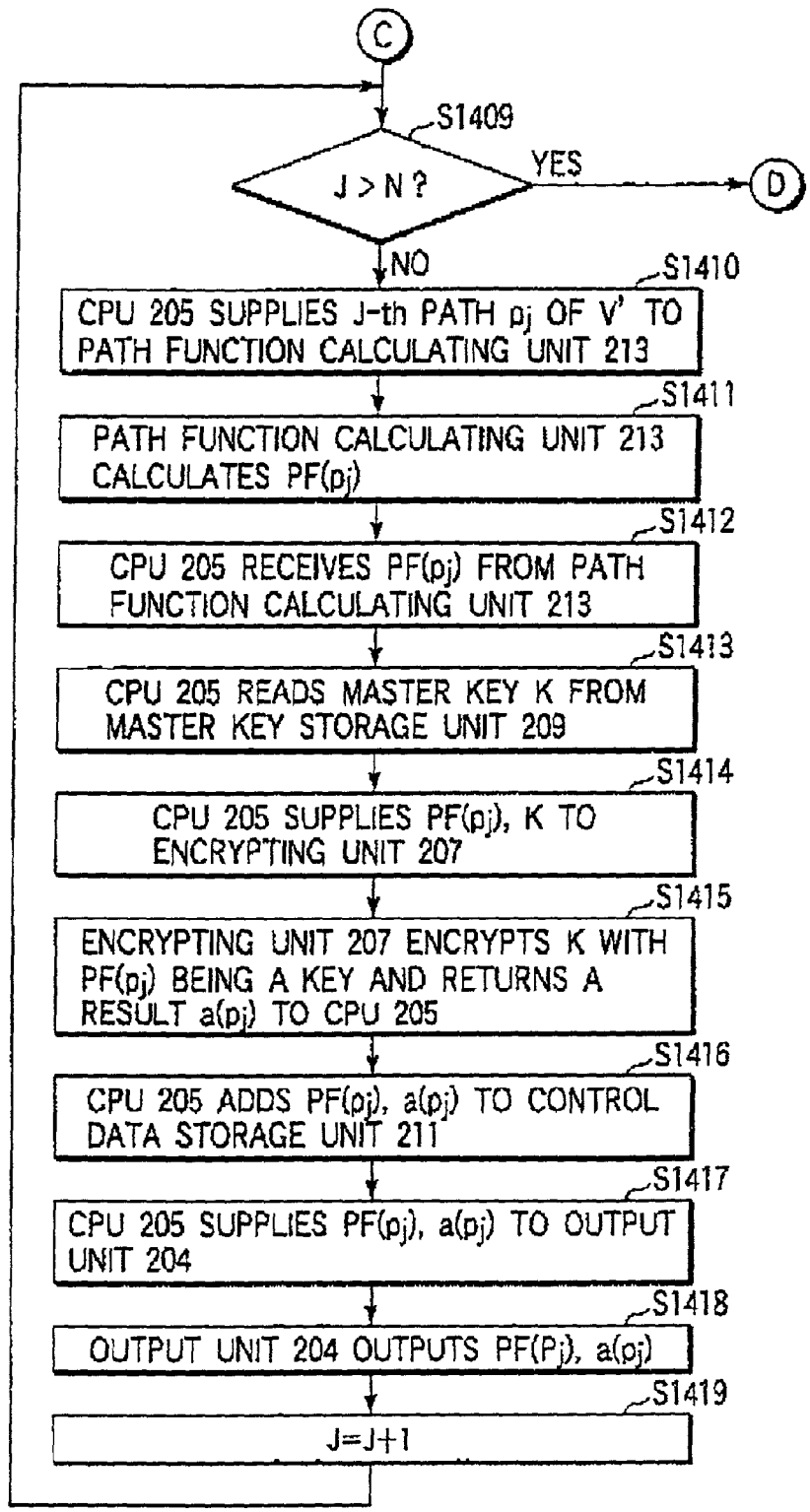
FIG. 17 is a flowchart showing a second portion of the operation of the control data generating device when the first revoke target device is specified.
Figure 18:
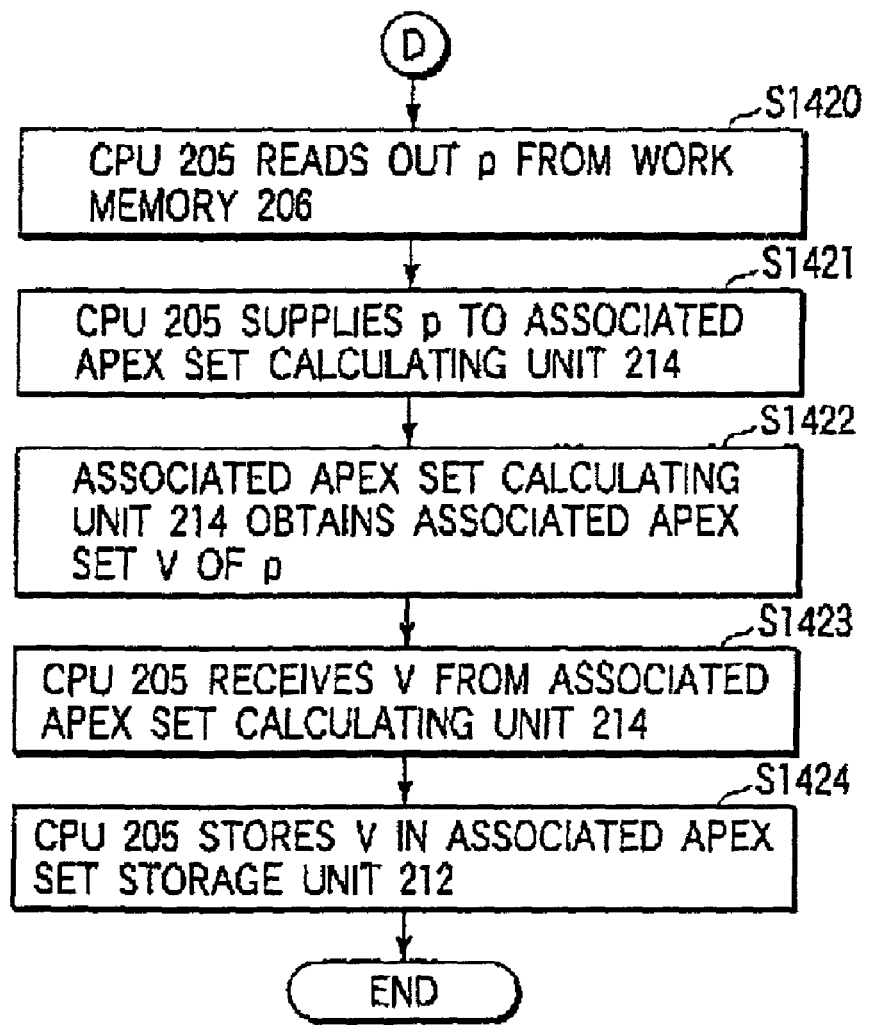
FIG. 18 is a flowchart showing a last portion of the operation of the control data generating device when the first revoke target device is specified.

Now, an operation when the revoke target path "p" is first inputted will be described with reference to FIG. 16, FIG. 17, and FIG. 18.

The path "p" is inputted to the revoke information input unit 202 (S1401), and the inputted path is written into a work memory 206 (S1402) The CPU 205 supplies "p" to a boundary set calculating unit 208 (S1403), and the boundary set calculating unit 208 obtains a boundary set V' of the "p" (S1404).

The CPU 205 having received the obtained boundary set V' stores V' in a boundary set storage unit 210 (S1406).

Next, the CPU 205 sets the number of elements in V' to variable N (S1407), and sets J to 1 (S1408).

Then, it is determined whether or not J is greater than N (S1409). If the determination result is negative, the steps S1410 to S1419 are executed. That is, the CPU 205 supplies a J-th path $p_J$ of V' to a path function calculating unit 213 (S1410).

The path function calculating unit 213 calculates a path function value $k_{p,J}$ in $p_J$ (S1411);

The CPU 205 receives $k_{p,J}$ from the path function calculating unit 213 (S1412).

The CPU 205 reads the master key K from the master key storage unit 209 (S1413).

The CPU 205 supplies a pair of numerals $k_{p,J}$, K to the encrypting unit 207 (S1414).

The encrypting unit 207 encodes K with $k_{p,J}$ being a key. The result $a(p_J)$ is returned to the CPU 205 (S1415).

The CPU 205 adds a path and a pair of numerals $p_J$, $a(p_J)$ to a control data storage unit 211 (S1416).

The CPU 205 supplies $p_J$, $a(p_J)$ to the output unit 204 (S1417).

The output unit 204 outputs $p_J$, $a(p_J)$ (S1418).

J is increased by 1 (S1419).

The above processing is repeated until J has been greater than N.

At the step S1409, where it is determined that J has been greater than N, the CPU 205 reads out "p" from the work memory 206 (S1420), and supplies it to an associated apex set calculating unit 214 (S1421). The associated apex set calculating unit 214 obtains an associated apex set V of the "p" (S1421), and the CPU 205 receives the set (S1423). The received associated apex set V is stared in an associated apex set storage unit 212 (S1424), and processing is terminated.

The above operation wall be described in more detail. At a time when a first revoke target path "p" is inputted, nothing is inputted to the boundary set storage unit 210 and associated apex set storage unit 212 of the control data generating device 20. Similarly, the contents of the control data storage unit 211 are empty. As described previously, control data itself exists in an initial state. Although the control data generating device 20 outputs the data in the initial state, the control data is not stored in the control data storage unit 211.

When the revoke target path "p" is inputted, the CPU 205 of the control data generating device 20 supplies "p" to the boundary set calculating unit 208. The boundary set calculating unit 208 obtains all the paths that belong to the boundary set of the "p", and returns them to the CPU 205. The boundary set of the "p" denotes a set of paths obtained by replacing with a different number the last number of each path included in a set of partial paths sampled from the beginning of the "p". For example, for a path p(2, 0, 1), a set of partial paths sampled from the beginning of the "p" is obtained as 2, (2, 0), (2, 0, 1). Thus, the boundary set is a set of paths of 0, 1, (2, 1), (2, 2), (2, 0, 0), (2, 0, 2).

The CPU 205 stores the path received from the boundary set calculating unit 208 in the boundary set storage unit 210.

Then, the CPU 205 obtains a revoke function value relevant to paths each belong to a boundary set. The revoke function "a" is defined for path x1, path (x1, x2), and path (x1, x2, x3) as follows.

$$a(x1)=\text{Enc}(PF(x1), K) \quad a(x1, x2)=\text{Enc}(PF(x1, x2), K)$$
$$a(x1, x2, x3)=\text{Enc}(PF(x1, x2, x3), K) \quad \text{Eq. (7)}$$

"a" of Eq. (7) is a revoke function concerning a path of length "l", where K is a master key, and PF is a path function. The value of PF in each path is calculated at the path function calculating unit 213. The path function calculating unit 213 in the control data generating device 20 is the same as the path function calculating unit 106 in the device information generating unit 10 of FIG. 9. The control data generating device 20 outputs all of paths each belonging to a boundary set and a pair of path function values in the path. The entirety of these pairs is obtained as control data relevant to the inputted revoke target path. For example, an output of the control data generating device 20 to the revoke target path p (2, 0, 1) is as follows.

(0, a(0)), (1, a (1)), ((2, 1), a(2, 1)), ((2, 2), a(2, 2)), ((2, 0, 0), a(2, 0, 0)), ((2, 0, 2), a(2, 0, 2)).

Next, the CPU 205 supplies the path "p" to the associated apex set calculating unit 214. The associated apex set calculating unit 214 obtains all the paths that belong to the associated apex set of the "p", and returns them to the CPU. The associated apex set of device ID (path p) denotes a set of partial paths sequentially sampled from the beginning of the "p". That is, the associated apex set of $p_1$, $p_2$, $p_3$ is a set of three paths of $p_1$, $(p_1, p_2)$, and $(p_1, p_2, p_3)$.

With respect to a path whose length is smaller than that of a device ID (3 in the present embodiment), the associated apex set is defined as follows.

The associated apex set of $p_1$ consists of all the paths that can be written in the form of $p_1$ and $(p_1, ?, ?)$. The associated apex set of $p_1$, $p_2$ consists of all the paths that can be written in the form of $p_1$, $(p_1, p_2)$, and $(p_1, p_2, ?)$. "?" is a wild card that represents an arbitrary number of 0, 1, or 2.

In short, the associated apex set of the path whose length is smaller than that of a device ID is partial paths of the path and the entirety of paths that can be written in the form that the wild card "?" is compensated until the length of device ID has been obtained. The apex set associated with device ID 201 consists of three paths, i.e., path 2, path (2, 0), and path (2, 0, 1).

In addition, for example, the associated apex set of path (1, 1) consists of five paths, i.e., a path 1, path (1, 1), path (1, 1, 0), path (1, 1, 1), and path (1, 1, 2).

The CPU 205 stores the path received from the associated apex set calculating unit 214 in the associated apex set storage unit 212.

The operation of the control data generating device 20 in an initial state and the operation of the control data generating device 20 when the revoke target path is first inputted, have been described above.

Now, an exemplary operation of revoking a second and later paths will be described with reference to the flowcharts of FIG. 19 to FIG. 23.

A path "p" is inputted to the revoke information input unit 202 (S1501) and the CPU 205 reads "p" and stores it in the work memory 206 (S1502). The CPU 205 supplies "p" to the boundary set calculating unit 208 (S1503). The boundary set calculating unit 208 calculates the boundary set V' of the "p" (S1504). The CPU 205 receives the calculated V', and stores it in the work memory 206 (S1505).

The CPU 205 supplies "p" to the associated apex set calculating unit 214 (S1506). The associated apex set calculating unit 214 calculates the associated apex set V of the "p" (S1507). The CPU 205 receives the calculated V, and stores it in the work memory 206 (S1508). The CPU 205 reads out a path set U' from the boundary set storage unit 210 (S1509). The CPU 205 obtains a difference set U'–V, and stores it in the work memory 206 (S1510). The CPU 205 deletes a path that is not included in U'–V and the corresponding revoke function value from the control data storage unit 211 (S1511).

Next, the CPU 205 reads out a path total U from the associated apex set storage unit 212 (S1512).

In addition, the CPU 205 reads out V' from the work memory 206 (S1513). The CPU 205 obtains a difference set V'–U, and stores it in the work memory 206 (S1514). The CPU 205 counts the number of paths included in V'–U, and sets the number of paths to variable N (S1515). Then, J is initially set to 1 (S1516).

Next, it is determined whether or not J is greater than N (S1517), and the following steps S1518 to S1528 are repeated until J has been greater than N.

That is, the CPU 205 supplies a J-th path $q_J$ of V'–U to the path function calculating unit 213 (S1518).

The path function calculating unit 213 calculates a path function value $PF(q_J)$ (S1519).

The CPU 205 receives $PF(q_J)$ (S1520).

The CPU 205 acquires the master key K from the master key storage unit 209 (S1521).

The CPU 205 supplies a pair of numerals $PF(q_J)$, K to the encrypting unit (S1522).

The encrypting unit encodes K by $PF(q_J)$, and obtains the encrypting result $a(q_J)$ (S1523).

The CPU 205 acquires $a(q_J)$ from the encrypting unit (S1524).

The CPU 205 determines whether or not a pair of path and number $(q_J, a(q_J))$ exists in the control data storage unit 211 (S1525). Only when it is determined that the pair exists, the CPU 205 adds $(q_J, a(q_J))$ to the control data storage unit 211 (S1527).

J is increased by 1 (S1528).

The above processing is repeatedly carried out until J has been greater than N.

At the step S1517, when J is increased, the CPU 205 then counts the number of elements in the path set V' on the work memory 206, and sets the number of elements to variable N (S1529). Then, J is set to 1 again (S1530).

Next, it is determined whether or not J is greater than N (S1531). If the determination result is negative, the CPU 205 determines whether or not the J-th path $q_J$ of V' exists in the boundary set storage unit 210 until J has been greater (S1532). Only when the check result is negative, the CPU 205 adds $q_J$ to the boundary set storage unit 210 (S1534).

Then, J is increased by 1, and processing returns to the step S1531.

At the step S1531, when J is greater than N, the processing similar to that executed at the step S1529 to the step S1535 is carried out for the path set V as well (S1536 to S1542). Then, processing is terminated.

An exemplary operation when two or more paths are revoked has been described above. This operation will be described in more detail.

At a time when a second or later revoke target path "p" is inputted, the boundary set (or its sum set) and the apex set calculated when the current control data is obtained are stored in the boundary set storage unit 210 and associated apex set storage unit 212, respectively, of the control data generating device 20. Similarly, the current control data is stored in the control data storage unit 211.

The control data generating device 20 first obtains a boundary set $V'_p$ of "p" and an associated apex set $V_p$ of "p". These sets are obtained by delivering path "p" to the boundary set calculating unit 208 and the associated apex set calculating unit 214, respectively. The CPU 205 stores $V'_p$ and $V_p$ in the work memory 206. Then, the control data generating device 20 carries out the following processings sequentially.

(a) The device reads out a set of paths from the boundary set storage unit 210, and writes only a path that is not included in $V_p$ in the work memory 206. Assuming a set of paths stored in the boundary set storage unit 210 is U', a path belonging to a difference set $U'-V_p$ is written in the work memory 206.

(b) The device checks the control data storage unit 211, and deletes a path that is not included in a path set $U'-V_p$ on the work memory 206 and a pair of revoke function values in the path.

(c) The device reads out a set U of paths from the associated apex set storage unit 212. Then, the device selects paths of path sets $V'_p$ on the work memory 206, sequentially. When the path is not included in U, the device copies the path to the work memory 206. By this processing, a difference set $V'_p-U$ is obtained on the work memory 206.

(d) The device obtains a revoke function value in the path relevant to each path that belongs to the path set $V'_p-U$ on the work memory 206. Then, the device adds each path that belongs to $V'_p-U$ and a pair of revoke function values in the path to the control data storage unit 211. At this time, no duplicate pair is added.

(e) The device adds a path included in $V'_p$ to the path set U' of the boundary set storage unit 210. At this time, no duplicate path is added. In this manner, the content of U' is changed to $U' \cup V'_p$.

(f) The device adds a path included it $V_p$ to the path set U of the associated apex set storage unit 212. At this time, no duplicate path is added. In this manner, the content of U is changed to $U \cup V_p$.

At a stage before carrying out the processings (a) to (d) described above, a set of paths stored in the control data storage unit 211 is defined as C. That is, assume that the control data storage unit 211 has stored each path included in C and a pair of revoke function values in the path. By carrying out the processings (a) to (d), the path set of the control data storage unit 211 is updated as follows.

$$C'=(C \cap (U'-V_p)) \cup (V'_p-U) \qquad \text{Eq. (8)}$$

After terminating the processings (a) to (d), the control data storage unit 211 stores each path that belongs to C' and a pair of revoke function values in the path. The processings (e) and (f) correspond to a data update operation which is ready for addition of a next revoke target path.

A path $(p_1, \ldots, P_s)$ is defined as a revoke target path. For the path $(P_1, \ldots, p_s)$, control data obtained by repeating the above processings (a) to (d) sequentially is defined as (Xs, a(Xs)). That is, the control data is obtained a set of each path that belongs to a path set Xs and a pair of revoke function values in the path. At this time, the following formula is proved to have been established.

$$Xs=(V'_{p1} \cup \ldots \cup V'_{ps})-(V_{p1} \cup \ldots \cup V_{ps}) \qquad \text{Eq. (9)}$$

The path $(p_1, \ldots, p_s)$ is inputted to the boundary set calculating unit 208 and the associated apex set calculating unit 214, whereby path sets $V'_{p1}, \ldots, V'_{ps}$, and $V_{p1}, \ldots, V_{ps}$ are obtained. Thus, an operation directly configuring the right side of Eq. (9) is, of course, possible, and such operation may be carried out. In the present embodiment, however, a method of gradually configuring the right side of Eq. (9) has been adopted.

Specifically, the procedures for configuring the above control data is applied. A device ID 201 and a path (1, 1) are revoked. The control data for revoking the device of ID 201 is as follows.

(0, a(0)), ((2, 1), a(2, 1)), ((2, 0, 0), a(2, 0, 0)),
(1, a(1)), ((2, 2), a(2, 2)), ((2, 0, 2), a(2, 0, 2))

At this stage, the path set U' stored in the boundary set storage unit 210 is as follows.

0, (2, 1), (2, 0, 0), 1, (2, 2), (2, 0, 2)

In addition, the associated apex set storage unit 212 stores the following path set U.

2, (2, 0), (2, 0, 1)

Path (1, 1) is inputted to the boundary set calculating unit 208, thereby obtaining the following boundary set $V'_{1-1}$.

0, (1, 0), (1, 2)

In addition, path (1, 1) is inputted to the associated apex set calculating unit 214, whereby the following associated apex set $V_{11}$ is obtained.

1, (1, 1), (1, 1, 0), (1, 1, 1), (1, 1, 2)

A path set $U'-V_{11}$ to be written in the work memory 206 at the above processing "a" is thus obtained as follows.

0, (2, 1), (2, 0, 0), (2, 2), (2, 0, 2)

The content of the control data storage unit 211 is updated in accordance with the step "b" as follows.

(0 a(0)),
((2, 1), a(2, 1)), ((2, 0, 0), a(2, 0, 0)),
((2, 2), a(2, 2)), ((2, 0, 2), a(2, 0, 2))

A path set $V'_{11}-U$ to be stored in the work memory 206 as a result of the processing "c" is obtained as follows.

0, (1, 0), (1, 2)

As a result of the processing "d", the content of the control data storage unit 211, i.e., control data is changed as follows.

(0, a(0),
((2, 1), a(2, 1)), ((2, 0, 0), a(2, 0, 0)),
((2, 2), a(2, 2)), ((2, 0, 2), a(2, 0, 2)),
((1, 0), a(1, 0)), ((1, 2), a(1, 2))

The above data is outputted as control data.

Further, the content of the boundary set storage unit 210 is updated in accordance with the processing "e" as follows.

0, (2, 1), (2, 0, 0),
1, (2, 2), (2, 0, 2),
0, (1, 0), (1, 2),

Lastly, the associated apex set storage unit 212 is changed in accordance with the processing "f" as follows.

2, (2, 0), (2, 0, 1),
1, (1, 1), (1, 1, 0), (1, 1, 1), (1, 1, 2)

The path set stored in the control data storage unit 211 updated as a result of the processing "d" reliably coincides with the following path set.

$(V'_{201} \cup V'_{11})-(V_{201} \cup V'_{11})$

Figure 24:
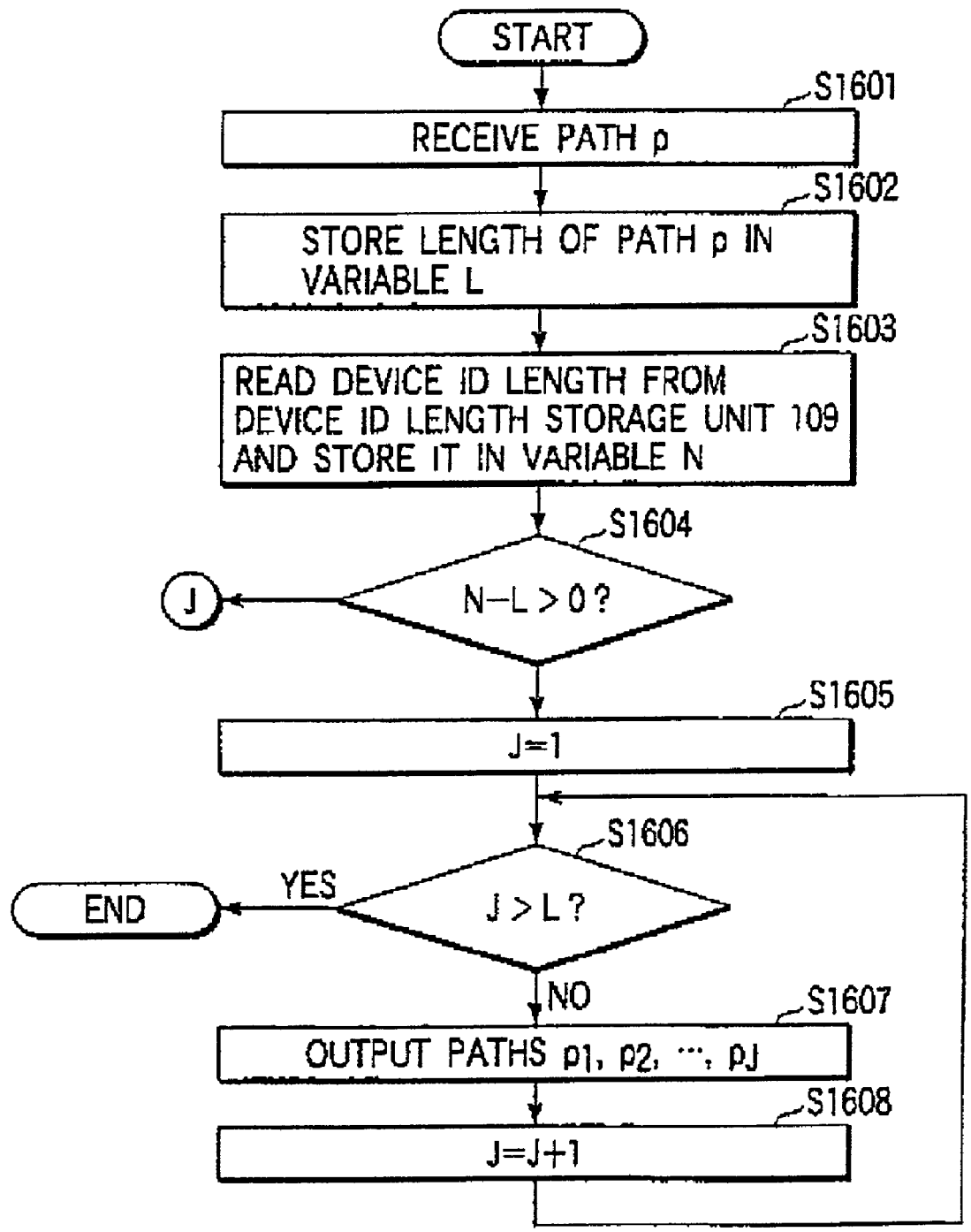
FIG. 24 is a flowchart showing a first-half portion of an operation of an associated apex set calculating unit 214 of the control data generating device of FIG. 14.
Figure 25:
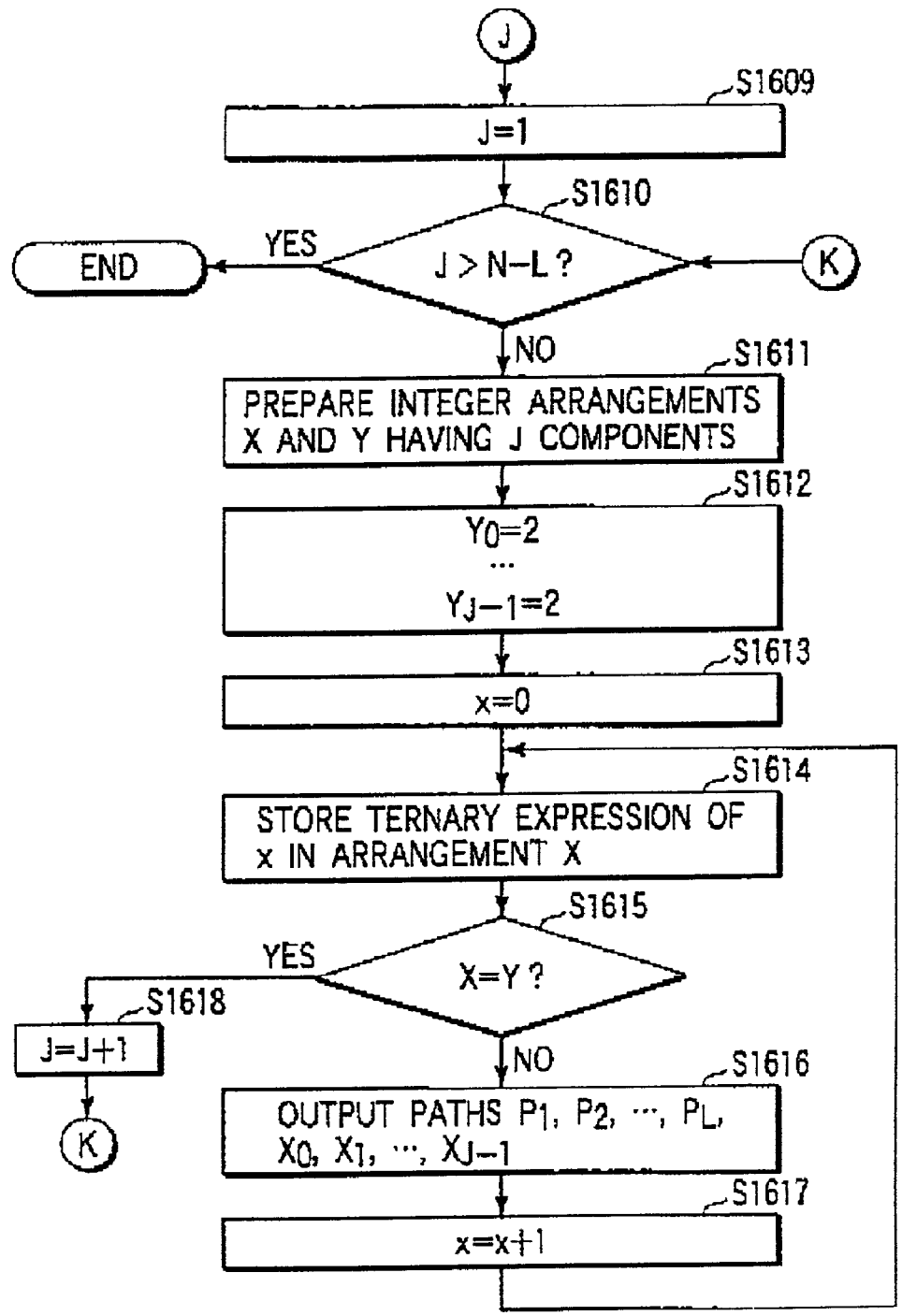
FIG. 25 is a flowchart showing a latter-half portion of the operation of the associated apex set calculating unit 214 of the control data generating device of FIG. 14.

Now, an exemplary operation of the associated apex set calculating unit 214 will be described with reference to FIG. 24 and FIG. 25.

First, the associated apex set calculating unit 214 receives path "p" (S1601), and stores a length of the path "p" in variable L (S1602).

Next, the associated apex set calculating unit 214 reads a device ID length from a device ID length storage unit (not shown), and stores it in variable N (S1603).

Then, it is determined whether or not N−L is greater than 0 (S1604).

If N−L is greater than 0, J is set to 1 (S1605). Then, a path $(p_1, \ldots, p_j)$ is outputted while J is increased by 1 until J has been greater than L (S1606 to S1608).

On the other hand, if N−L is greater than 0 at the step S1604, the following processing is carried out.

First, J is set to 1 (S1609). Then, the following processing is carried out while J is increased by 1 (S1618) until J has been greater than N−L.

Integer arrangements X and Y having J components are prepared (S1611).

$Y_0=2Y_{J-1}=2$ is defined (S1612).

"x" is set to 0 (S1613).

A ternary of "x" is stored in the arrangement x is stored while "x" is increased by 1 until x=Y, and a path $(p_1, \ldots, p_L, X_0, \ldots, X_{J-1})$ is outputted (S1614 to S1617).

At the step S1610, processing when J is greater than N−L is terminated.

A operation described above will be described below in more detail.

A length of device ID (not shown) is stored in advance in the associated apex set calculating unit 214.

The associated apex set calculating unit 214 has a device ID length storage unit (not shown). The associated apex set calculating unit 214 acquires a length of the stored device ID, and compares the length with a length of the read path. Where the length L of the read path is smaller than the length N of device ID, a difference between the length of device ID and the length of path is sampled, and integer arrangements X and Y having the number of elements that coincides with the difference N−L is provided.

Further, all components of Y are set to 2. Y is for determining the termination condition. The ternary expression "x" is stored in the arrangement X while the variable "x" of integer is changed from 0 to 3N−L−1. X is changed from 0, . . . , 0 (N−L pieces) to 2, . . . , 2 (N−L pieces).

The associated apex set calculating unit 214 outputs $(p_1, \ldots, p_L, X_0, \ldots, X_{N-L})$ every value of "x". X generates an element expressed by using a wild card "?" in the elements of the associated apex set. The length of the revoke target path "p" is smaller than that of device ID only when a group of device IDs expressed as $(p_1, \ldots, p_L, ?, \ldots, ?)$ is revoked in batch. A batch revoke of such type occurs where all the products in a specific field produced by a specific manufacturer are revoked.

Therefore, the number of device IDs revoked one time is an order of millions to ten millions. The number of the associated apex sets to be generated is about 2 times of that of the revoke target device ID. Although such a large number of associated apex sets is generated, processing of generating the number of associated apex sets can be terminated by a current computer within a realistic period of time. Moreover, this processing may be executed only once by the control data generating device 20 owned by the revoke entity where a revoke target device group is newly added.

Now, an operation of the boundary set calculating unit 208 will be described with reference to FIG. 26.

The boundary set calculating unit 28 receives path "p" (S1701), and stores a difference of this path "p" in variable L (S1702). J is set to 1 (S1703), and the following processing is repeatedly carried out until J has been greater than L.

0 is set to I (S1705).

It is determined whether or not I is smaller than 3 (S1706). If I is smaller than 3, it is determined whether I is equal to $p_J$ (S1707). Otherwise, a path $(p_1, \ldots, p_{J-1})$ is outputted (S1708), I is increased by 1, and determination processing at the step S1706 is carried out.

When it is determined that I is not smaller at the step S1706, J is increased by 1. When J is greater than L, processing is terminated.

In other words, in the above operation, for the received path "p", the boundary set calculating unit 208 produces a path in which a last number $p_L$ of the path "p" is replaced with a number different from $p_L$, and outputs it. When the length of the path is L, and the numbers configuring the path ranges from 0 to "m−1", the total number of paths included in a boundary set is "mL".

The control data generating device 20 of the present embodiment is compared with a media key block generating device in the conventional media key block technique. The control data generating device 20 of the present embodiment comprises the associated apex set calculating unit 214. In addition, the control data generating device 20 of the present embodiment comprises the path function calculating unit 213.

The associated apex set calculating unit 214: With respect to a path that is an arrangement of numbers, this unit outputs at least one of partial paths produced by using part or all of numbers that belong to the inputted path and a path produced by adding at least one number to the path.

The boundary set calculating unit 208: This unit outputs a path produced by changing part or all of the numbers that belong to the partial path with respect to at least one of partial paths produced by using part or all of the numbers that belong to the inputted path.

Further, the control data generating device 20 according to the present embodiment outputs the following data.

At least one pair of the path that is an arrangement of numbers and the numeric value associated with the path is outputted.

The above path is an output path of the boundary set calculating unit 208.

The numeric value associated with the above path is a revoke function value in the path.

Revoke function value: This value is a numeric value defined for a path that is an arrangement of numbers, and is obtained as a numeric value that depends on the path function value and master key K in the path.

Now, control data on media will be described.

The control data as an output of the control data generating device 20 is supplied to a utilizing device 30 through a network or broadcast. Alternatively, the control data may be distributed after recorded in media. Where the control data is distributed after recorded in media, the control data is recorded in media in the form that a path and a pair of revoke function values in the path is listed, for example. In this case, paths may be listed to be associated sequentially in a dictionary form as arrangement of numbers.

An example is shown in FIG. 27. A path is stored in PD. PD has an 8-bit NL field and a PT field. The number of numerals that configure the path is recorded in the NL field. This number is defined as "v". The PT field has a length of 2v bits. In the present embodiment, numerals configuring a path is 0, 1, or 2. Thus, the numerals are expressed by 2 bits. For example, for a path (2, 0, 1), the value of the NL field is 3, and the PT field is a bit example of 6 bits: 100001.

BP stores a path and a pair of revoke function values in the path. BP comprises a PD field and a VR field. A description of the PD field has already been given. The VR field is defined as a 128-bit integer without sign. A control data is written as CD. The CD comprises an NBP field and 0 or more BP field. The number of BP fields that configure control data is written in the NBP field. When the number of this field is defined as "n", control data has "n" BP fields from $BP_1$ to $BP_n$.

The media in which control data according to the present embodiment has been recorded are characterized in that the media contain at least the following information.

A path that is arrangement of numerals and at least one pair of numeric values associated with the path are contained. A pair of numeric values in the path is an output of the control data generating device 20 of the present embodiment.

The above path is a path outputted by the boundary set calculating unit 208 in the control data generating device 20 of the present embodiment.

The numeric value associated with the above path is a revoke function number in the path.

Now, a description of a utilizing device will be given below.

The utilizing device requires a master key K in order to utilize data. This is because, data is encrypted by a data key, and further, the data key is encrypted by the master key K, for example. Alternatively, data may be encrypted by the master key K. Device information is assigned to each utilizing device. The device information is an output of the device information generating device according to the present embodiment. That is, the utilizing device reads the device ID and control data, and decrypts a revoke function value in order to acquire the master key K.

FIG. 28 shows a configuration of the utilizing device 30.

Figure 29:
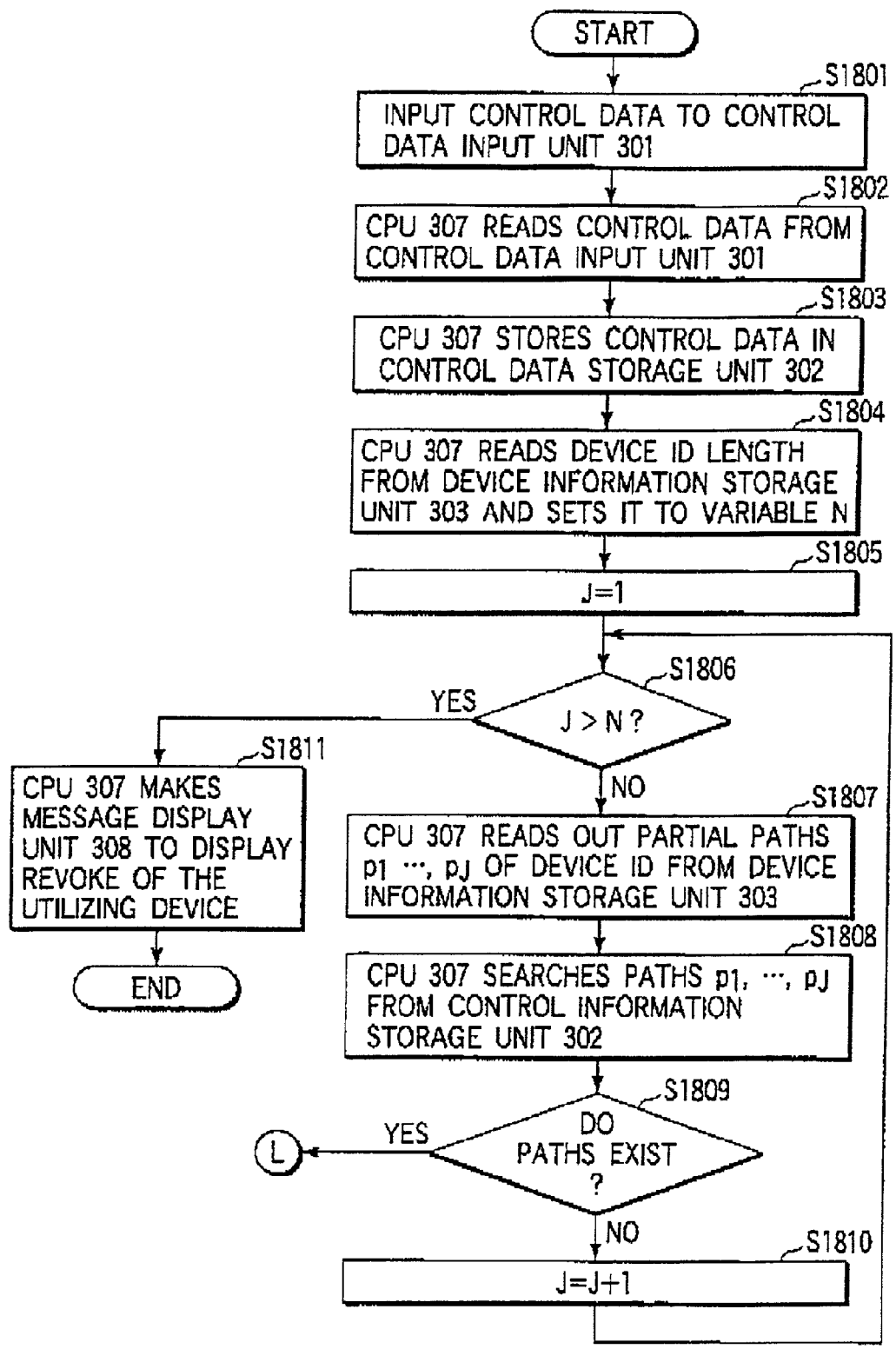
FIG. 29 is a flowchart showing a first-half portion of an operation of the content utilizing device.
Figure 30:
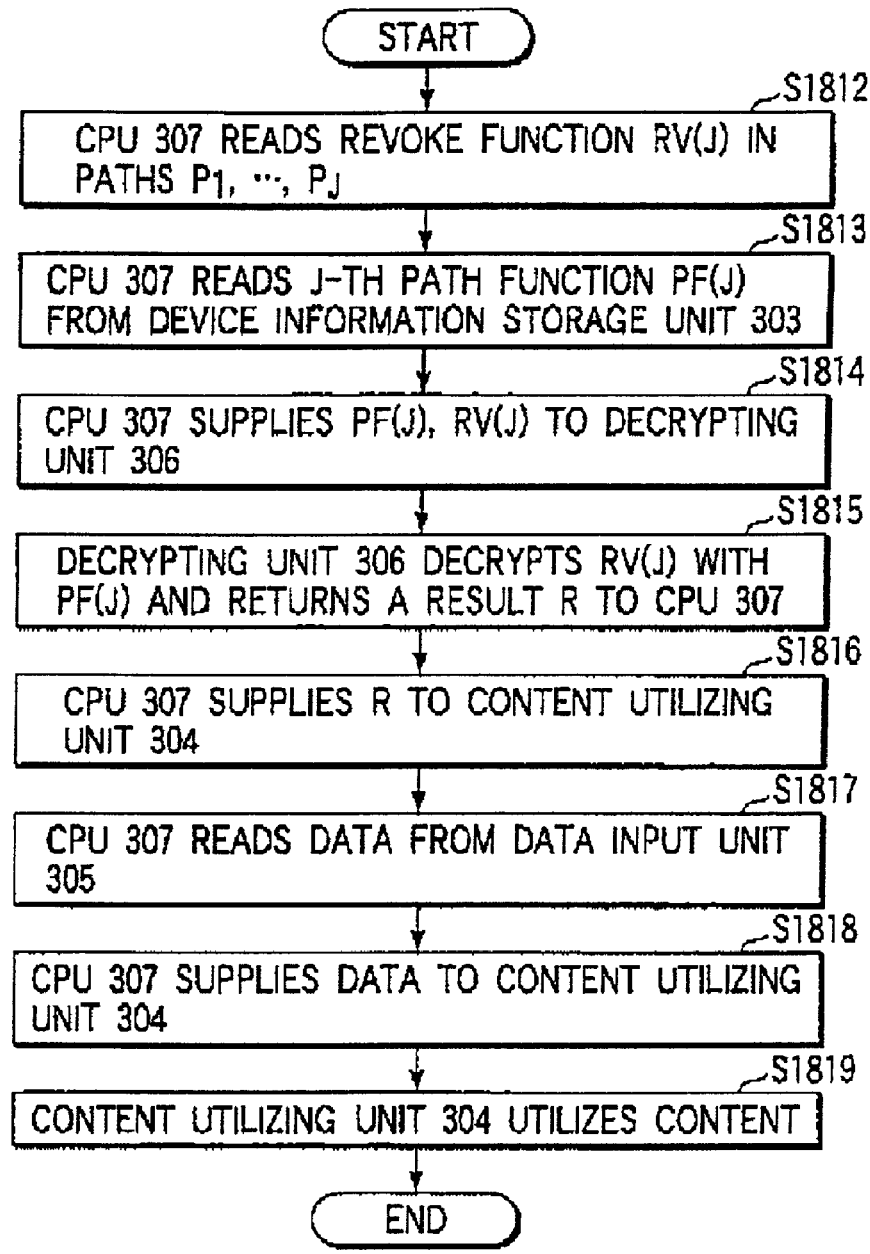
FIG. 30 is a flowchart showing a latter-half portion of the operation of the content utilizing device.

An operation of the utilizing device 30 will be described below with reference to FIG. 29 and FIG. 30.

A control data is inputted to a control data input unit 301 (S1801). A CPU 307 reads the control data from the control data input unit 301 (S1802). The CPU 307 stares the control data in a control data storage unit 302 (S1803). The CPU 307 reads a length of device ID from a device information storage unit 303, and sets the length to variable N (S1804). Here, 1 is initially set to J (S1805).

Then, a revoke determining process is carried out.

It is determined whether or not J is greater than N (S1806). When J is greater than N, revoke is effected. The CPU 307 displays the fact that the utilizing device 30 has been revoked on a message display unit 308 (S1811).

On the other hand, if J is not greater than N at the current stage, the following processing is carried out.

The CPU 307 reads out a partial path $(p_1, \ldots, p_J)$ of device ID from the device information storage unit 303 (S1807).

The CPU 307 searches the path $(p_1, \ldots, p_J)$ from the control data storage unit 302 (S1808).

As a result of search, if the path does not exist, J is increased by 1, and processing returns to the step S1806 (S1809, S1810).

When it is determined that the path has existed at the step S1809, the CPU 307 reads a revoke function value RV(J) in the path $(p_1, \ldots, p_J)$ (S1812). Next, the CPU 307 reads a J-th path function value PF(J) from the device information storage unit 303 (S1813). Then, the CPU 307 supplies a pair of numerals (PF(J), RV(J)) to a decrypting unit 306 (S1814).

The decrypting unit 306 decrypts RV(J) with PF(J), and returns the obtained result R to the CPU 307 (S1815). The CPU 307 supplies R to a content utilizing unit 304 (S1816). The CPU 307 reads data from a data input unit 305 (S1817). The CPU 307 supplies data to the content utilizing unit 304 (S1818). Then, the content utilizing unit 304 utilizes (reproduces) contents (S1819).

The above operation will be described in more detail.

The device information storage unit 303 stores a pair of device information generated by the device information generating device 10 according to the present embodiment. That is, this storage unit 303 stores device ID and a pair of path function values.

Device ID: R1, R2, R3

Path function values: PF1, PF2, PF3

The device information storage unit 303 stores a length of device ID in addition to this device information. In the case of the present embodiment, the length of device ID is 3.

The utilizing device 30 reads control data from media, and stores it in the control data storage unit 302 prior to utilizing contents. The CPU 307 acquires partial paths of the device ID sequentially, and determines whether or not any of the partial paths coincides with the path in the paths contained in the control data. If a coincident path exists, the revoke function value corresponding to the path is read out from the control data storage unit 302.

Then, the CPU 307 reads out the path function value that corresponds to the partial path from the device information storage unit 303, and supplies a pair of path function value and revoke function value to the decrypting unit 306.

The decrypting unit 306 decrypts the revoke function value with the path function value being a key, and returns the result R to the CPU 307. The value of R is equal to a value K defined as the master key K by the revoke entity. The CPU 307 supplies the value of R to the content utilizing unit 304, and then, supplies the data read from the data input unit 305 to the content utilizing unit 304.

The control data read from the utilizing device 30 is stored in the control data storage unit 302 as follows, for example.

$$(0, a(0)), ((2, 1), a(2, 1)), ((2, 0, 0), a(2, 0, 0), ((2, 2), a(2, 2)), ((2, 0, 2), a(2, 0, 2), ((1, 0), a(1, 0)), ((1, 2), a(1, 2)) \quad \text{Eq. (10)}$$

As given in the description of the control data generating device 20, the control data is provided to a revoke device ID 204 and a path (1, 1).

Now, assume that the utilizing device 30 has a device ID 102. The CPU 307 of the utilizing device 30 first searches a partial path 1 from the control data in Eq. (10) stored in the control data storage unit 302. This path does not exist in the control data of Eq. (10). Therefore, the CPU 307 of the utilizing device 30 searches the next partial path (1, 0) from among the control data of Eq. (10). This path exists. The CPU 307 of the utilizing device 30 reads out the corresponding revoke function value a(1, 0) from the control data storage unit 302, and supplies the function value to the decrypting unit 306 together with a path function value PF2=PF(1, 0). The decrypting unit 306 decrypts numeric value a(1, 0) with numeric value PF2 being a key, and returns the result R to the CPU 307. As described previously, a(1, 0) is equal to Enc(PF(1, 0), K). Therefore, the decrypting result R is equal to the master key K. The content utilizing unit 304 can utilize contents by obtaining a value of the master key K.

On the other hand, assume that the utilizing device 30 has device ID 112, for example.

The CPU 307 first searches a partial path 1 from the control data of Eq. (10). This path does not exist in the control data of Eq. (10). Therefore, the CPU 307 searches the next partial path (1, 1). This path does not exist in the control data of Eq. (10) as well. The CPU 307 further searches a partial path (1, 1, 2) from among the control data of Eq. (10). This path does not exist as well. Since search has been made until the length of partial path has coincided with the device length, the CPU 307 causes the message display unit 308 to display the fact that the utilizing device 30 is revoked, and processing is terminated.

The utilizing device 30 according to the present embodiment provides followings:

The device information storage unit 303: The device information storage unit 303 stores at least one path function value that is a numeric value corresponding to a partial path produced by sampling partial or all numbers of the device ID. Alternatively, the device information storage unit 303 stores the device information generated by the device information generating device 10 of the present embodiment.

Input Data: Input data contains control data. The control data contains a path and at least one revoke function value that corresponds to the path.

Operation;

(a) A path that coincides with a partial path obtained by arranging partial or all numbers of the device ID is searched from among the paths contained in the inputted control data.

(b) As a result of search of the above (a), when no coincident path is found, it is determined that the utilizing device 30 is revoked, and the processing during revoke is carried out.

(c) As a result of search of the above (a), when a in coincident path is found, the revoke function value that corresponds to the path is read our from the control data, and is decoded by keying the path function value stored in the device information storage unit 303 in association with the path.

Any of the above sections of the utilizing device 30 is not provided in a utilizing device in the media key block technique.

Second Embodiment

Now, a second embodiment of the present invention will be described.

The control data generating device 20 (FIG. 14) in the first embodiment comprises the associated apex set calculating unit 214. This calculating unit 214 actually generates the associated apex set of a revoke target path.

However, in order to generate control data, it is sufficient that there exists an associated apex set determining unit which determines whether or not an arbitrary path belongs to an associated apex set of a path. This fact can be found by discussing procedures for generating the control data in the control data generating device 20. This fact will be described as follows.

In procedure (a) of the control data generating device 20 according to the first embodiment, a difference set between the path set U' stored in the boundary set storage unit 210 and the associated apex set $V_p$ of path "p" is calculated. Specifically after paths "q" contained in U have been selected sequentially, only if the paths "q" are not contained in $V_p$, they may be stored in the work memory 206. That is, the associated apex set $V_p$ may not be actually generated, and it may be determined whether or not "q" is contained in $V_p$.

In procedure (c) of the control data generating device 20 according to the first embodiment, there is obtained a difference set $V'_p-U$ between the path set U stored in the associated apex set storage unit 212 and the boundary set $V'_p$ of path "p". In obtaining this difference set, it may be determined whether or not each path of $V'_p$ is contained in U. For that purpose, all the elements of U may not always be generated.

Where the revoke target path is remarkably shorter than the length of device ID, the associated apex set of the path is a significantly large set as has been already described. It is important to eliminate inconvenience for generating this set in efficient operation of the control data generating device 20. A configuration of a control data generating device 40 having improved the above point is shown in FIG. 31.

Figure 32:
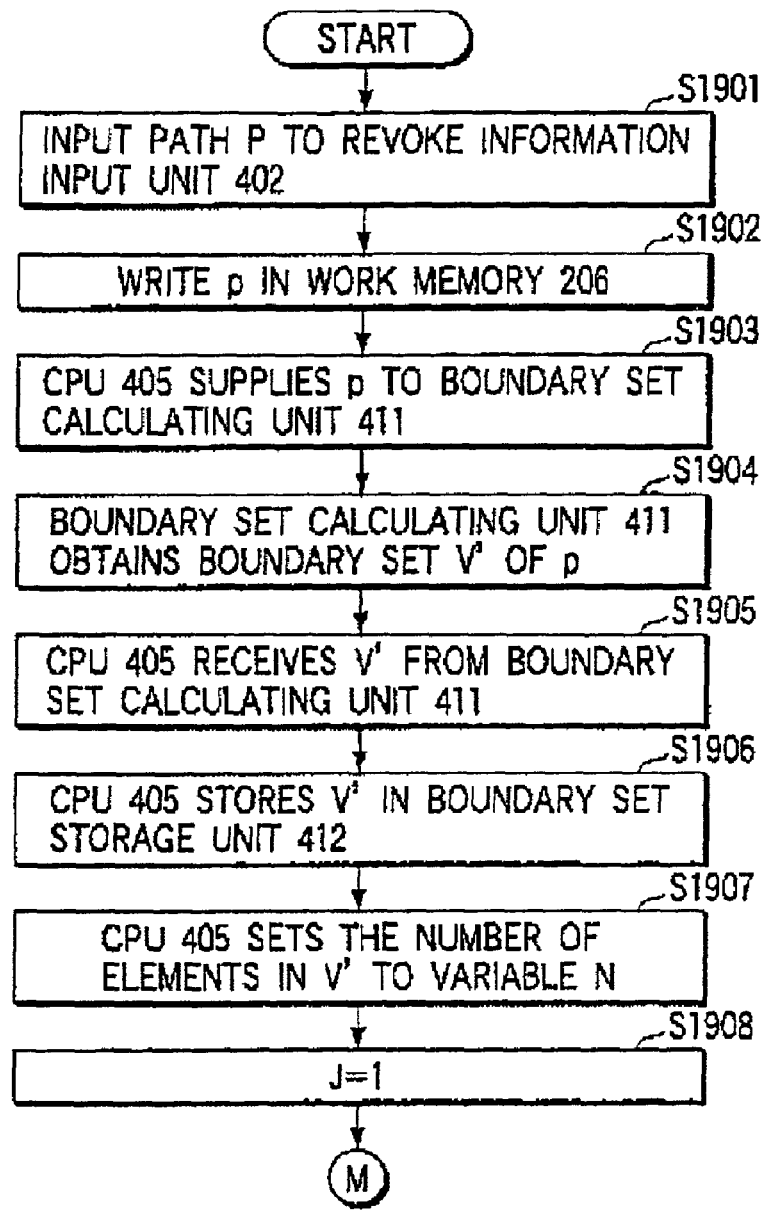
FIG. 32 is a flowchart showing a first portion of an operation of the control data generating device when a first revoke target device is specified.
Figure 33:
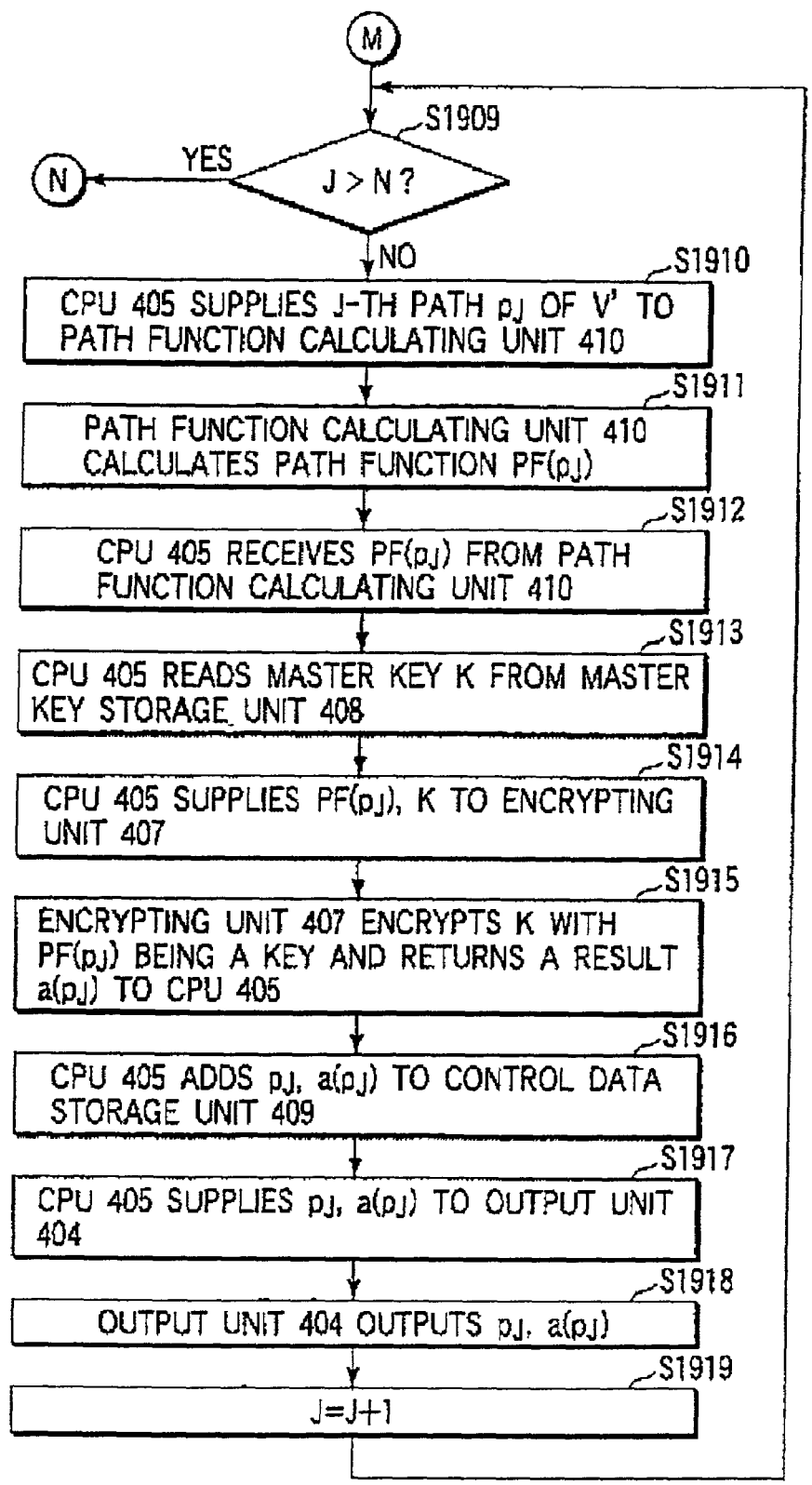
FIG. 33 is a flowchart showing a second portion of the operation of the control data generating device when the first revoke target device is specified.
Figure 34:
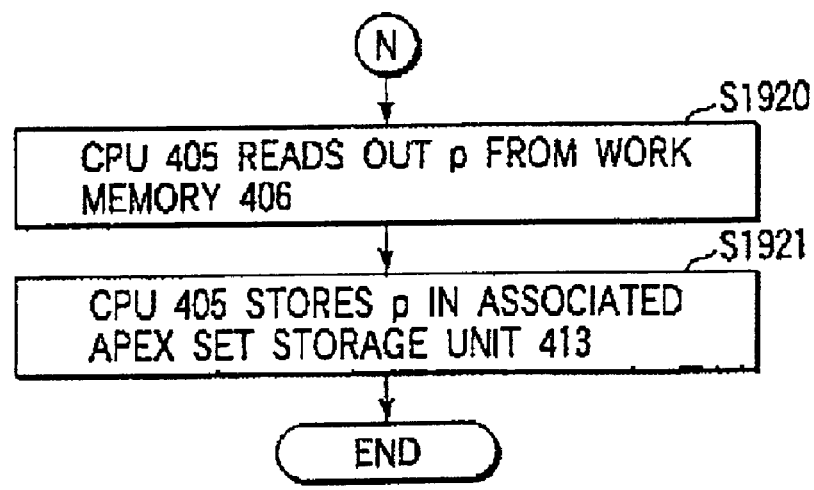
FIG. 34 is a flowchart showing a last portion of the operation of the control data generating device when the first revoke target device is specified.

An initial operation of the control data generating device 40 will be described with reference to FIG. 32 to FIG. 34. An operation during update will be described with reference to FIG. 35 to FIG. 39.

This initial operation is basically carried out in a way that is substantially similar to the initial operation (FIG. 16 to FIG. 18) of the control data generating device 20.

The above initial operations are different from each other as follows. That is, processing at the steps S1421 to S1423 in FIG. 18 does not exist. In addition, although V is stored in the associated apex set storage unit 212 at the step S1424, "p" is stored in the associated apex set storage unit 212 at the step S1921 of FIG. 34. In this way, the initial operation of the control data generating device 40 can be simplified in comparison with the initial operation of the control data generating device 20.

Now, an operation during update will be described here. The control data generating device 40 is also analogous to the control data generating device 20 in operation during update. Therefore, only a difference between these devices will be described below.

Figure 19:
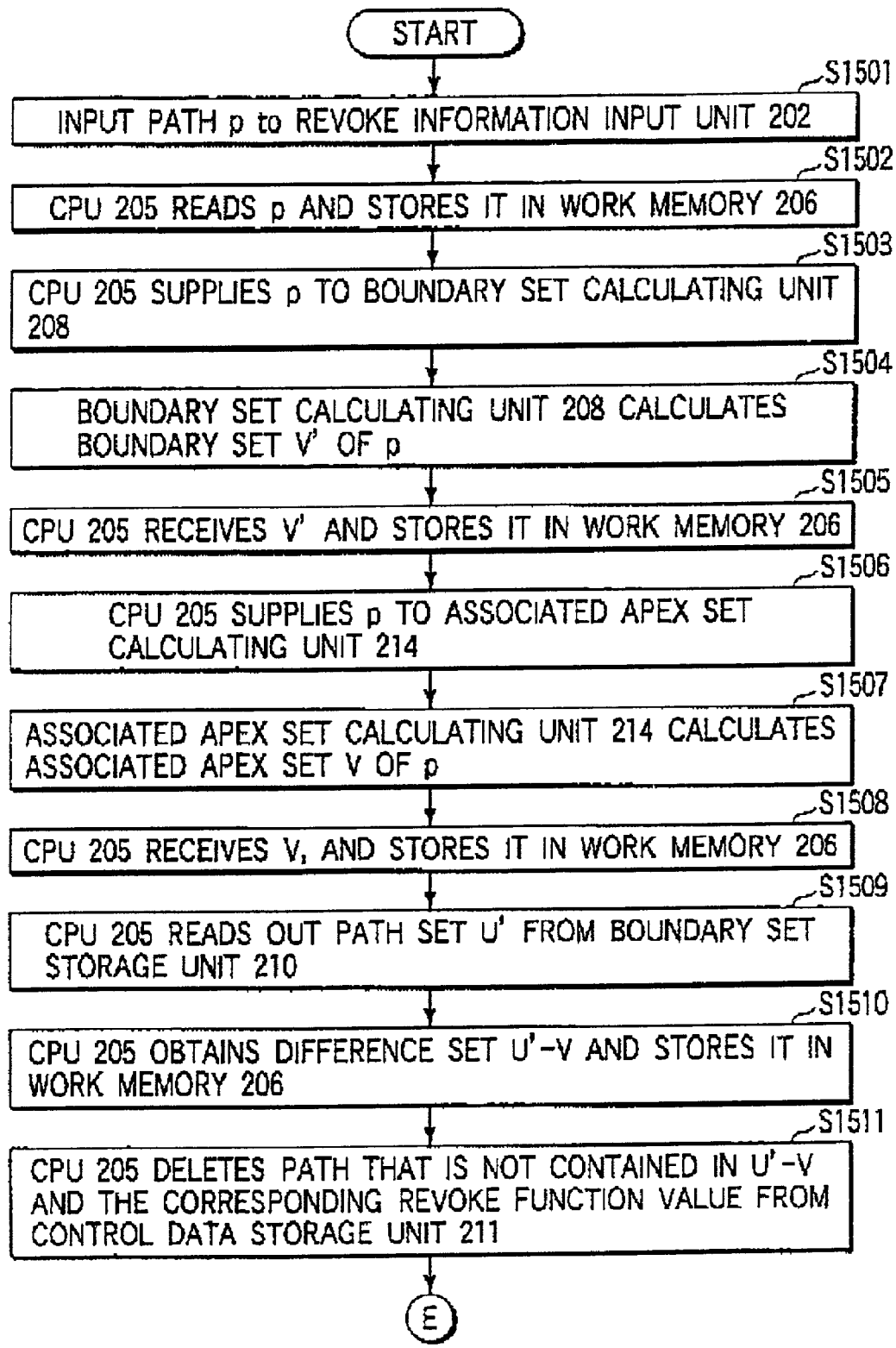
FIG. 19 is a flowchart showing a first portion of an operation of the control data generating device when a second revoke target device or later is specified.
Figure 20:
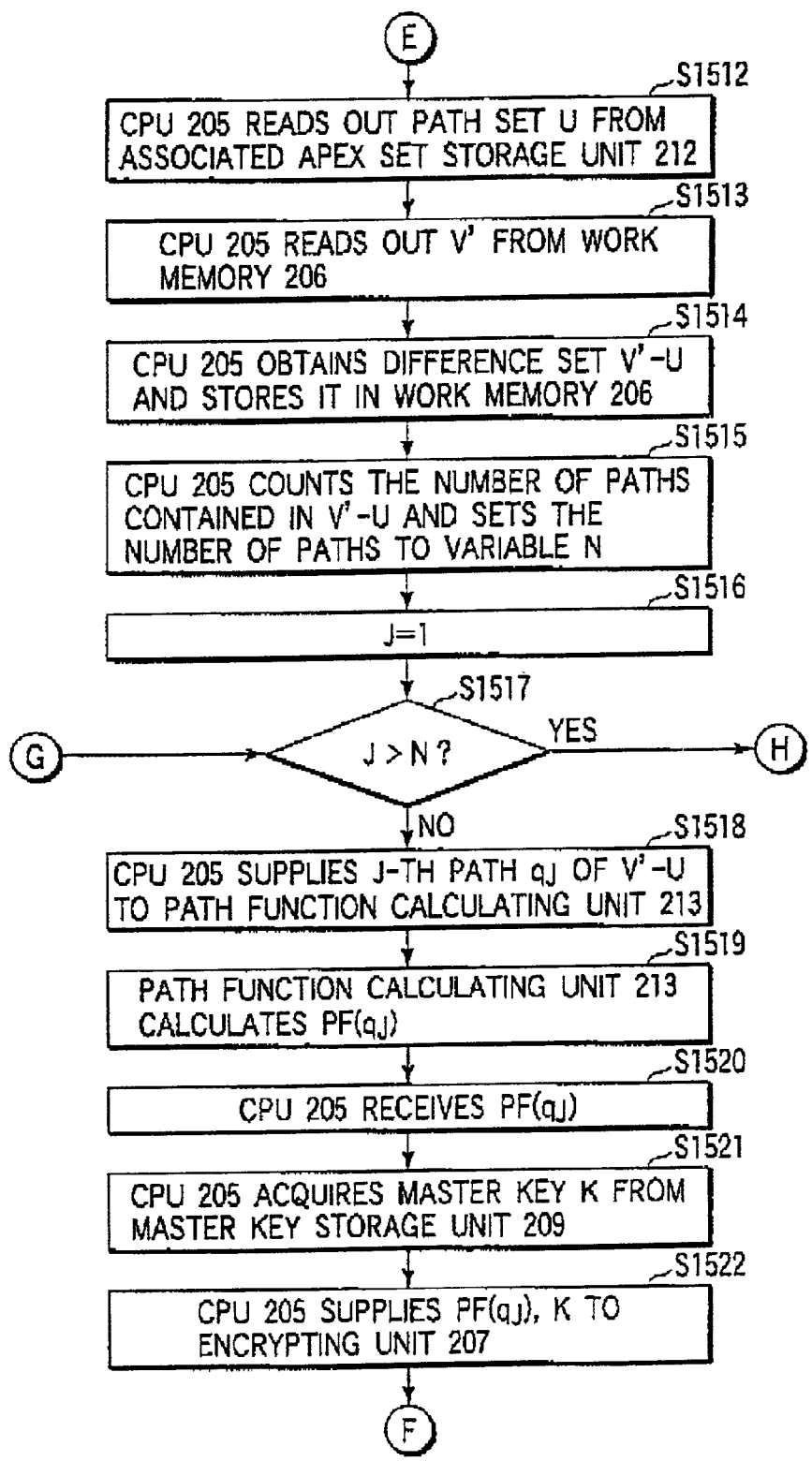
FIG. 20 is a flowchart showing a second portion of the operation of the control data generating device when the second revoke target device or later is specified.

With respect to an operation described with reference to FIG. 35, at the step S2006, the control data generating device 40 sets "p" at an associated apex set calculating unit 416. In contrast, in the control data generating device 20 shown in FIG. 19, "p" is set at the associated apex set calculating unit 214. In addition, processing corresponding to the steps S1507 and S1508 shown in FIG. 19 is eliminated.

Figure 36:
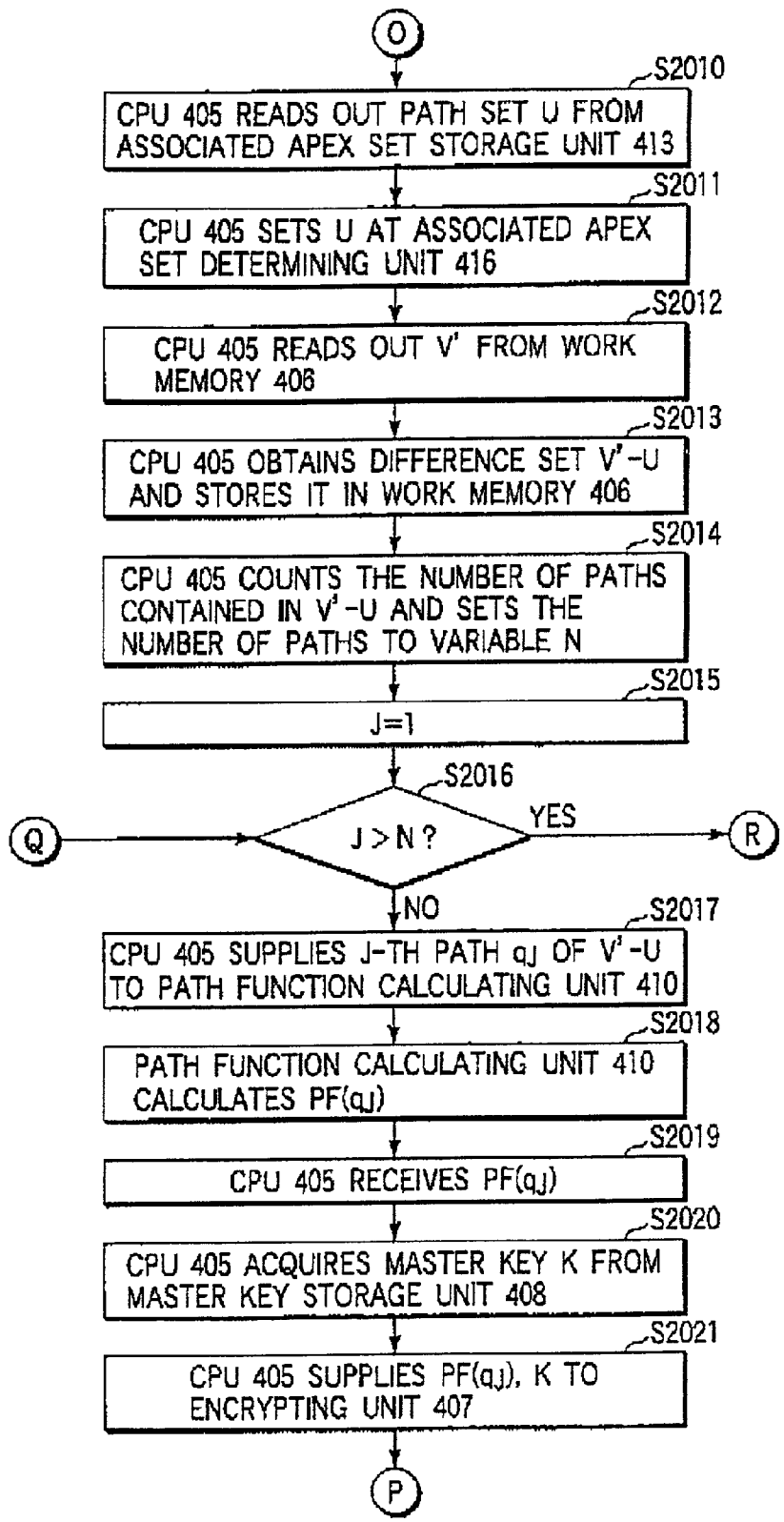
FIG. 36 as a flowchart showing a second portion of the operation of the control data generating device when the second revoke target device or later is specified.

With respect to an operation described in FIG. 36, only addition is the step S2011 at which the CPU 307 sets U at the associated apex set determining unit 416.

Figure 21:
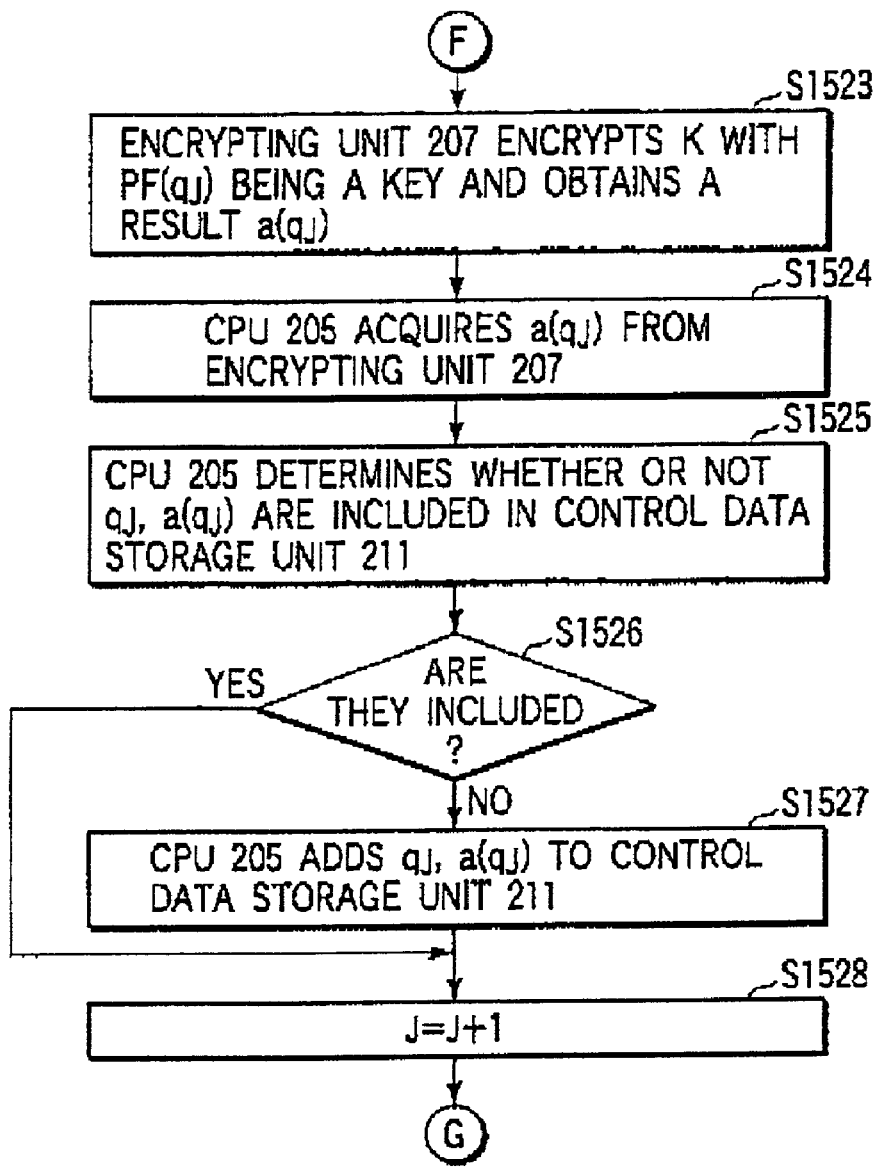
FIG. 21 is a flowchart showing a third portion of the operation of the control data generating device when the second revoke target device or later is specified.
Figure 22:
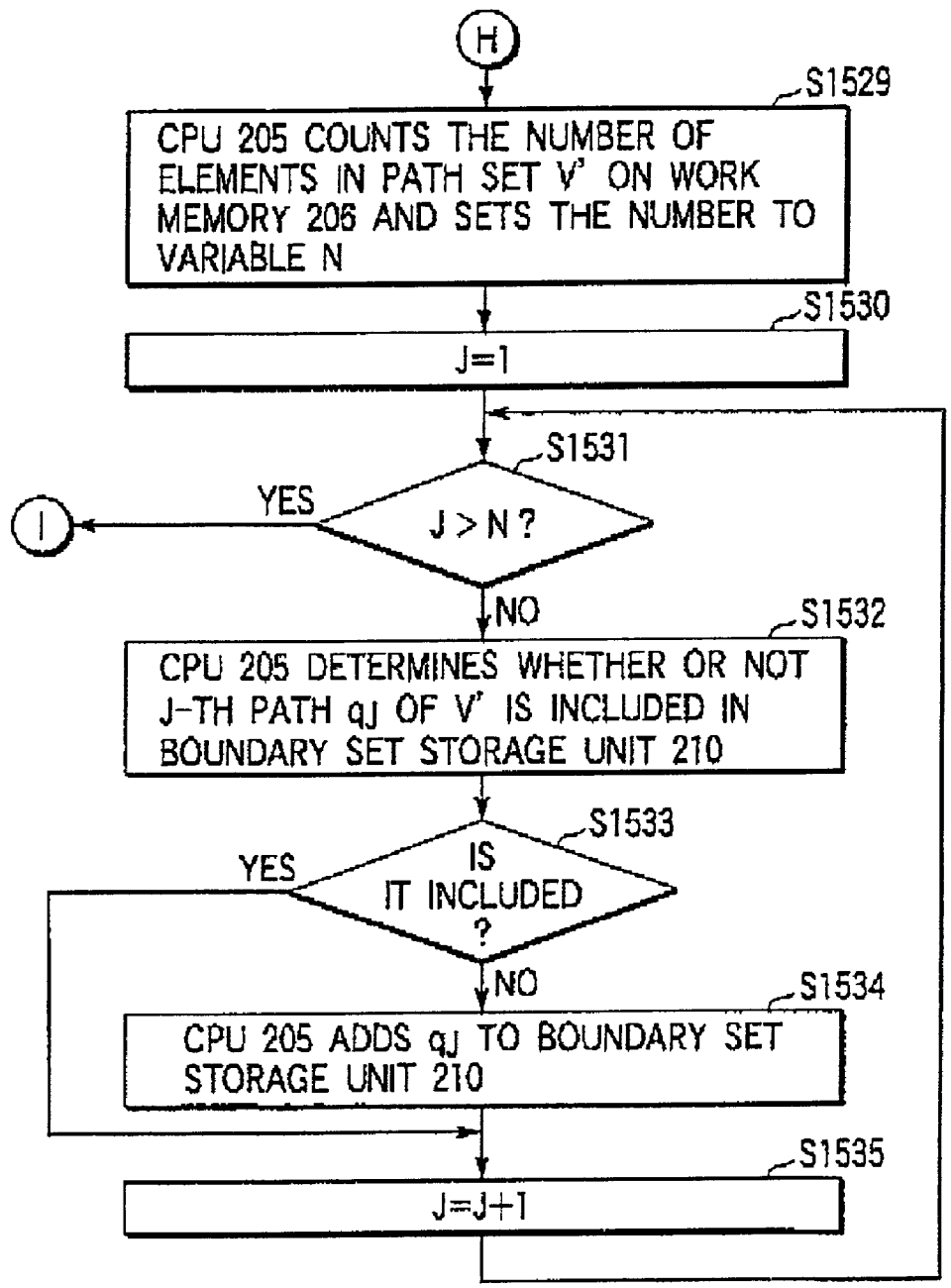
FIG. 22 is a flowchart showing a fourth portion of the operation of the control data generating device when the second revoke target device or later is specified.
Figure 23:
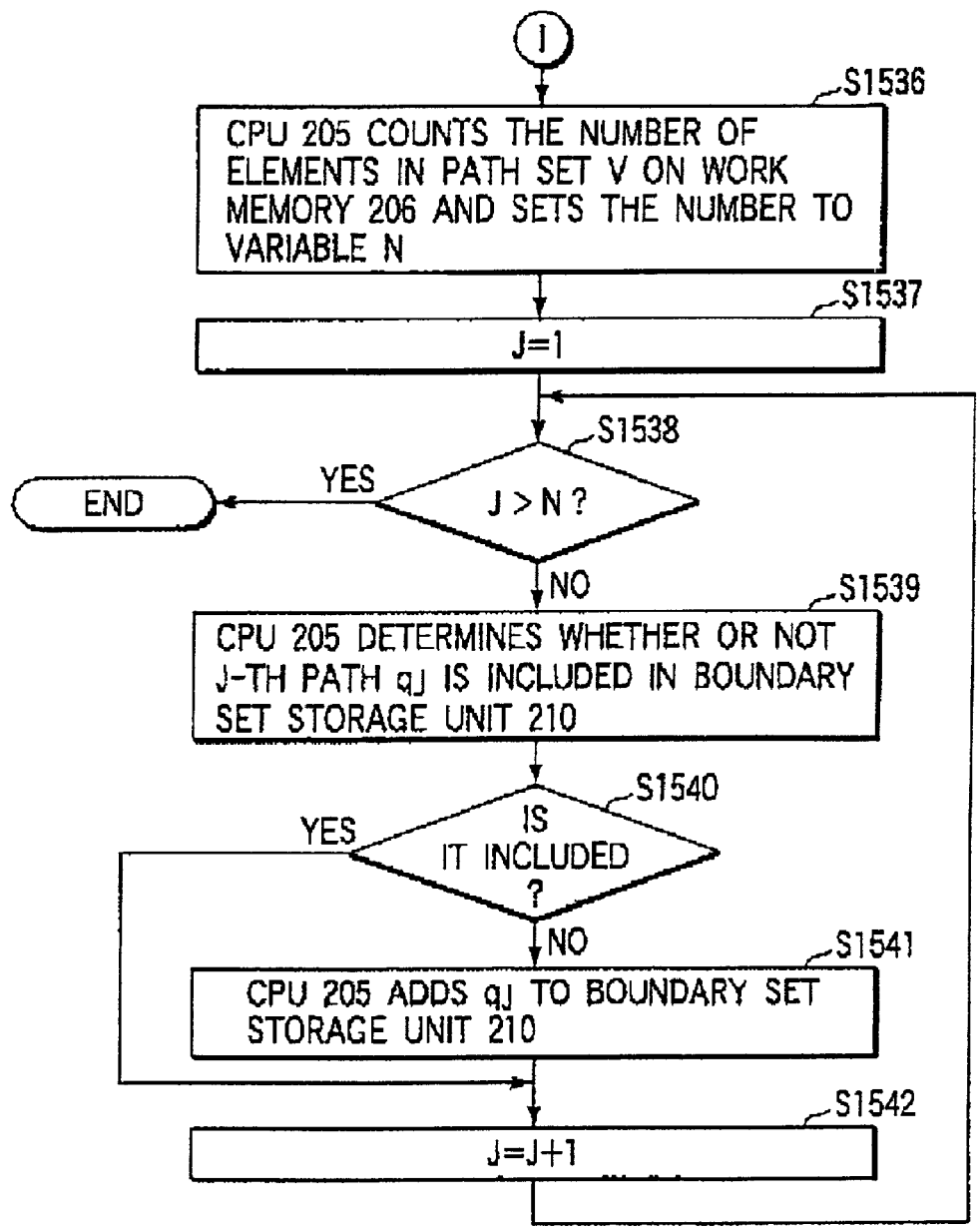
FIG. 23 is a flowchart showing a last portion of the operation of the control data generating device when the second revoke target device or later is specified.
Figure 37:
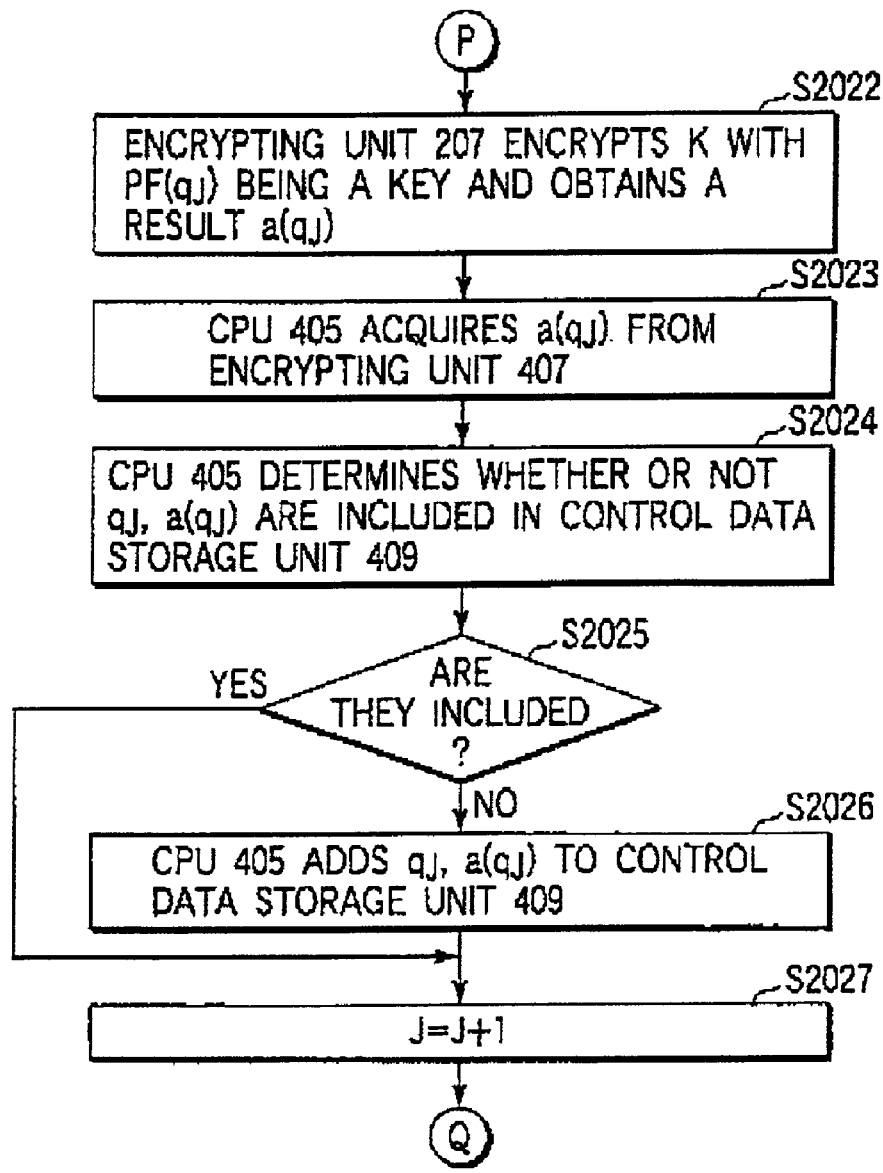
FIG. 37 is a flowchart showing a third portion of the operation of the control data generating device when the second or later revoke target device is specified.
Figure 38:
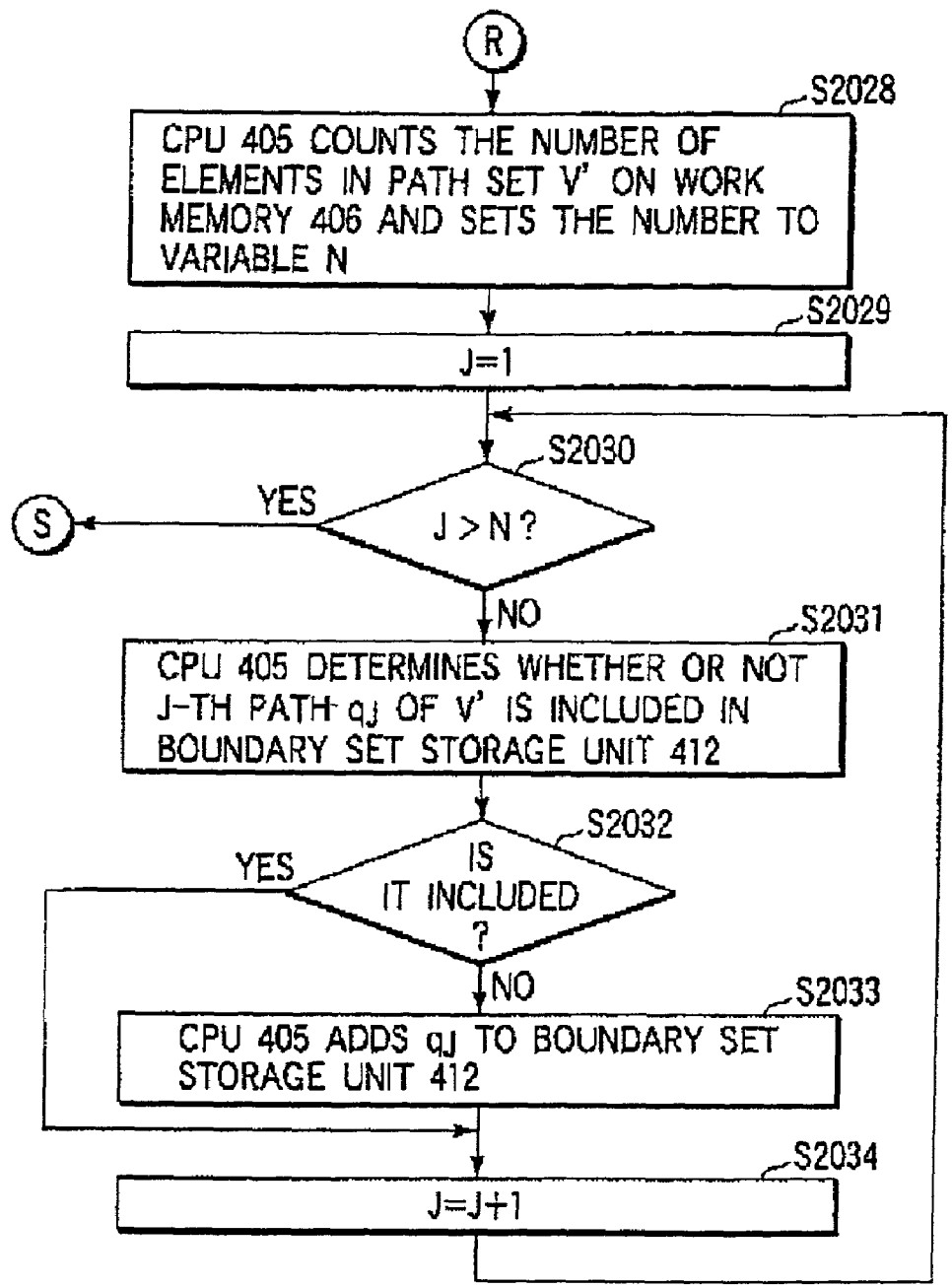

An operation described with reference to FIG. 37 and FIG. 38 is achieved in the same manner as that of the control data generating device 20 shown in FIG. 21 and FIG. 22.

An operation shown in FIG. 39 is different from that of the control data generating device 20.

That is, the CPU 307 reads out path "p" from the work memory 206 (S2035), and determines whether or not "p" exists in the associated apex set storage unit 212 (S2036). If "p" exists, processing is terminated intact. If "p" does not exist, "p" is added to the associated apex set storage unit 212 (S2038), and operation is terminated.

Figure 35:
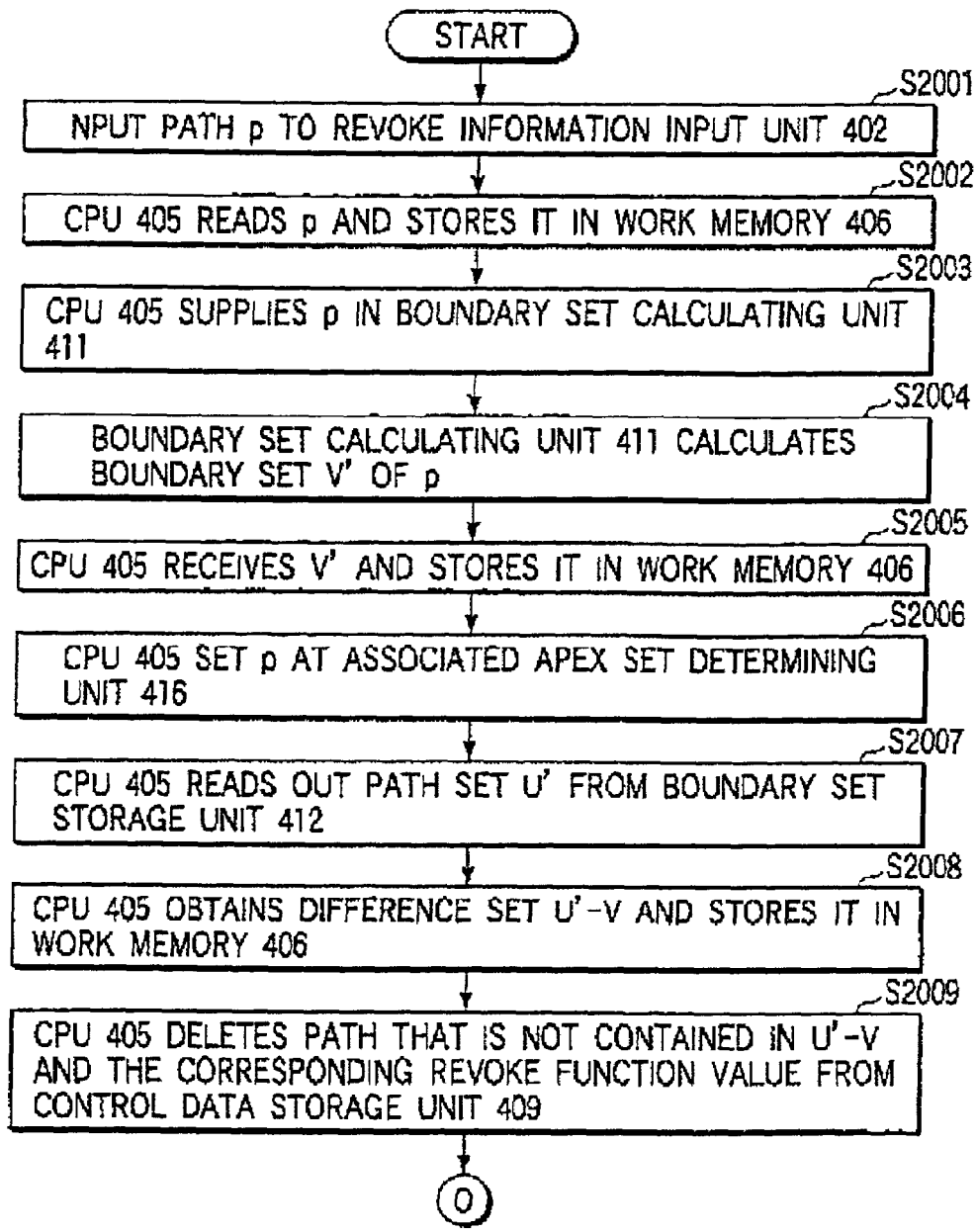
FIG. 35 is a flowchart showing a first portion of an operation of the control data generating device when a second revoke target device or later is specified.

The associated apex set determining unit 416 is used to obtain a difference set U'-V in the operation shown in FIG. 35. Here, V represents an associated apex set of a revoke target path "p".

In addition, the associated apex set determining unit 416 is also used to obtain a difference set V'-U in the operation shown in FIG. 36.

FIG. 40 illustrates an operation for obtaining the difference set U'-V. FIG. 41 illustrates an operation for obtaining the difference set V'-U. These operations are carried out in the same manner. Thus, only a description will be given by referring to FIG. 40, and the description of FIG. 41 is omitted here.

The CPU 307 sets the number of paths that belong to U' in variable N (S2101). In addition, J is set to 1 (S2102).

Then, the following processing is repeatedly carried out until J has been greater than N.

The CPU 307 supplies a J-th path $q_J$ of U' to the associated apex set determining unit 416 (S2104).

The associated apex set determining unit 416 carries out determining operation, and supplies the determination result R to the CPU 307 (S2105).

Only when the determination result R is not 0, the CPU 307 stores the path $q_J$ as a path of U'-V in the work memory 206 (S2107).

J is increased by 1 (S2108).

Now, an operation of the associated apex set determining unit 416 is shown in FIG. 42 and FIG. 43. The operation of the associated apex set determining unit 416 is divided into a path set setting operation and a determining operation.

The path set setting operation receives a path set P, as shown in FIG. 42 (S2301), and stores P in a path set storage unit 417 (S2302).

The determining operation receives a determination target path "p", as shown in FIG. 43 (S2401). The number of elements in the path set P stored in the path set storage unit 417 is set to variable N (S2402). J is set to 1 (S2403).

The following processing is carried out until J has been greater than N (S2404) or until I has been greater than L (S2408).

A length of the J-th path $q_J$ of P is compared with that of the path "p", and a shorter length is set to variable L (S2406).

I is Set to I (S2407).

It is determined whether or not I is greater than L (S2408).

I-th numbers of paths $q_J$ and p are compared with each other (S2409), and it is determined whether or not they coincide with each other (S2410).

When they coincide with each other, I is increased by 1 (S2411), and processing returns to the step S2408. If they do not coincide, J is increased by 1 (S2412), and processing returns to the step S2404.

When it is determined that J is greater than N at the step S2404, 0 is outputted (S2405), and processing terminates. Alternatively, when it is determined that I is greater than L at the step S2408, I is outputted (S2413), and processing terminates.

In other words, the above determining operation receives a determination target path, and determines whether or not the path is obtained as an associated apex set of a path stored in the path set storage unit 417. The path set setting operation is an operation for setting the content of the path set storage unit 417.

For example, consider two paths "p" and "q". When the length of the path "q" is not greater than that of the path "p", the fact that "q" is contained in the associated apex set of "p" is the same as the fact that the entire numeric series of "q" coincides with part of numeric series of "p".

When the length of the path "q" is greater than that of the path "p", the fact that the entire numeric series of "p" coincides with part of the numeric series of "q" is the same as the fact that "q" is contained in the associated apex set of "p". The associated apex set determining unit 416 selects paths "q" sequentially from the path set storage unit 417, and compares arrangement of numerals of "q" with that of the inputted paths in number, thereby determining whether or not the inputted path is contained in the associated apex set of "q".

The control data generating device 40 according to the present embodiment comprises the associated apex set determining unit 416.

The associated apex set determining unit 416 can set at least one of the paths that are arrangements of numerals. This determining unit 416 determines whether or not the inputted path coincides with a partial path is produced by using part or all of numerals that belong to the set path. Alternatively, the determining unit 416 determines whether or not the inputted path coincides with a path produced by adding at least one numeral to the set path. Then, the determination result is outputted.

As has been described above, according to the embodiments of the present invention, in a technique for controlling utilization of contents in the utilizing device by using the control data, there can be avoided a serious security problem and a problem with side effect which can occur during revoke and can lose a user's convenience significantly.

According to an embodiment of the present invention, a device ID comprises plural numbers assigned to the content utilizing device. At least one path function value corresponding to a partial path of this device ID is generated.

According to an embodiment of the present invention, there is provided a control data generating device for generating control data so as to output at least one partial path produced by using part or whole of numerals that belong to an inputted path.

According to an embodiment of the present invention, there is provided a content utilizing device for utilizing contents so as to store at least one numeral value that corresponds to a partial path produced by the device ID and the partial path produced by arranging numerals of part or whole of the device ID.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. A revoke control method for revoking at least one of a plurality of content utilizing devices, each of the content utilizing devices being assigned a device ID and assigned a set of device keys according to the device ID, the device ID being formed of numerals each indicating a position of each of the device keys of the set in each one dimensional array of a device key matrix in which device keys are arranged in a two dimensional manner, and the device ID indicating a path in a plurality of trees that are formed of all possible combinations of device keys in the device key matrix, the method comprising:

preparing the device key matrix;

inputting a revoke target path, which is a path to be revoked in the trees and formed of numerals each indicating a position of a device key in each one dimensional array of the device key matrix;

calculating a boundary set of paths except for the revoke target path in the trees, each of the paths of the boundary set being formed of one or more numerals each indicating a position of a device key in each one dimensional array of the device key matrix;

calculating a path function value corresponding to each of the paths of the boundary set based on each device key indicated by each numeral of the each of the paths of the boundary set, to obtain a plurality of path function values corresponding to the paths of the boundary set;

encrypting a master key by using each of the path function values, to obtain a plurality of encrypted data items corresponding to the paths of the boundary set;

generating revoke control data including the encrypted data items;

outputting the revoke control data to each of the content utilizing devices; and decrypting, by each content utilizing device whose device ID indicates one of the boundary set of paths, one of the encrypted data items by using a path function value calculated based on one or more device keys of the set assigned to the each content utilizing device.

2. The revoke control method according to claim 1, wherein the each of the content utilizing devices includes a memory to store the device ID assigned to the each of the content utilizing devices and a set of path function values each calculated based on one or more device keys of the set assigned to the each of the content utilizing devices; and the each content utilizing device whose device ID indicates one of the boundary set of paths configured to decrypt one of the encrypted data items by using one of the path function values stored in the memory.

3. The revoke control method according to claim 1, wherein the each of the content utilizing devices includes a memory to store the device ID and the set of device keys assigned to the each of the content utilizing devices; and the each content utilizing device whose device ID indicates one of the boundary set of paths configured to calculate the path function value based on one or more device keys of the set stored in the memory, and decrypt one of the encrypted data items by using the path function value calculated.

4. The revoke control method according to claim 3, wherein the each content utilizing device whose device ID indicates one of the boundary set of paths configured to calculate the path function value based on the one or more device keys of the set which are on a partial path included in the path indicated by the device ID of the each content utilizing device.

5. The revoke control method according to claim 1, wherein each numeral of the device ID corresponds to a row in each column of the device key matrix, each numeral of the revoke target path corresponds to a row in each column of the device key matrix, and each numeral of the each of the paths of the boundary set corresponds to a row in each column of the device key matrix.

6. A content utilizing device assigned a device ID and assigned a set of device keys according to the device ID, the device ID being formed of numerals each indicating a position of each of the device keys of the set in each one dimensional array of a device key matrix in which device keys are arranged in a two dimensional manner, and the device ID indicating a path in a plurality of trees that are formed of all possible combinations of device keys in the device key matrix, the content utilizing device comprising:

a memory to store the device ID and a plurality of path function values each calculated based on one or more device keys of the set which are on a partial path included in the path indicated by the device ID;

an input unit configured to input revoke control data generated by a revoke control data generating device configured to:

(a) calculate a boundary set of paths except for a revoke target path in the trees which is a path to be revoked in the trees and is formed of numerals each indicating a position of a device key in each one dimensional array of the device key matrix, each of the paths of the boundary set being formed of one or more numerals each indicating a position of a device key in each one dimensional array of the device key matrix;

(b) calculate a path function value corresponding to each of the paths of the boundary set based on each device key indicated by each numeral of the each of the paths of the boundary set, to obtain a plurality of path function values corresponding to the paths of the boundary set;

(c) encrypt a master key by each of the path function values, to obtain a plurality of encrypted data items corresponding to the paths of the boundary set; and (d) generate the revoke control data including the encrypted data items; and a decryption unit configured to decrypt one of the encrypted data items by using one of the path function values stored in the memory when the path indicated by the device ID stored in the memory is included in the boundary set of paths.

7. The content utilizing device according to claim 6, wherein each numeral of the device ID corresponds to a row in each column of the device key matrix, each numeral of the revoke target path corresponds to a row in each column of the device key matrix, and each numeral of the each of the paths of the boundary set corresponds to a row in each column of the device key matrix.

8. A revoke control data generating device generating a revoke control data for revoking at least one of a plurality of content utilizing devices, each of the content utilizing devices being assigned a device ID and assigned a set of device keys according to the device ID, the device ID being formed of numerals each indicating a position of each of the device keys of the set in each one dimensional array of a device key matrix in which device keys are arranged in a two dimensional manner, and the device ID indicating a path in a plurality of trees that are formed of all possible combinations of device keys in the device key matrix, the revoke control data generating device comprising:

a memory to store the device key matrix;

an input unit configured to input a revoke target path which is a path to be revoked in the trees and is formed of numerals each indicating a position of a device key in each one dimensional array of the device key matrix;

a first calculation unit configured to calculate a boundary set of paths except for the revoke target path in the trees, each of the paths of the boundary set being formed of one or more numerals each indicating a position of a device key in each one dimensional array of the device key matrix;

a second calculation unit configured to calculate a path function value corresponding to each of the paths of the boundary set based on each device key indicated by each numeral of the each of the paths of the boundary set, to obtain a plurality of path function values corresponding to the paths of the boundary set;

an encryption unit configured to encrypt a master key by using each of the path function values, to obtain a plurality of encrypted data items corresponding to the paths of the boundary set; and a generation unit configured to generate the revoke control data including the encrypted data items.

* * * * *